US011172324B2

(12) United States Patent
Liang et al.

(10) Patent No.: US 11,172,324 B2
(45) **Date of Patent: *Nov. 9, 2021**

(54) SYSTEMS AND METHODS FOR PREDICTING TARGETED LOCATION EVENTS

(71) Applicant: xAd, Inc., New York, NY (US)

(72) Inventors: Can Liang, Mountain View, CA (US); Yilin Chen, Sunnyvale, CA (US); Weiqing Yu, San Jose, CA (US); Fan Yang, San Jose, CA (US)

(73) Assignee: xAd, Inc., New York, NY (US)

(*) Notice: Subject to any disclaimer, the term of this patent is extended or adjusted under 35 U.S.C. 154(b) by 48 days.

This patent is subject to a terminal disclaimer.

(21) Appl. No.: 16/780,802

(22) Filed: Feb. 3, 2020

(65) Prior Publication Data

US 2020/0178026 A1 Jun. 4, 2020

Related U.S. Application Data

(63) Continuation-in-part of application No. 16/749,746, filed on Jan. 22, 2020, which is a continuation-in-part (Continued)

(51) Int. Cl.
*H04W 4/021* (2018.01)
*H04L 29/08* (2006.01)

(Continued)

(52) U.S. Cl.
CPC ............ *H04W 4/021* (2013.01); *G06F 16/29* (2019.01); *G06N 20/00* (2019.01); *H04L 67/18* (2013.01)

(58) Field of Classification Search
CPC ..... H04W 4/021; H04W 4/029; H04W 4/185; H04W 4/025; H04W 4/06; H04W 4/08;

(Continued)

(56) References Cited

U.S. PATENT DOCUMENTS 7,574,661 B2 8/2009 Matsura et al.
8,438,127 B2 5/2013 Kurata et al.

(Continued)

FOREIGN PATENT DOCUMENTS

AU 2016349513 B2 7/2020
CN 105868845 A 8/2016

(Continued)

OTHER PUBLICATIONS

Liang, Non-Final Office Action, U.S. Appl. No. 16/506,940, dated Jun. 25, 2020, 6 pgs.

(Continued)

*Primary Examiner* — Ninos Donabed
(74) *Attorney, Agent, or Firm* — USCH Law, PC

(57) ABSTRACT

A system for predicting a conversion rate relating to targeted location events for a test campaign includes one or more campaign databases configured to store campaign parameters of a set of historical campaigns. The system further includes a feature engineering module configured to construct a training feature space corresponding to the set of historical campaigns, and to determine a set of labels including a respective conversion rate for each respective historical campaign of the plurality of historical campaigns. The system further includes a model training module configured to machine train a conversion rate prediction model using the training feature space and the set of labels. The feature engineering module is further configured to construct a set of test features from campaign parameters of the test campaign, and the system further includes a prediction module configured to apply the conversion rate prediction model to the set of test features to obtain a predicted conversion rate for the test campaign.

17 Claims, 43 Drawing Sheets

Related U.S. Application Data of application No. 16/726,056, filed on Dec. 23, 2019, which is a continuation-in-part of application No. 16/506,940, filed on Jul. 9, 2019, now Pat. No. 10,939,233, which is a continuation of application No. 15/999,331, filed on Aug. 17, 2018, now Pat. No. 10,349,208.

(51) Int. Cl.
*G06N 20/00* (2019.01)
*G06F 16/29* (2019.01)

(58) Field of Classification Search
CPC ........ G06N 20/00; G06N 20/20; G06N 5/003; H04L 43/106; H04L 67/18
See application file for complete search history.

(56) References Cited

U.S. PATENT DOCUMENTS

| | | | | |
|---|---|---|---|---|
| 8,660,355 | B2 | 2/2014 | Rodriguez et al. | |
| 8,832,003 | B1 | 9/2014 | Bowers et al. | |
| 8,868,254 | B2 | 10/2014 | Louboutin | |
| 8,941,489 | B2 | 1/2015 | Sheshadri et al. | |
| 9,210,545 | B2 | 12/2015 | Sabatelli et al. | |
| 9,280,749 | B1 | 3/2016 | Porteous et al. | |
| 9,303,997 | B2 | 4/2016 | McGavran et al. | |
| 9,357,346 | B2 | 5/2016 | Jagannath | |
| 9,377,319 | B2 | 6/2016 | San Filippo et al. | |
| 9,584,836 | B2 | 2/2017 | Fei et al. | |
| 9,584,968 | B2 | 2/2017 | Barrand et al. | |
| 9,602,970 | B1 | 3/2017 | Mahapatra | |
| 9,606,716 | B2 | 3/2017 | Sharifi et al. | |
| 9,652,525 | B2 | 5/2017 | Patton et al. | |
| 9,654,591 | B2 | 5/2017 | Matus | |
| 9,706,355 | B1 | 7/2017 | Cali et al. | |
| 9,712,968 | B2 | 7/2017 | Kong et al. | |
| 9,712,970 | B2 | 7/2017 | Barrand et al. | |
| 9,785,974 | B1 * | 10/2017 | Periasamy | G06Q 30/0267 |
| 9,838,843 | B1 | 12/2017 | Bajaj et al. | |
| 9,841,286 | B1 | 12/2017 | Hayward | |
| 9,846,999 | B1 | 12/2017 | Pickover et al. | |
| 9,860,697 | B2 | 1/2018 | Frenz | |
| 9,916,538 | B2 | 3/2018 | Zadeh et al. | |
| 9,928,468 | B2 | 3/2018 | Katsuki et al. | |
| 9,996,853 | B2 * | 6/2018 | Myers | G06F 16/9535 |
| 10,064,007 | B1 | 8/2018 | Deluca et al. | |
| 10,080,201 | B2 | 9/2018 | Taite et al. | |
| 10,127,564 | B2 | 11/2018 | Heath | |
| 10,149,111 | B1 | 12/2018 | Subbian | |
| 10,165,403 | B2 | 12/2018 | Liang et al. | |
| 10,171,934 | B2 | 1/2019 | Jain et al. | |
| 10,175,054 | B2 | 1/2019 | Woodard et al. | |
| 10,185,948 | B2 | 1/2019 | Kumaraguruparan et al. | |
| 10,217,028 | B1 | 2/2019 | Wang et al. | |
| 10,257,660 | B2 | 4/2019 | Price et al. | |
| 10,278,014 | B2 | 4/2019 | Liang et al. | |
| 10,349,208 | B1 | 7/2019 | Liang et al. | |
| 10,380,636 | B2 | 8/2019 | Polachi | |
| 10,417,076 | B2 | 9/2019 | Ciasulli et al. | |
| 10,424,185 | B2 * | 9/2019 | Cordes | G08B 25/10 |
| 10,455,363 | B2 | 10/2019 | Liang et al. | |
| 10,475,064 | B2 | 11/2019 | Golden et al. | |
| 10,715,962 | B2 * | 7/2020 | Liang | G06N 20/00 |
| 2002/0111172 | A1 | 8/2002 | DeWolf et al. | |
| 2003/0064735 | A1 | 4/2003 | Spain et al. | |
| 2006/0156209 | A1 | 7/2006 | Matsura et al. | |
| 2007/0026870 | A1 | 2/2007 | Spain et al. | |
| 2007/0233631 | A1 | 10/2007 | Kobayashi et al. | |
| 2010/0312599 | A1 | 12/2010 | Durst | |
| 2011/0081634 | A1 | 4/2011 | Kurata et al. | |
| 2011/0099045 | A1 | 4/2011 | Carr et al. | |
| 2011/0190595 | A1 * | 8/2011 | Bennett | A61B 17/42 600/301 |
| 2011/0244919 | A1 | 10/2011 | Aller et al. | |
| 2012/0053991 | A1 | 3/2012 | Shimizu et al. | |
| 2012/0179534 | A1 | 7/2012 | Moukas et al. | |
| 2012/0284769 | A1 | 11/2012 | Dixon et al. | |
| 2013/0006522 | A1 | 1/2013 | Vellaikal et al. | |
| 2013/0066818 | A1 | 3/2013 | Assadollahi et al. | |
| 2013/0073388 | A1 | 3/2013 | Heath | |
| 2013/0099977 | A1 | 4/2013 | Sheshadri et al. | |
| 2013/0103764 | A1 * | 4/2013 | Verkasalo | G06Q 30/02 709/204 |
| 2013/0225282 | A1 | 8/2013 | Williams et al. | |
| 2013/0231137 | A1 | 9/2013 | Hugie et al. | |
| 2013/0268357 | A1 * | 10/2013 | Heath | G06Q 30/02 705/14.53 |
| 2013/0275511 | A1 | 10/2013 | Wilson et al. | |
| 2013/0304869 | A1 | 11/2013 | Gupta et al. | |
| 2013/0324160 | A1 | 12/2013 | Sabatellil et al. | |
| 2014/0018096 | A1 | 1/2014 | Jagannath | |
| 2014/0045529 | A1 | 2/2014 | Bolon et al. | |
| 2014/0053261 | A1 | 2/2014 | Gupta et al. | |
| 2014/0067901 | A1 | 3/2014 | Shaw | |
| 2014/0074604 | A1 * | 3/2014 | Castillo | G06Q 30/0267 705/14.53 |
| 2014/0150100 | A1 | 5/2014 | Gupta et al. | |
| 2014/0164118 | A1 | 6/2014 | Polachi | |
| 2014/0164369 | A1 | 6/2014 | Nichols et al. | |
| 2014/0266984 | A1 | 9/2014 | Sharma | |
| 2014/0278086 | A1 | 9/2014 | San Filippo et al. | |
| 2014/0317734 | A1 | 10/2014 | Valencia et al. | |
| 2014/0337123 | A1 | 11/2014 | Nuernberg et al. | |
| 2014/0337862 | A1 | 11/2014 | Valencia et al. | |
| 2014/0342337 | A1 | 11/2014 | Bowden et al. | |
| 2014/0365307 | A1 | 12/2014 | Cheung | |
| 2015/0066593 | A1 | 3/2015 | Huang et al. | |
| 2015/0105944 | A1 | 4/2015 | Louboutin | |
| 2015/0120530 | A1 | 4/2015 | Jung et al. | |
| 2015/0163639 | A1 | 6/2015 | Kilpatrick, II et al. | |
| 2015/0186497 | A1 | 7/2015 | Patton et al. | |
| 2015/0213497 | A1 | 7/2015 | Jain et al. | |
| 2015/0278864 | A1 | 10/2015 | McDevitt | |
| 2015/0287072 | A1 | 10/2015 | Golden et al. | |
| 2015/0332325 | A1 | 11/2015 | Sharma et al. | |
| 2015/0332329 | A1 | 11/2015 | Luo et al. | |
| 2015/0341747 | A1 | 11/2015 | Barrand et al. | |
| 2015/0373501 | A1 * | 12/2015 | Dribinski | H04W 4/029 455/456.1 |
| 2016/0078485 | A1 * | 3/2016 | Shim | H04W 4/021 705/14.64 |
| 2016/0094944 | A1 | 3/2016 | Kong et al. | |
| 2016/0196527 | A1 | 7/2016 | Bose et al. | |
| 2016/0255158 | A1 * | 9/2016 | Lowry | H04L 67/327 709/227 |
| 2016/0292722 | A1 * | 10/2016 | Myers | G06F 16/9535 |
| 2017/0013408 | A1 | 1/2017 | Grzywaczewski et al. | |
| 2017/0034592 | A1 * | 2/2017 | Ray | H04N 21/812 |
| 2017/0055129 | A1 * | 2/2017 | Schurer | H04W 4/021 |
| 2017/0127233 | A1 | 5/2017 | Liang et al. | |
| 2017/0161614 | A1 * | 6/2017 | Mehta | G06N 20/00 |
| 2017/0161659 | A1 | 6/2017 | Goldstein et al. | |
| 2017/0164649 | A1 | 6/2017 | La Cagnina | |
| 2017/0171704 | A1 | 6/2017 | Frenz | |
| 2017/0278022 | A1 | 9/2017 | Mimassi | |
| 2017/0278202 | A1 | 9/2017 | Mimassi | |
| 2017/0289756 | A1 | 10/2017 | Barrand et al. | |
| 2017/0323342 | A1 | 11/2017 | Dey et al. | |
| 2018/0080793 | A1 * | 3/2018 | Kapicioglu | H04W 4/021 |
| 2018/0260393 | A1 | 9/2018 | Liang et al. | |
| 2018/0349703 | A1 | 12/2018 | Rathod | |
| 2018/0350144 | A1 | 12/2018 | Rathod | |
| 2019/0007793 | A1 | 1/2019 | Liang et al. | |
| 2019/0014441 | A1 | 1/2019 | Diamanti et al. | |
| 2019/0045331 | A1 * | 2/2019 | Liang | H04W 4/029 |
| 2019/0098448 | A1 | 3/2019 | Jain et al. | |
| 2019/0114544 | A1 | 4/2019 | Sundaram et al. | |

(56) References Cited

U.S. PATENT DOCUMENTS

| | | | | |
|---|---|---|---|---|
| 2020/0019995 | A1* | 1/2020 | Krishnan | G06F 16/951 |
| 2020/0134660 | A1* | 4/2020 | Kadaster | G06Q 30/0255 |

FOREIGN PATENT DOCUMENTS

| | | | |
|---|---|---|---|
| EP | 2541485 | A1 | 1/2013 |
| EP | 2820630 | A4 | 3/2016 |
| EP | 2570974 | B1 | 11/2018 |
| EP | 3146753 | B1 | 1/2020 |
| EP | 3622520 | A1 | 3/2020 |
| ES | 2527781 | B1 | 9/2015 |
| GB | 2522708 | A | 8/2015 |
| JP | 2010533326 | A | 10/2010 |
| JP | 4783181 | B2 | 9/2011 |
| JP | 5440080 | B2 | 3/2014 |
| JP | 5984153 | B2 | 9/2016 |
| JP | 2020511716 | A | 4/2020 |
| TW | I627987 | B | 7/2018 |
| WO | WO2004077291 | A1 | 9/2004 |
| WO | WO 2013/184603 | A1 | 12/2013 |
| WO | WO 2015/058123 | A1 | 4/2015 |
| WO | WO 2016/183766 | A1 | 11/2016 |
| WO | WO2016183766 | A1 | 11/2016 |
| WO | WO 2017/079697 | A1 | 5/2017 |
| WO | WO 2018/092016 | A1 | 5/2018 |
| WO | WO2020006577 | A1 | 1/2020 |

OTHER PUBLICATIONS

Liang, Non-Final Office Action, U.S. Appl. No. 16/775,191, dated May 6, 2020, 8 pgs.

Xad, Inc, Notice of Allowance, U.S. Appl. No. 16/660,686, dated Mar. 3, 2020, 11 pgs.

Liang, Notice of Allowance, U.S. Appl. No. 16/775,191, dated Aug. 18, 2020, 10 pgs.

Liang, Notice of Allowance, U.S. Appl. No. 15/344,482, dated Apr. 19, 2018, 14 pgs.

Liang, Notice of Allowance, U.S. Appl. No. 15/999,330, dated Dec. 7, 2018, 12 pgs.

xAd, Inc., International Search Report and Written Opinion, PCT/US2016/060727, dated Mar. 31, 2017, 7 pgs.

xAd, Inc., International Preliminary Report on Patentability, PCT/US2016/060727, dated May 8, 2018, 6 pgs.

Groundtruth, Inc., International Search Report / Written Opinion, PCT/US18/55293, dated Dec. 21, 2018, 9 pgs.

xAd, Inc., Letter of Decision, Japanese Patent Application No. 2018-522739, dated Jan. 7, 2020, 3 pgs.

xAd, Inc, Examination Report No. 1, Australian Application No. 2016349513, dated Jun. 18, 2019, 4 pgs.

xAd, Inc., Japanese Office Action, JP Patent Application No. JP 2018-522739, dated May 13, 2019, 12 pgs.

xAd, Inc, European Search Report, EP 16863131.5, dated Jun. 13, 2019, 12 pgs.

Xad, Inc., International Search Report and Written Opinion, PCT/US2019/046832, dated Dec. 13, 2019, 10 pgs.

* cited by examiner

| Fence ID | Fence Type | Category | Name/Brand | Municipality | Spatial Data | Doc ID |
|---|---|---|---|---|---|---|
| 19-35175 | BC | General | Costco | US/CA/Almaden | a1, a2, ..., ai | 132475 |
| 19-35176 | BP | General | Costco | US/CA/Almaden | b1, b2, ..., bj | 135678 |
| 19-35177 | BR | General | Costco<br>T.J Maxx<br>Red Lobster<br>Trader Joe's<br>Chevy's<br>Barnes&Nobel<br>...<br>Almaden Plaza | US/CA/Almaden | c1, c2, ..., ck | 136572 |
| 19-35163 | BC | Department | T.J Maxx | US/CA/Almaden | d1, d2, ..., dl | 156321 |
| 19-35164 | BP | Department | T.J Maxx | US/CA/Almaden | e1, e2, ..., em | 154376 |
| 19-35151 | BC | Grocery | Trader Joe's | US/CA/Almaden | f1, f2, ..., fn | 256321 |
| | | ...... | ...... | ...... | ...... | |

FIG. 5

| Geo-Bock ID | Spatial Data | Meta Data | | | | |
|---|---|---|---|---|---|---|
| | | City/State | Functionality | Major POI | Demographic | inventory |
| ...... | ...... | ...... | ...... | ...... | ...... | ...... |
| 1234568 | a1, a2, ..., ai | Santa Clara/CA | Residential | Santa Clara High School | ...... | ...... |
| 1234569 | b1, b2, ..., bj | Santa Clara/CA | Retail | New India Bazar | ...... | ...... |
| 1234570 | c1, c2, ..., ck | Santa Clara/CA | Residential | Pomeroy Elementary | ...... | ...... |
| 1234571 | d1, d2, ..., dl | Santa Clara/CA | Retail | Moonlite Shopping Center | ...... | ...... |
| ...... | ...... | ...... | ...... | ...... | ...... | ...... |
| 1234573 | f1, f2, ..., fn | Santa Clara/CA | Recreational | Branham Park | ...... | ...... |
| ...... | ...... | ...... | ...... | ...... | ...... | ...... |

FIG. 7

| Request ID | Device Information | | User Information | | | Lat/ Long | Location Events | | | App Used | Time Stamp | |
|---|---|---|---|---|---|---|---|---|---|---|---|---|
| | UID | Make/ Model | Age | Gndr | Ed | | Geo-Fence | Fence Type | Geo-Block | | Day | Hour |
| ... | ... | ... | ... | ... | ... | ... | ... | ... | ... | ... | ... | ... |
| 0965799976 | 36***412 | Samsung S9 | 23 | M | G/S | x..x/x..x | B175 | X | 396841 | A310 | 7/3/2019 | 23:59 |
| ... | ... | ... | ... | ... | ... | ... | ... | ... | ... | ... | ... | ... |
| 0936819973 | XX***XXX | Nokia 7.1 | 36 | F | HS | x..x/x..x | Null | Null | 559654 | A027 | 6/21/2019 | 00:45 |
| 0936519972 | 36***412 | Samsung S9 | 23 | M | G/S | x..x/x..x | B175 | Z | 396841 | A310 | 6/20/2019 | 23:59 |
| ... | ... | ... | ... | ... | ... | ... | ... | ... | ... | ... | ... | ... |
| 0555375238 | XX***XXX | Samsung J3 | 42 | F | C/U | x..x/x..x | B168 | Y | 546987 | A547 | 6/15/2019 | 23:57 |
| ... | ... | ... | ... | ... | ... | ... | ... | ... | ... | ... | ... | ... |
| 0532123975 | XX***XXX | Iphone 7 | 47 | F | HS | x..x/x..x | B138 | Y | 547412 | A298 | 3/21/2019 | 00:02 |
| 0532389972 | 36***412 | Samsung S9 | 23 | M | G/S | x..x/x..x | B175 | Z | 396841 | A310 | 3/20/2019 | 23:59 |
| ... | ... | ... | ... | ... | ... | ... | ... | ... | ... | ... | ... | ... |
| 0124565241 | XX***XXX | Iphone 10 | 47 | F | HS | x..x/x..x | Null | Null | 135748 | a1 | 3/11/2019 | 00:00 |
| 0125519737 | XX***XXX | Iphone 6 | 47 | F | HS | x..x/x..x | Null | Null | 335952 | a1 | 3/10/2019 | 23:59 |
| ... | ... | ... | ... | ... | ... | ... | ... | ... | ... | ... | ... | ... |
| 0032469974 | XX***XXX | Nokia 7.2 | 25 | M | C/U | x..x/x..x | B176 | Y | 681247 | A215 | 3/1/2019 | 00:00 |
| ... | ... | ... | ... | ... | ... | ... | ... | ... | ... | ... | ... | ... |

PTF
Qualified Request
Campaign Start
PTP
TTF
TTP

FIG. 9

| Request ID | Device Information | | User Information | | | Feedback | | | Time Stamp | |
|---|---|---|---|---|---|---|---|---|---|---|
| | UID | Make/ Model | Age | Gndr | Ed | Doc ID | App | Event | Day | Hour |
| ... | ... | ... | ... | ... | ... | ... | ... | ... | ... | ... |
| 0987563241 | XX***XXX | Nokia 7.1 | 25 | M | G/S | D432 | A346 | Impression | 7/3/2019 | 13:52 |
| ... | ... | ... | ... | ... | ... | ... | ... | ... | ... | ... |
| 0948562372 | XX***XXX | Samsung S9 | 46 | F | HS | D675 | A772 | Click | 6/21/2019 | 20:07 |
| 0943256875 | XX***XXX | Iphone 7 | 33 | M | G/S | D432 | A461 | Impression | 6/20/2019 | 21:52 |
| ... | ... | ... | ... | ... | ... | ... | ... | ... | ... | ... |
| 0589652341 | XX***XXX | Iphone 6 | 52 | F | C/U | D432 | D783 | Impression | 6/15/2019 | 08:07 |
| ... | ... | ... | ... | ... | ... | ... | ... | ... | ... | ... |
| 0557896523 | XX***XXX | Iphone 8 | 27 | F | HS | D373 | D541 | Impression | 3/21/2019 | 00:02 |
| 0553287652 | XX***XXX | Samsung S9 | 43 | M | G/S | D675 | D346 | Impression | 3/20/2019 | 23:59 |
| ... | ... | ... | ... | ... | ... | ... | ... | ... | ... | ... |
| 0136528972 | XX***XXX | Nokia 7.2 | 41 | F | HS | D562 | D573 | Impression | 3/11/2019 | 07:54 |
| 0135268242 | XX***XXX | Samsung J3 | 29 | F | HS | D856 | D346 | Click | 3/10/2019 | 20:21 |
| ... | ... | | ... | ... | ... | ... | ... | ... | ... | ... |
| 005369863 | XX***XXX | Iphone 10 | 18 | M | C/U | D691 | D346 | Impression | 3/1/2019 | 06:23 |
| ... | ... | ... | ... | ... | ... | ... | ... | ... | ... | ... |

PTF

Campaign Start

TTF

PTP

TTP

| UID | Device & User Meta Data | | |
|---|---|---|---|
| | Age | G | E |
| 36***412 | 35 | M | C | ... |

GBx

| Number of Visits | | | Time of Last Visit | Average Length of Stay |
|---|---|---|---|---|
| TB1 | TB2 | TB3 | | |
| 10 | 7 | 3 | 8 | 0.2 |

GBy

| Number of Visits | | | Time of Last Visit | Average Length of Stay |
|---|---|---|---|---|
| TB1 | TB2 | TB3 | | |
| 0 | 0 | 21 | 2 | 0.7 |

Bx

| Number of Visits | | | Time of Last Visit | Average Length of Stay |
|---|---|---|---|---|
| TB1 | TB2 | TB3 | | |
| 0 | 5 | 2 | 6 | 0.3 |

By

| Number of Visits | | | Time of Last Visit | Average Length of Stay |
|---|---|---|---|---|
| TB1 | TB2 | TB3 | | |
| 3 | 9 | 0 | 3 | 0.5 |

Docx

| Imp | C/C | S/A |
|---|---|---|
| 6 | 0 | 0 |

Docy

| Imp | C/C | S/A |
|---|---|---|
| 3 | 1 | 1 |

Appx

| Number of Uses | | | Time of Last Use | Average Length of Use |
|---|---|---|---|---|
| TB1 | TB2 | TB3 | | |
| 4 | 0 | 8 | 1 | 0.1 |

Appy

| Number of Uses | | | Time of Last Use | Average Length of Use |
|---|---|---|---|---|
| TB1 | TB2 | TB3 | | |
| 0 | 0 | 30 | 2 | 0.5 |

1420

36***412; 35, M, C, ...; GBx: 10, 7, 3, 8, 0.2, GB3; ...; Gby: 0, 0, 21, 2, 0.7, GB9; TBx: 0, 5, 6, 0.3, GB55; ...; TBy: 3, 9, 0, 3, 0.5, GB6; Docx: 6, 0, 0; ...; Docy: 3, 1, 1; Appx:4, 0, 8, 1, 0.1; Appy: 0, 0, 30, 2, 0.5; ...

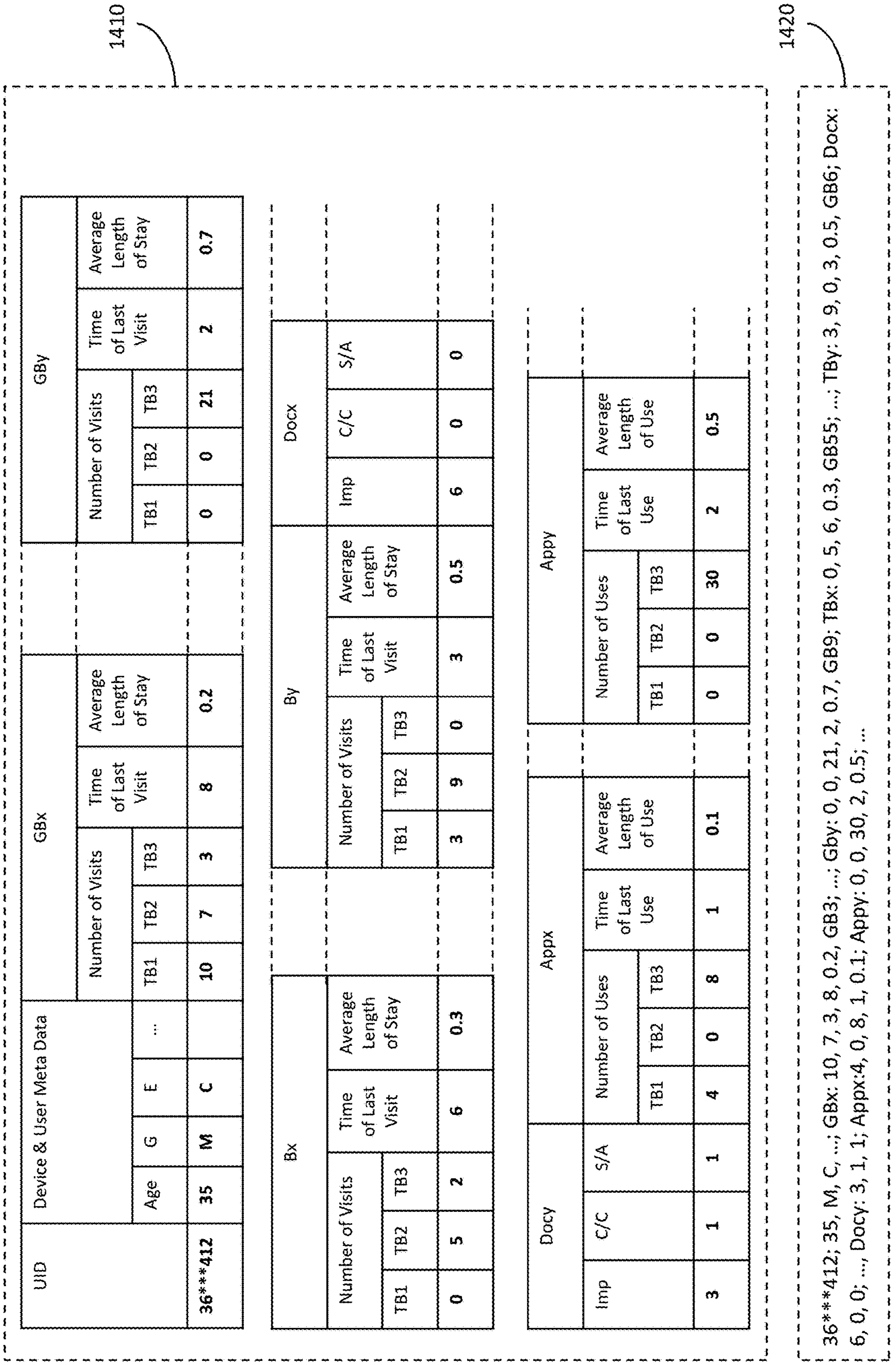

FIG. 14

| UID | Device & User Meta Data | | | | $GBB_1$ | | | | | ... | $GBB_m$ | | | | |
|---|---|---|---|---|---|---|---|---|---|---|---|---|---|---|---|
| | | | | | Number of Visits | | | Time of Last Visit | Average Length of Stay | | Number of Visits | | | Time of Last Visit | Average Length of Stay |
| | Age | G | E | ... | TB1 | TB2 | TB3 | | | | TB1 | TB2 | TB3 | | |
| **52**256** | **35** | **M** | **C** | | **32** | **15** | **21** | **3** | **0.7** | | **16** | **5** | **83** | **1** | **1** |

| $BB_1$ (or $BBB_1$) | | | | | ... | $BB_n$ (or $BBB_n$) | | | | | Mobility | | Retail Geoblocks | |
|---|---|---|---|---|---|---|---|---|---|---|---|---|---|---|
| Number of Visits | | | Time of Last Visit | Average Length of Stay | | Number of Visits | | | Time of Last Visit | Average Length of Stay | Brands | GB Ratio | Weight ed Visits | Net Visits |
| TB1 | TB2 | TB3 | | | | TB1 | TB2 | TB3 | | | | | | |
| **11** | **0** | **3** | **12** | **0.8** | | **0** | **25** | **7** | **3** | **0.3** | **27** | **0.08** | **3.2** | **11** |

| MFVGB-1 | | | | ... | MFVGB-n | | | | Feedbacks | | |
|---|---|---|---|---|---|---|---|---|---|---|---|
| Number of Visits | | | Distance from nearest location in the location group | | Number of Visits | | | Distance from nearest location in the location group | Pre-exposure | C/C Ratio | S/A Ratio |
| TB1 | TB2 | TB3 | | | TB1 | TB2 | TB3 | | | | |
| **37** | **0** | **82** | **3.6** | | **3** | **21** | **35** | **5.7** | **17** | **0.06** | **0.00** |

FIG. 16

| UID | @LG during TTF |
|---|---|
| 76***932 | 0 |
| 55***848 | 1 |
| 39***236 | 0 |
| 48***352 | 1 |
| ... | ... |
| 93***677 | 0 |
| 72***842 | 0 |
| ... | ... |

FIG. 17A

| UID | Predicted Probability of Visits during PTF |
|---|---|
| XX***XXX | 1% |
| XX***XXX | 23% |
| XX***XXX | 67% |
| XX***XXX | 98% |
| XX***XXX | 41% |
| . | ...... |
| XX***XXX | 50% |
| XX***XXX | 62% |
| XX***XXX | 88% |
| XX***XXX | 30% |
| ...... | ...... |
| XX***XXX | 99% |
| ...... | ...... |

FIG. 17B

| Device Information | Sampled Impressions (or Qualification) Based on Data in Feedback Log | | Detected Visits Based on Data in Request Log | |
|---|---|---|---|---|
| UID | Day | Hour | Day | Hour |
| ... | ... | ... | ... | ... |
| XX***XXX | 6/07/2019 | 10:05 | 7/1/2019 | 15:27 |
| ... | ... | ... | ... | ... |
| XX***XXX | 6/17/2019 | 14:52 | | |
| XX***XXX | 6/20/2019 | 00:02 | 6/27/2019 | 16:12 |
| ... | ... | ... | ... | ... |
| XX***XXX | 6/7/2019 | 08:07 | | |
| ... | ... | ... | ... | ... |
| XX***XXX | 6/11/2019 | 00:02 | | |
| XX***XXX | 6/8/2019 | 23:59 | | |
| ... | ... | ... | ... | ... |
| XX***XXX | 6/18/2019 | 07:54 | | |
| XX***XXX | 6/15/2019 | 20:21 | 6/21/2019 | 10:21 |
| ... | ... | ... | ... | ... |

FIG. 19

| | UID of impressed (or qualified) mobile devices | Detected Visits | Predicted Probability of Visit |
|---|---|---|---|
| 1st probability bracket | 36***412 | 0 | 0.1% |
| | 56***845 | 0 | 0.12% |
| | 36***963 | ...... | ...... |
| | 45***895 | 1 | 1% |
| 2st probability bracket | 36***412 | 0 | 1.01% |
| | ...... | ...... | ...... |
| | 78***697 | 1 | 1.97% |
| | 89***776 | 0 | 2% |
| | ...... | ...... | ...... |
| 100th probability bracket | 89***776 | 1 | 99.1% |
| | 94***321 | 0 | 99.13% |
| | ...... | ...... | ...... |
| | 67***423 | 1 | 99.98% |

FIG. 20

| Campaign ID | Pricing Model | Target Audience | | | | | | Device | Ad Type | App | ... | Target POIs | |
|---|---|---|---|---|---|---|---|---|---|---|---|---|---|
| | | Age | Gndr | Ed | Segment | Geographic Area | Geo-fence Type | | | | | Brand | Geographic Area |
| ... | ... | ... | ... | ... | ... | ... | ... | ... | ... | ... | ... | ... | ... |
| C34256 | CPC | 20-30 | M/F | G/S | Loyalty | xxxxx | Radial | iPhone 8+ | Banner | Safari | ... | xxxxx | xxxxxxx |
| C97598 | CPV | 20-40 | F | HS | Conquest | xxxxx | Premise | Galaxy S9+ | Animation | Maps | ... | xxxxx | Xxxx/XX |
| C12879 | CPM | 20-35 | M | G/S | Loyalty | xxxxx | NH | xxxx | Interactive | Spotify | ... | xxxxx | xxxxx |
| C78865 | CPV | 40-60 | M/F | C/U | Loyalty | Xxxxx/XX | Premise | iPhone 8+ | Banner | Safari | ... | xxxxx | Xxxx/XX |
| ... | ... | ... | ... | ... | ... | ... | ... | ... | ... | ... | ... | ... | ... |
| C98875 | CPC | | F | HS | Conquest | Xxxxx/XX | NH | iPhone 8+ | Banner | Spotify | ... | xxxxx | Xxxx/XX |
| C25364 | CPM | 20-35 | M | G/S | Conquest | xxxxx | Radial | xxxx | Video | Safari | ... | xxxxx | xxxxx |
| ... | ... | ... | ... | ... | ... | ... | ... | ... | ... | ... | ... | ... | ... |
| C52368 | CPV | 50+ | M/F | HS | Conquest | Xxxxx/XX | Premise | iPhone 6+ | Banner | Safari | ... | xxxxx | xxxxx |
| C52687 | CPC | 20-50 | F | HS | Loyalty | xxxxx | Premise | xxxx | Video | xxxx | ... | xxxxx | Xxxx/XX |
| ... | ... | ... | ... | ... | ... | ... | ... | ... | ... | ... | ... | ... | ... |
| C15287 | CPV | 40+ | M | C/U | Loyalty | xxxxx | Radial | xxxx | Video | xxxx | ... | xxxxx | xxxxx |
| ... | ... | ... | | | ... | ... | ... | ... | ... | ... | ... | ... | ... |

FIG. 22

| Campaign ID | Target POIs | | | Target Audience | | | | | | Device | Ad Type | App |
|---|---|---|---|---|---|---|---|---|---|---|---|---|
| | Visits/wk | % of brand | Category | Age | Gndr | Ed | Segment | Geographic Area | Geo-fence | | | |
| ... | ... | ... | ... | ... | ... | ... | ... | ... | ... | ... | ... | ... |
| C34256 | 5k-10k | 5 | General | 20-30 | M/F | G/S | Loyalty | xxxxx | Radial | iPhone 8+ | Banner | Safari |
| C97598 | 5k-10k | 10 | Department | 20-40 | F | HS | Conquest | xxxxx | Premise | Galaxy S9+ | Animation | Maps |
| C12879 | 10k-15k | 3 | Department | 20-35 | M | G/S | Loyalty | xxxxx | NH | xxxx | Interactive | Spotify |
| C78865 | 3k-5k | 20 | Grocery | 40-60 | M/F | C/U | Loyalty | Xxxxx/XX | Premise | iPhone 8+ | Banner | Safari |
| ... | ... | ... | ... | ... | ... | ... | ... | ... | ... | ... | ... | ... |
| C98875 | 2k-3k | 15 | Apparel | | F | HS | Conquest | Xxxxx/XX | NH | iPhone 8+ | Banner | Spotify |
| C25364 | 1k-2k | 12 | Sports | 20-35 | M | G/S | Conquest | xxxxx | Radial | xxxx | Video | Safari |
| ... | ... | ... | ... | ... | ... | ... | ... | ... | ... | ... | ... | ... |
| C52368 | 1k-2k | 10 | Restaurant | 50+ | M/F | HS | Conquest | Xxxxx/XX | Premise | iPhone 6+ | Banner | Safari |
| C52687 | 20k-30k | 30 | Shopping Mall | 20-50 | F | HS | Loyalty | xxxxx | Premise | xxxx | Video | xxxx |
| ... | ... | ... | ... | ... | ... | ... | ... | ... | ... | ... | ... | ... |
| C15287 | 10k-15k | 23 | Theatre | 40+ | M | C/U | Loyalty | xxxxx | Radial | xxxx | Video | xxxx |
| ... | ... | ... | ... | ... | ... | ... | ... | ... | ... | ... | ... | ... |

FIG. 23

| Campaign A | Campaign B | Campaign A Features | | | | | | | Campaign B Features | | | | | | | Measured Difference |
|---|---|---|---|---|---|---|---|---|---|---|---|---|---|---|---|---|
| ... | ... | ... | ... | ... | ... | ... | ... | ... | ... | ... | ... | ... | ... | ... | ... | ... |
| C34256 | C97598 | xxx | xxx | xxx | ... | ... | xxx | xxx | xxx | xxx | xxx | ... | ... | xxx | xxx | 10% |
| C97598 | C12879 | xxx | xxx | xxx | ... | ... | xxx | xxx | xxx | xxx | xxx | ... | ... | xxx | xxx | 5% |
| C12879 | C78865 | xxx | xxx | xxx | ... | ... | xxx | xxx | xxx | xxx | xxx | ... | ... | xxx | xxx | 3% |
| C78865 | C98875 | xxx | xxx | xxx | ... | ... | xxx | xxx | xxx | xxx | xxx | ... | ... | xxx | xxx | 17% |
| ... | ... | ... | ... | ... | ... | ... | ... | ... | ... | ... | ... | ... | ... | ... | ... | ... |
| C98875 | C25364 | xxx | xxx | xxx | ... | ... | xxx | xxx | xxx | xxx | xxx | ... | ... | xxx | xxx | 23% |
| C25364 | C52368 | xxx | xxx | xxx | ... | ... | xxx | xxx | xxx | xxx | xxx | ... | ... | xxx | xxx | 31% |
| ... | ... | ... | ... | ... | ... | ... | ... | ... | ... | ... | ... | ... | ... | ... | ... | ... |
| C52368 | C52687 | xxx | xxx | xxx | ... | ... | xxx | xxx | xxx | xxx | xxx | ... | ... | xxx | xxx | 2% |
| C52687 | C15287 | xxx | xxx | xxx | ... | ... | xxx | xxx | xxx | xxx | xxx | ... | ... | xxx | xxx | 12% |
| ... | ... | ... | ... | ... | ... | ... | ... | ... | ... | ... | ... | ... | ... | ... | ... | ... |
| C15287 | C65478 | xxx | xxx | xxx | ... | ... | xxx | xxx | xxx | xxx | xxx | ... | ... | xxx | xxx | 1% |
| ... | ... | ... | ... | ... | ... | ... | ... | ... | ... | ... | ... | ... | ... | ... | ... | ... |

Features

Labels

FIG. 24

| Historical Campaigns | Historical Campaign Features | | | | | | | Current Campaign Features | | | | | | | Predicted Difference |
|---|---|---|---|---|---|---|---|---|---|---|---|---|---|---|---|
| ... | ... | ... | ... | ... | ... | ... | ... | ... | ... | ... | ... | ... | ... | ... | ... |
| C34256 | xxx | xxx | xxx | ... | ... | xxx | xxx | xxx | xxx | xxx | ... | ... | xxx | xxx | 21% |
| C97598 | xxx | xxx | xxx | ... | ... | xxx | xxx | xxx | xxx | xxx | ... | ... | xxx | xxx | 2% |
| C12879 | xxx | xxx | xxx | ... | ... | xxx | xxx | xxx | xxx | xxx | ... | ... | xxx | xxx | 5% |
| C78865 | xxx | xxx | xxx | ... | ... | xxx | xxx | xxx | xxx | xxx | ... | ... | xxx | xxx | 11% |
| ... | ... | ... | ... | ... | ... | ... | ... | ... | ... | ... | ... | ... | ... | ... | ... |
| C98875 | xxx | xxx | xxx | ... | ... | xxx | xxx | xxx | xxx | xxx | ... | ... | xxx | xxx | 32% |
| C25364 | xxx | xxx | xxx | ... | ... | xxx | xxx | xxx | xxx | xxx | ... | ... | xxx | xxx | 16% |
| ... | ... | ... | ... | ... | ... | ... | ... | ... | ... | ... | ... | ... | ... | ... | ... |
| C52368 | xxx | xxx | xxx | ... | ... | xxx | xxx | xxx | xxx | xxx | ... | ... | xxx | xxx | 1% |
| C52687 | xxx | xxx | xxx | ... | ... | xxx | xxx | xxx | xxx | xxx | ... | ... | xxx | xxx | 27% |
| ... | ... | ... | ... | ... | ... | ... | ... | ... | ... | ... | ... | ... | ... | ... | ... |
| C15287 | xxx | xxx | xxx | ... | ... | xxx | xxx | xxx | xxx | xxx | ... | ... | xxx | xxx | 2% |
| ... | ... | ... | ... | ... | ... | ... | ... | ... | ... | ... | ... | ... | ... | ... | ... |

Features

Results

FIG. 26

Closest historical campaigns (C25682, C65248, C32658)

| Historical Campaign ID | Predicted Difference from Current Campaign |
|---|---|
| C25682 | 1.10% |
| C65248 | 1.11% |
| C32658 | 1.15% |
| C78865 | 2.09% |
| ... | |
| C36254 | 11.7% |
| C32568 | 12.1% |
| ... | |
| C52365 | 32.2% |
| C21356 | 33.7% |
| ... | |
| C21458 | 41.5% |
| ... | |

| Device Information | Bid Price | Impressions | | Predicted Conversion Probability during Prediction Time Frame | Detected Conversion during Prediction Time Frame | |
|---|---|---|---|---|---|---|
| UID | $/1000 | Day | Hour | | Day | Hour |
| ... | ... | ... | ... | ... | ... | ... |
| XX***XXX | 6 | 6/21/2019 | 10:05 | 63% | 6/43/2019 | 15:27 |
| ... | | ... | ... | ... | ... | ... |
| XX***XXX | 3 | 6/21/2019 | 23:52 | 35% | | |
| XX***XXX | 5 | 6/21/2019 | 23:57 | 52% | 7/3/2019 | 16:12 |
| ... | ... | ... | ... | ... | ... | ... |
| XX***XXX | 3 | 7/4/2019 | 23:07 | 32% | | |
| XX***XXX | 5 | 7/5/2019 | 00:02 | 57% | | |
| ... | ... | ... | ... | ... | ... | ... |
| XX***XXX | 3 | 7/11/2019 | 23:59 | 38% | | |
| ... | ... | ... | ... | ... | ... | ... |
| XX***XXX | 4 | 7/21/2019 | 07:54 | 41% | | |
| XX***XXX | 5 | 7/21/2019 | 08:01 | 58% | | |
| ... | ... | ... | ... | ... | ... | ... |

FIG. 32A

| Day of Campaign | Target No. of Conversions to be Generated in Day ($NC_i$) | No. of Bids in Day ($NB_i$) | No. of Impressed Mobile Devices in Day ($NI_i$) | No. of Conversions in Respective Prediction Time Frame | |
|---|---|---|---|---|---|
| | | | | Based on Prediction at Time of Request ($NP_i$) | Based on Information Requests during Time Frame ($ND_i$) |
| Day 1 | 1000 | 100,000 | 10,341 | 1,002 | 1083 |
| Day 2 | 1000 | 100,000 | 10,965 | 1,006 | 1,102 |
| Day 3 | 991 | 98,000 | 9,327 | 1033 | 1097 |
| ... | | ... | ... | ... | ... |
| Day 14 | 1012 | 100,000 | 1,043 | 977 | 1008 |
| Day 15 | 990 | 98,000 | 9,706 | 1,006 | 1,083 |
| Day 16 | 960 | 96,000 | 9,508 | 962 | 981 |
| ... | | ... | ... | ... | ... |
| Day 30 | 935 | 95,000 | 9,876 | 953 | 1,050 |
| ... | | ... | ... | ... | ... |
| Day 40 | 912 | 95,000 | 9,352 | 951 | 923 |
| ... | | ... | ... | ... | ... |
| Day 45 | 829 | 80,000 | 8,128 | 825 | 781 |

FIG. 32B

| Historical Campaign | Campaign Features | | | | | | | Conversion Rate |
|---|---|---|---|---|---|---|---|---|
| ... | ... | ... | ... | ... | ... | ... | ... | ... |
| C34256 | xxx | xxx | xxx | ... | ... | xxx | xxx | 12% |
| C97598 | xxx | xxx | xxx | ... | ... | xxx | xxx | 15% |
| C12879 | xxx | xxx | xxx | ... | ... | xxx | xxx | 7% |
| C78865 | xxx | xxx | xxx | ... | ... | xxx | xxx | 9% |
| ... | ... | ... | ... | ... | ... | ... | ... | ... |
| C98875 | xxx | xxx | xxx | ... | ... | xxx | xxx | 3% |
| C25364 | xxx | xxx | xxx | ... | ... | xxx | xxx | 1% |
| ... | ... | ... | ... | ... | ... | ... | ... | ... |
| C52368 | xxx | xxx | xxx | ... | ... | xxx | xxx | 2% |
| C52687 | xxx | xxx | xxx | ... | ... | xxx | xxx | 5% |
| ... | ... | ... | ... | ... | ... | ... | ... | ... |
| C15287 | xxx | xxx | xxx | ... | ... | xxx | xxx | 1% |
| ... | ... | ... | ... | ... | ... | ... | ... | ... |

Features

Labels

FIG. 36

SYSTEMS AND METHODS FOR PREDICTING TARGETED LOCATION EVENTS

CROSS REFERENCE TO RELATED APPLICATION

This application is a continuation-in-part of U.S. patent application Ser. No. 16/749,746, filed on Jan. 22, 2020, entitled "Systems and Methods for Pacing Information Campaigns Based on Predicted and Observed Location Events," which is a continuation-in-part of U.S. patent application Ser. No. 16/726,056, filed on Dec. 23, 2019, entitled "Systems and Methods for Calibrated Location Prediction," which is a continuation-in-part of U.S. patent application Ser. No. 16/506,940, filed on Jul. 9, 2019, entitled "Systems and Methods for Real-Time Prediction of Mobile Device Locations," which is a continuation of U.S. patent application Ser. No. 15/999,331, filed on Aug. 17, 2018, now U.S. Pat. No. 10,349,208. Each of the above applications is hereby incorporated by reference in its entirety.

FIELD

The present disclosure is related to location-based information technologies, and more particularly to systems and methods for predicting targeted location events based on parameters of an information campaign.

DESCRIPTION OF RELATED ART

Mobile device locations are becoming more commonly available to mobile service providers. Location-based information technologies are rapidly developing to effectively translate received location signals, which are typically expressed in (latitude, longitude) pairs, into meaningful signals such as interests and patterns that are useful for serving relevant information to mobile users in the process of providing mobile services.

SUMMARY

According to some embodiments, a system for predicting a conversion rate relating to targeted location events for a test campaign includes one or more campaign databases configured to store campaign parameters of each of a plurality of information campaigns. The plurality of information campaigns include a set of historical campaigns. Additionally, the system further includes one or more mobile device databases configured to store datasets associated with mobile devices. In some embodiments, a respective dataset identifies an associated mobile device, and includes a respective time stamp and at least one respective event involving the associated mobile device at a time indicated by the respective time stamp. The at least one respective event can be, for example, one or more location events (triggering of a POI geo-fence and/or a geo-block) or a feedback event (impression, click/call, or secondary action).

In some embodiments, as also shown in FIG. 1, the system further includes a feature engineering module configured to construct a training feature space corresponding to the set of historical campaigns, the training feature space including a respective set of training features derived from respective campaign parameters of each respective historical campaign of the set of historical campaigns. The respective set of training features include respective POI features related to one or more respective points of interests (POIs) associated with the respective historical campaign and respective audience features related to a respective target audience for the respective historical campaign. The respective set of training features may further include one or more features related to at least one of a respective pricing model, a respective base price, and a respective budget specified by the respective historical campaign. The respective set of training features may further include respective features related to mobile device type(s), ad type(s), mobile app(s), etc., which are specified by the respective historical campaign.

In some embodiments, the feature engineering module is further configured to determine a set of labels corresponding, respectively, to the set of historical campaigns using the datasets in the one or more mobile device databases, the set of labels including a respective conversion rate for each respective historical campaign of the plurality of historical campaigns.

In some embodiments, the system further includes a model training module configured to machine train a conversion rate prediction model using the training feature space and the set of labels, which are derived from the set of historical campaigns, and store the conversion rate prediction model in a prediction models database.

In some embodiments, the feature engineering module is further configured to construct a set of test features from campaign parameters of the test campaign, the set of test features including test POI features related to one or more test POIs specified by the test campaign and test audience features related to a test audience specified by the test campaign. The set of test features may further include one or more features related to at least one of a pricing model, a base price, and a budget specified by one or more of the test parameters. The set of test features may further include features related to mobile device type(s), ad type(s), mobile app(s), etc., which are specified by the test campaign.

In some embodiments, the system further includes a prediction module configured to apply the conversion rate prediction model to the set of test features to obtain a predicted conversion rate for the test campaign. In some embodiments, in a process to optimize the conversion rate for the test campaign, the test parameters can be adjusted, and the prediction model can be re-applied to a new set of test features constructed from the adjusted test parameters, and the process can be iterated until a desired conversion rate is reached.

According to some embodiments, a method for predicting a conversion rate for a test campaign includes constructing a training feature space corresponding to a set of historical campaigns, the training feature space including a respective set of training features derived from respective campaign parameters of each respective historical campaign of the set of historical campaigns, the respective set of training features including respective POI features related to one or more respective points of interests (POIs) associated with the respective historical campaign and respective audience features related to a respective target audience for the respective historical campaign.

In some embodiments, the method further includes determining a set of labels corresponding, respectively, to the set of historical campaigns using the datasets in the one or more second databases, the set of labels including a respective conversion rate for each respective historical campaign of the plurality of historical campaigns. The method further includes machine training a conversion rate prediction model using the training feature space and the set of labels.

In some embodiments, the method further includes constructing a set of test features from campaign parameters of the test campaign, the set of test features including test POI features related to one or more test POIs specified by the test campaign and test audience features related to a test audience specified by the test campaign. The set of test features may further include one or more features related to at least one of a pricing model, a base price, and a budget specified by one or more of the test parameters, and may further include features related to mobile device type(s), ad type(s), mobile app(s), etc., which are specified by the test campaign. In some embodiments, the method further includes applying the conversion rate prediction model to the set of test features to obtain a predicted conversion rate for the test campaign.

In some embodiments, a method for predicting the conversion rate of a test campaign includes machine training a location prediction model for the test campaign, sampling a plurality of information requests from historical request data having time stamps in a preset time period, and for each respective information request of the plurality of information requests, determining if the respective information request is a qualified request (e.g., an information request that qualifies for the test campaign) based on data associated with the respective information request and the set of campaign parameters of the test campaign. In response to the respective information request qualifying for the test campaign, the method further includes determining a respective win rate for the respective information request, and predicting a respective conversion probability associated with the respective information request using the location prediction model. In some embodiments, the respective conversion probability corresponds to a probability of a respective mobile device associated with the respective information request to have at least one location event at any of the one or more POIs during a respective time frame.

In some embodiments, the method further includes predicting a conversion rate for the test campaign by determining a number of predicted impressions for the plurality of information requests and a number of predicted conversions for the plurality of information requests.

BRIEF DESCRIPTION OF THE DRAWINGS

FIG. 5 is a table illustrating some of the content in a geo-fence database according to certain embodiments.

FIG. 7 is a table illustrating some of the content in a geo-block database according to certain embodiments.

FIG. 9 is a table illustrating some of the content in a request log according to certain embodiments.

FIG. 10 is a table illustrating some of the content in a feedback log according to certain embodiments.

FIG. 14 includes tables illustrating extracted mobile device data corresponding to a time period according to certain embodiments.

FIG. 16 includes tables of a set of features in a feature space according to certain embodiments.

FIG. 17A is a table illustrating a set of labels corresponding to a time frame according to certain embodiments.

FIG. 17B is a table illustrating examples of location prediction results according to certain embodiments.

FIG. 19 is a table illustrating impression and visitation events associated with various mobile devices according to certain embodiments.

FIG. 20 is a table illustrating detected visitation events and predicted probability of visitation for a set of mobile devices according to certain embodiments.

FIG. 22 is a plot illustrating calibration models of a pair of historical campaigns according to certain embodiments.

FIG. 23 is a table illustrating campaign parameters according to certain embodiments.

FIG. 24 is a table illustrating campaign features according to certain embodiments.

FIG. 26 is a table illustrating a feature space for applying the campaign comparison model to obtain predicted difference values between a current campaign and a set of historical campaigns according to certain embodiments.

FIG. 27 is a table illustrating selection of one or more similar historical campaigns based on the predicted difference values according to certain embodiments.

FIG. 32A is a table listing impression and conversion events and predicted conversion probabilities associated with a plurality of mobile devices according to certain embodiments.

FIG. 32B is a table listing various values related to pacing an information campaign over a course of the information campaign according to certain embodiments.

FIG. 36 is a table a feature space and a set of labels corresponding to a set of historical campaigns according to certain embodiments.

DESCRIPTION OF THE EMBODIMENTS

Figure 1:
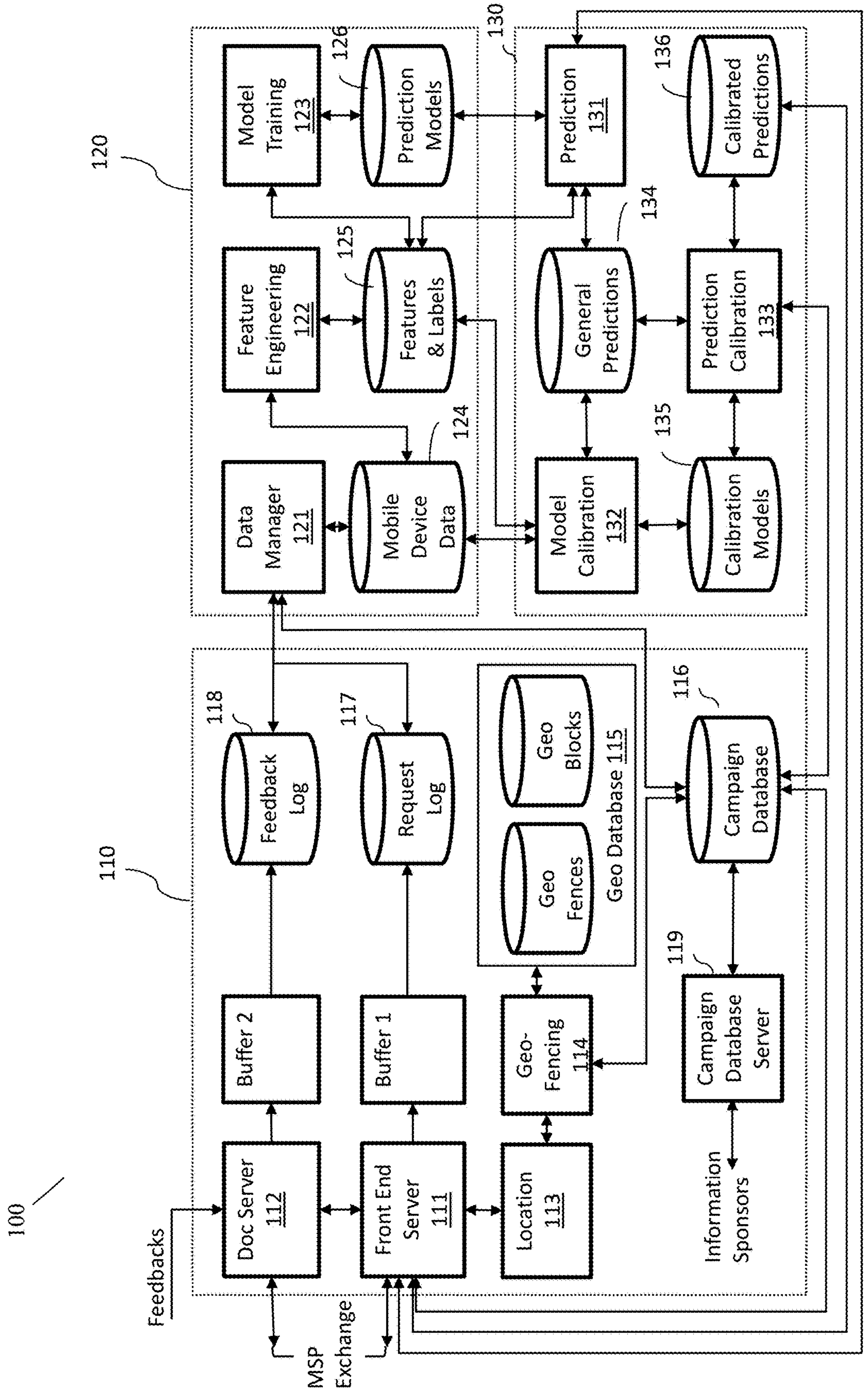
FIG. 1 is a diagrammatic representation of a system for location prediction according to embodiments.

A location prediction based information service system 100 according to some embodiments is shown in FIG. 1. The system 100 is coupled to a packet-based network and configured to serve information to mobile devices communicating with the packet-based network based on predicted probabilities of the mobile devices to have location events at certain locations within certain time frames. The system 100 comprises, among other things, a request processing unit 110, a model training unit 120, and a prediction unit 130. In certain embodiments, the system 100 is configured to perform one or more methods for calibrated location prediction, as described below.

In certain embodiments, the request processing unit 110 includes a front end server 111, a document server 112, a location module 113 and a geo-fencing module 114. The request processing unit 110 further includes or has access to a geo database 115 storing therein data associated with geo-places, and a campaign database 116 storing therein data associated with a plurality of information campaigns. The request processing unit 110 is configured to receive requests associated with mobile devices communicating with the packet-based network, to process the requests with respect to the geo places in the geo database 115 to detect location events of the mobile devices at any of the geo places, and to buffer and store the processed requests in a request log or database 117. In some embodiments, a processed request may include a detected location event corresponding to a time stamp and identifying a geo-place. The request processing unit 110 is further configured to retrieve information or documents associated with information campaigns from the campaign database 116 for delivering to mobile devices based on the processed requests associated with the mobile devices and predictions of the mobile devices to have location events at certain locations within certain time frames. The request processing unit 110 is further configured to receive feedbacks on impression, click/calls, and secondary actions made on the mobile devices in response to the information or documents, and to buffer and store the feedbacks in a feedback log or database 118. In some embodiments, the request processing unit 110 further includes a campaign database server 119 to provide information sponsors access to the campaign database 116.

In certain embodiments, the model training unit 120 includes a data manager 121 configured to generate structured mobile device data from the request log 117 and the feedback log 118 for storing in a mobile device database 124, a feature engineering module 122 configured to construct features and extract labels using the structured mobile device data and to store the features and labels in a features/labels database 125, and a model training module 113 configured to train prediction models using some of the features and labels and to store the trained models in a prediction models database 126.

In certain embodiments, the model training unit 120 is further configured to determine a relevance measure (or performance measure) for each of a plurality of geo-blocks with respect to the location group (or with respect to an information campaign) and to assign the plurality of geo-blocks into a number of geo-block brackets each corresponding to a distinct range of relevance measures (or performance measures). The model training unit 120 is further configured to construct the features related to a mobile device by generating features related to each of the number of geo-block brackets, generating features related to each of one or more most frequently visited geo-blocks for the mobile device, generating features related to each of a plurality of brands, and/or generating features related to each of the one or more retail geo-blocks, in additional to generating other features.

In certain embodiments, the geo-places include geo-blocks and geo-fences. Each of the geo-blocks correspond to a geographical region having at least one border defined by a public road or natural boundary. Each of the geo-fences correspond to a plurality of points of interest. The geo database 115 includes a geo-block database storing therein data associated with the geo-blocks and a geo-fence database storing therein data associated with the geo-fences. In certain embodiments, the location events include geo-block-based location events and geo-fence-based location events. Each geo-block-based location event is related to a geo-block in the geo-block database, and each geo-fence-based location event is related to a name or brand of a point of interest (POI) having a geo-fence in the geo-fence databases.

In certain embodiments, the prediction unit 130 includes a prediction module 131 configured to apply the prediction models to feature sets to obtain prediction results, which are stored in a general predictions database 134. The prediction results from the prediction module 131 are general prediction results and may need calibration with respect to specific information campaigns. In certain embodiments, the prediction unit 130 further includes a model calibration module 132 configured to train calibration models, which are then stored in a calibration models database 135. The prediction unit 130 further includes a prediction calibration module 133 configured to calibrate the general predictions to specific campaigns to generate calibrated predictions, which are stored in a calibrated predictions database 136 and are used by the front end server 111 to determine whether and how to present certain processed requests for fulfillment. In some embodiments, the model training module 123 and the model calibration module 132 are parts of a machine learning module (not shown).

Several aspects of the present disclosure directly improve computer functionality. For instance, embodiments of the present disclosure achieve faster location prediction with smaller memory and processing requirements by translating raw location data into location events with respect geo-fences and geo-blocks and by filtering and aggregating the location events across time and space for machine learning processes. In further embodiments, measures of relevance are computed for the geo-blocks using mobile device signals, and the measures of relevance are used to assign geo-blocks to geo-block brackets for proper dimension reduction and data clustering, resulting in efficient use of computer resources and improved location prediction performance. In further embodiments, calibration models are machine trained and used to calibrate general prediction results to specific campaigns, reducing the need to train different location prediction models for different campaigns, and saving time and computer resources. In further embodiments, a campaign similarity model is machine trained and used to determine similar historical campaigns for a current campaign so that the calibration models of the similar historical campaigns can be used to generate a calibration model for the current campaign. This reduces the need to machine train the calibration model for the current campaign, and allows the current campaign to have a location prediction model and a calibration model ready at the start.

Figure 2:
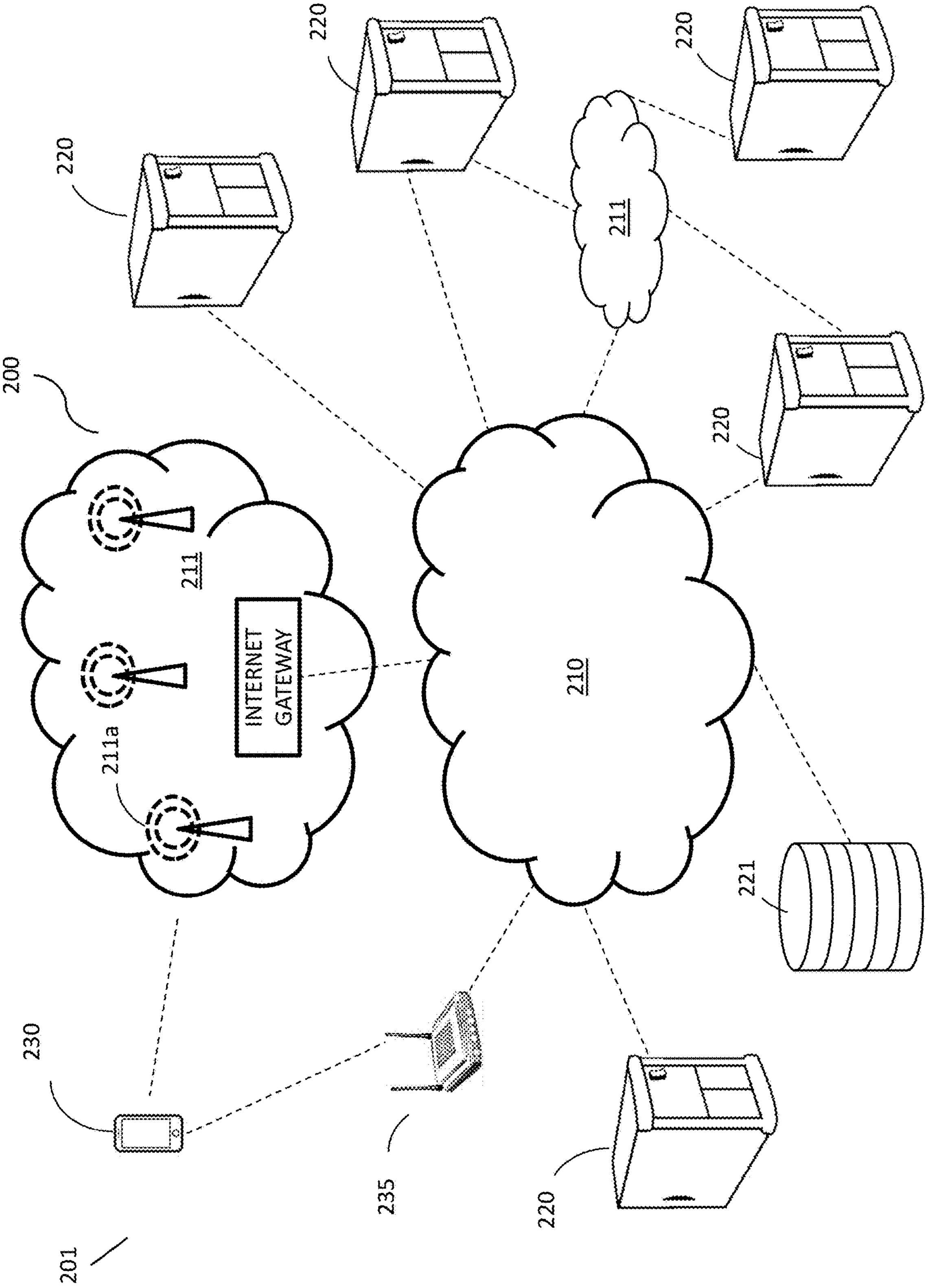
FIG. 2 is a diagrammatic representation of an environment in which the system for location prediction operates according to embodiments.

FIG. 2 is a schematic diagram illustrating an overview of an environment 201 in which some embodiments of the disclosed technology may operate. Environment 201 can include one or more computer systems 220 coupled to a packet-based network 200. The packet-based network 200 in certain embodiments includes the Internet 210 and part or all of a cellular network 211 coupled to the Internet 210 via an Internet Gateway. The computers/servers 220 can be coupled to the Internet 210 using wired Ethernet and optionally Power over Ethernet (PoE), WiFi, and/or cellular connections via the cellular network 211 including a plurality of cellular towers 211*a*. The network may also include one or more network attached storage (NAS) systems 221, which are computer data storage servers connected to a computer network to provide data access to a heterogeneous group of clients. As shown in FIG. 2, one or more mobile devices 230 such as smart phones or tablet computers are also coupled to the packet-based network via cellular connections to the cellular network 211. When a WiFi hotspot (such as hotspot 235) is available, a mobile device 230 may connect to the Internet 210 via a WiFi hotspot 235 using its built-in WiFi connection. Thus, the mobile devices 230 may interact with computers/servers 220 coupled to the Internet 210. A mobile device 230, or its user, or anyone or anything associated with it, or any combination thereof, is sometimes referred to herein as a mobile entity.

Figure 3:
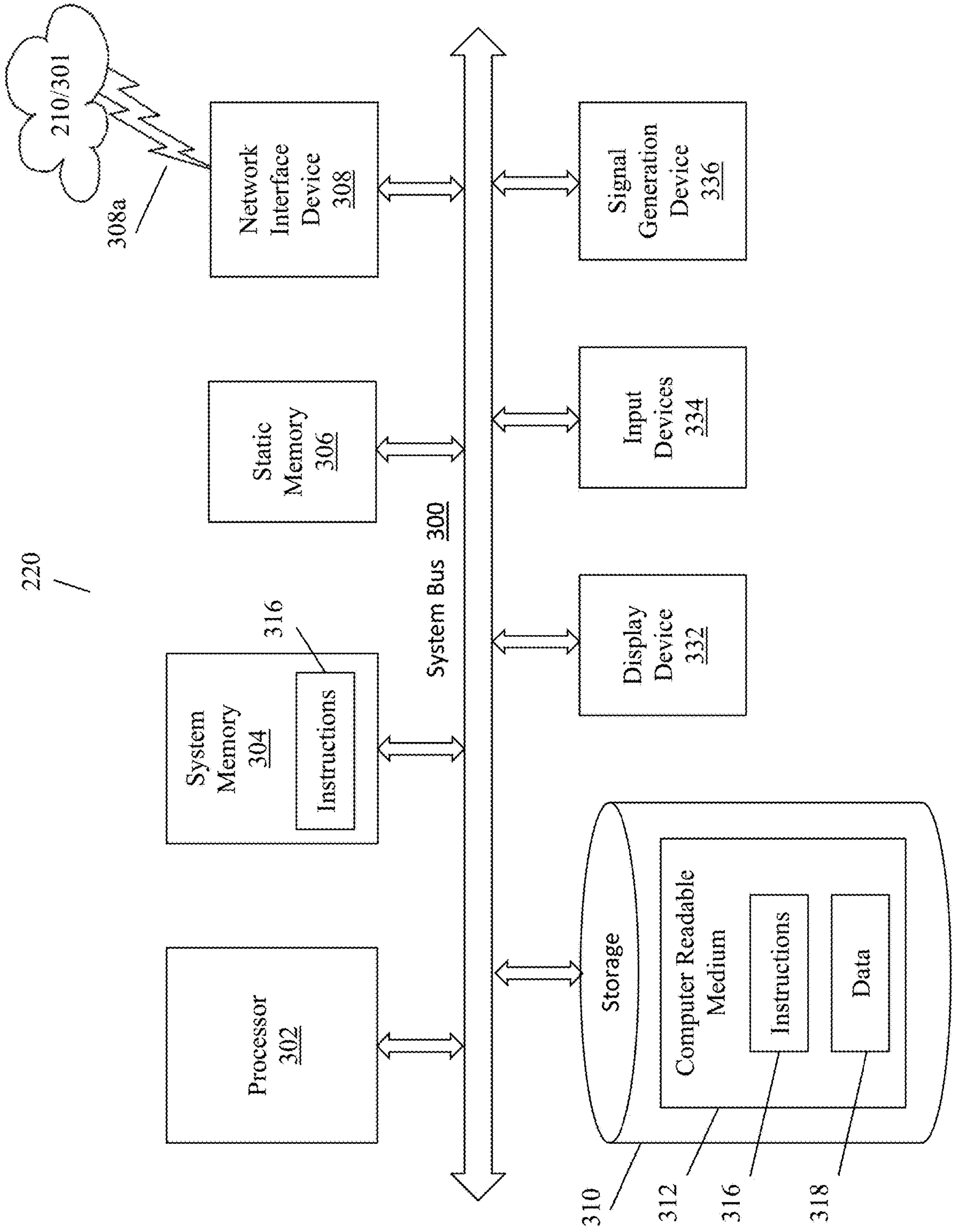
FIG. 3 is a diagrammatic representation of a computer/server that performs one or more of the methodologies and/or to provide part or all of the system for location prediction according to embodiments.

FIG. 3 illustrates a diagrammatic representation of a computer/server 220 according to certain embodiments. The computer/server 220 may operate as a standalone device or as a peer computing device in a peer-to-peer (or distributed) network computing environment. As shown in FIG. 3, the computer/server 220 includes one or more processors 302 (e.g., a central processing unit (CPU), a graphic processing unit (GPU), and/or a digital signal processor (DSP)) and a system or main memory 304 coupled to each other via a system bus 300. The computer/server 220 may further include static memory 306, a network interface device 308, a storage unit 310, one or more display devices 330, one or more input devices 334, and a signal generation device (e.g., a speaker) 336, with which the processor(s) 302 can communicate via the system bus 300.

In certain embodiments, the display device(s) 330 include one or more graphics display units (e.g., a plasma display panel (PDP), a liquid crystal display (LCD), a projector, or a cathode ray tube (CRT)). The input device(s) 334 may include an alphanumeric input device (e.g., a keyboard), a cursor control device (e.g., a mouse, trackball, joystick, motion sensor, or other pointing instrument). The storage unit 310 includes a machine-readable medium 312 on which is stored instructions 316 (e.g., software) that enable anyone or more of the systems, methodologies or functions described herein. The storage unit 310 may also store data 318 used and/or generated by the systems, methodologies or functions. The instructions 316 (e.g., software) may be loaded, completely or partially, within the main memory 304 or within the processor 302 (e.g., within a processor's cache memory) during execution thereof by the computer/server 220. Thus, the main memory 304 and the processor 302 also constitute machine-readable media.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

The location prediction system 100 according to certain embodiments can be implemented using one or more computers/servers 220 executing programs to carry out the functions and methods disclosed herein. It should be understood that the example embodiments described herein may be implemented in many different ways. In some instances, the various servers and/or modules in FIG. 1, e.g., the front end server 111, the document server 112, the location module, the campaign database server 119, the data manager 121, the feature engineering module 122, the model training module 123, the prediction module 131, the model calibration module 132, and/or the prediction calibration module 133, as described herein, may be implemented by one or more computers/servers 220, respectively or in various combinations. In some embodiments, the one or more computers/servers may be general purpose computers/servers that are transformed into the machines that execute the methods described herein, for example, by loading software instructions into one or more data processors, and then causing execution of the instructions to carry out the functions, processes, and/or methods described herein. As shown in FIG. 2, some of the computers/servers 220 are coupled to each other via a local area network (LAN) 210, which in turn is coupled to the Internet 210. Also, each computer/server 220 referred herein can include any collection of computing devices.

According to certain embodiments, as shown in FIG. 1, the system 100 includes a front-end server that receives requests from the packet-based network 200. These requests may be generated by one or more computers/servers 220 in the packet-based network as they provide mobile services to the mobile devices. In certain embodiments, the system 100 further includes a location module 113 coupled to the front-end server and configured to detect the location of a mobile device associated with each of the requests. In certain embodiment, the location module 113 is further configured to examine the location data in each received request to determine whether they include a reliable latitude/longitude (LL) pair, and if the request does not include a reliable LL pair, the location module 113 would proceed to derive the location of the associated mobile device from other information in the location data, as described in more detail in commonly owned U.S. Pat. No. 9,886,703, issued on Feb. 6, 2018, which is incorporated herein by reference in its entirety. The system 100 further includes a geo-fencing module 114 coupled to the location module 113 and configured to determine if the detected mobile device location triggers any geo-place(s) in a geo-database and returns the triggered geo-place(s) to the front-end server. In certain embodiments, the geo-places include geo-fences and geo-blocks, and the geo database 115 is a spatial database optimized for storing and querying data that represent geographical areas or spaces and may include spatial data and meta data associated with each of the geographical areas or spaces.

In certain embodiments, the geo-fences in the geo database 115 include spatial data representing virtual perimeters of defined areas or places that mirror real-world geographical areas associated with various entities and/or brands. A defined area according to certain embodiments can be a static circle around a business location, e.g. a fence obtained using offline index databases such as InfoUSA (www.infousa.com), which provides a list of POIs and their locations, or areas specified by marketers using predefined boundaries, such as neighborhood boundaries, school attendance zones, or parcel boundaries, etc.

Figure 4:
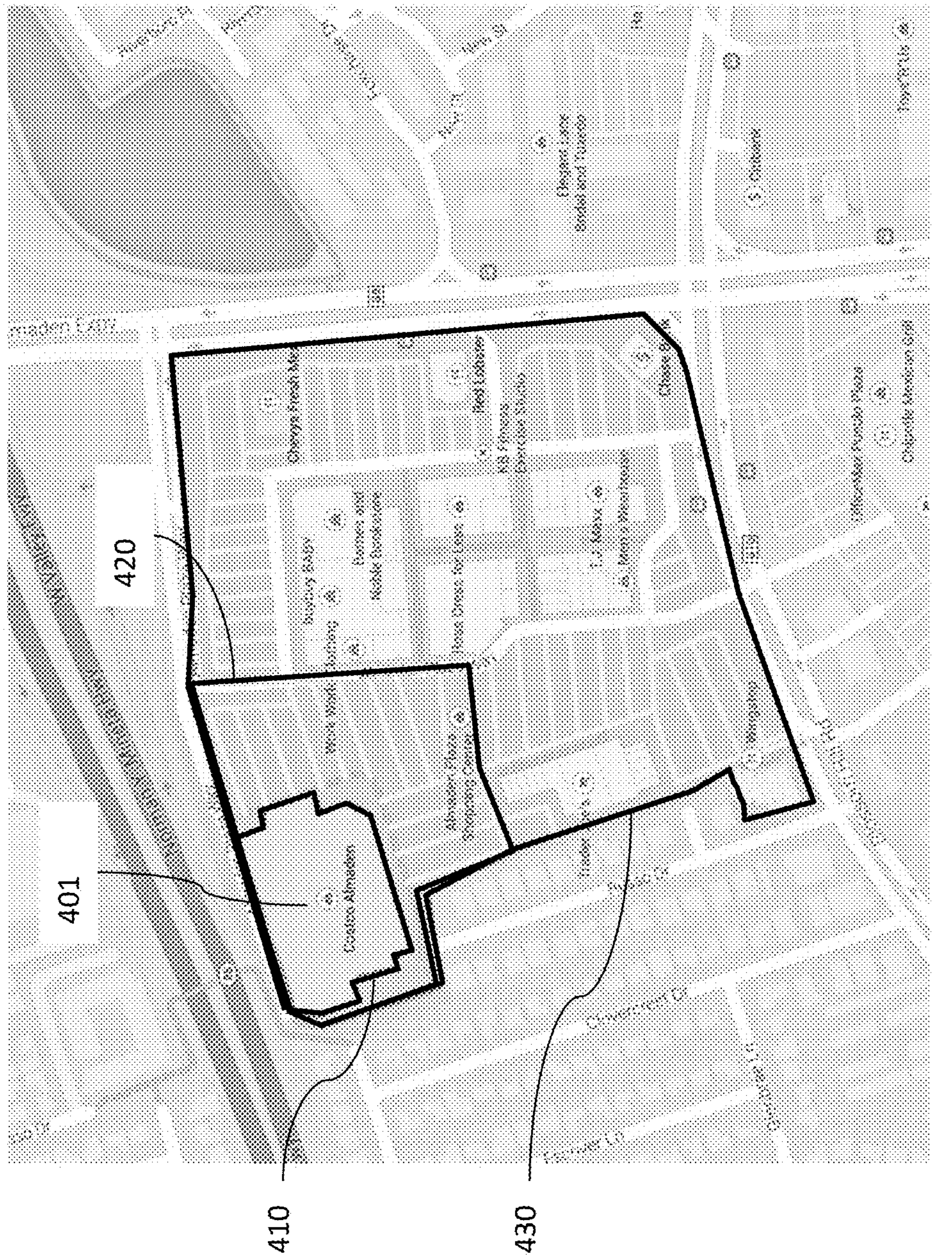
FIG. 4 is a map overlay illustrating exemplary polygonal premise geo-fences in a geographical region according to certain embodiments.

In certain embodiments, the defined areas include one or more geo-fences for each of a plurality of points of interests in consideration of the map data around the POI. For example, as shown in FIG. 4, one or more polygons are defined for the Costco Almaden store 401 to be in conformity with the real-world geographical structure and boundaries of the store and its surroundings, such as a first polygon 410 around the building of the store, a second polygon 420 around the building and its parking lot, and/or a third polygon 430 around a shopping area or business region including the store and other points of interests (POIs). In certain embodiments, these different types of geo-fences are defined for a point of interest (POI) to indicate different levels of intentions, interests, and/or behavior, etc., of a mobile user with respect to the POI, which can be used for location prediction purposes.

Thus, in certain embodiments, different types of geo-fences are associated with a business and may include, for example, (1) a business center (BC) represented by, for example, a polygon corresponding to the perimeter of the building of the business (e.g., the first polygon 410 in FIG. 4); (2) a business premise (BP) represented by a polygon corresponding to the perimeter of the business building and the neighboring parking lots (e.g., the second polygon 420 in FIG. 4); and (3) a business region (BR) or area represented by a polygon corresponding to the perimeter of a shopping center or business or commercial area in which this business is located (e.g., the third polygon 430 in FIG. 4). If a business center is triggered by a mobile device location, it can be reliably inferred that the user of the mobile device is interested in the business by actually visiting it. Triggering of a business premise provides good indication of an intent to visit the business, but not as strong as triggering the business center. If a user triggers a business region, the intent may be regarded as valid but weaker than that from triggering a business premise.

FIG. 5 illustrates examples of some of the geo-fences in the geo database 115, according to certain embodiments. As shown, the site Costco in Almaden has three different types of geo-fences associated with it—geo-fence with Fence ID 19-35175 corresponds to a business center (BC), which is defined by a polygon around the store building and represented by spatial index a1, a2, . . . , ai; geo-fence with Fence ID 19-35176 corresponds to a polygon around the site's larger premise including its parking lot and represented by spatial index b1, b2, . . . , bj; and geo-fence with Fence ID 19-35177 corresponds to polygon around the shopping center including the store and other POIs and represented by spatial index c1, c2, . . . , ck. Note that geo-fence with Fence ID 19-35177 is also associated with the names/brands of other POIs in the shopping center, as well as name of the shopping center itself. FIG. 5 also shows that the site T.J. Maxx is associated with Fence ID 19-35177 and also has two other types of fences associated with it, and the site Trader Joe's is also associated with Fence ID 19-35177 and has at least a business center place associated with it. As shown in FIG. 5, each geo-fence entry in the geo database 115 includes the spatial data associated with the respective place together with some meta data about the respective place, such as, for example, one or more names/brands associated with the place, a category of the place, a place identifier identifying a particular locale (e.g., city, district, etc.) for the place, the place type, and/or one or more doc IDs identifying one or more information documents (e.g., one or more html/JavaScript files) associated with the names/brands or the place. In most cases, a POI's name is established as its brand, so they are used interchangeably. For ease of discussion, the brand of a POI is referred to hereafter as either the name or the brand of the POI, whichever is associated with the POI in the geo-fence database.

Figure 6:
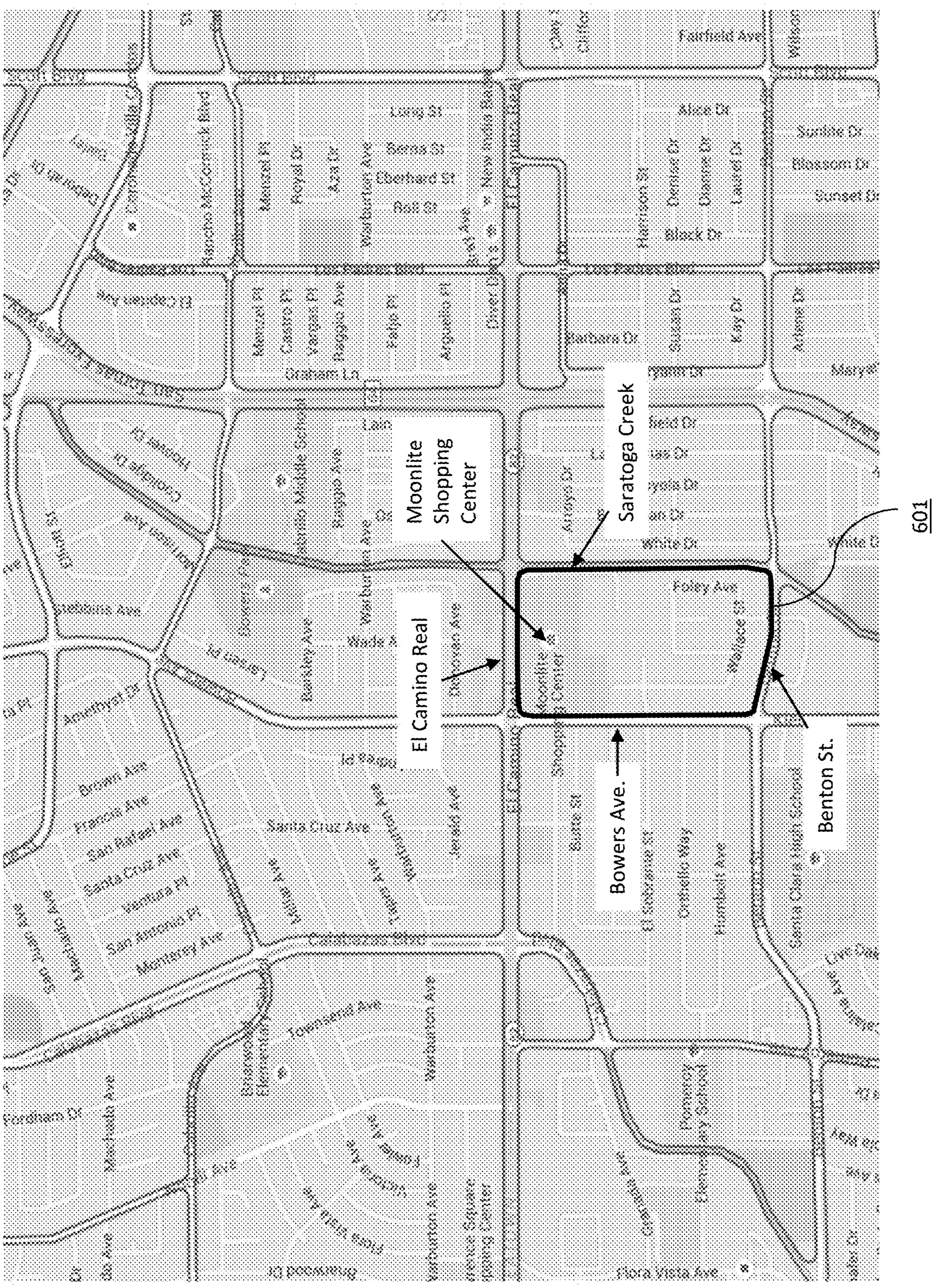
FIG. 6 is a map overlay illustrating exemplary geo-blocks in a geographical region according to certain embodiments.

In certain embodiments, the geo-blocks in the geo database 115 represent geographical regions with natural boundaries such as major roads, shorelines, mountain ranges, etc., as described in further detail below. FIG. 6 illustrates graphically exemplary geo-blocks according to certain embodiments. In this example, for an area in the city of Santa Clara, Calif., the geo-blocks are shown as outlined in boundaries overlaid on top of a map for the area, taken from, for example, Google Map, and the boundaries of the geo-blocks are mostly aligned with major roads and natural boundaries, taking into account the road width so as to exclude mobile signals from travelers on the major roads.

For example, geo-block 601 containing the Moonlite Shopping Center is shown to be bordered on three sides by major roads, El Camino Real, Bowers Ave, and Benton St., respectively, and on another side by the Saratoga Creek. Each of the geo-blocks shown in FIG. 6 can be further partitioned into more granular blocks bordered by smaller roads. Real world entities present in these geo-blocks tend to serve common functional purposes (residential, retail etc.), and these blocks form the foundation for the construction of boundaries that are highly indicative of location dependent attributes such as intention and demographics. FIG. 7 illustrates examples of some of the geo-blocks in the geo database 115, according to certain embodiments. As shown, each geo-block includes spatial data defining the boundary of the geo-block and meta data including, for example, the city/state in which the geo-block is located, the functionality of the geo-block (e.g., residential, retail, recreational, educational, etc.), one or more major POIs in the geo-block, as well as other information such as demographic of the residents or visitors of the geo-block, and inventory of requests with location data in the geo-block, etc., which can be derived from logged request data.

Figure 8A:
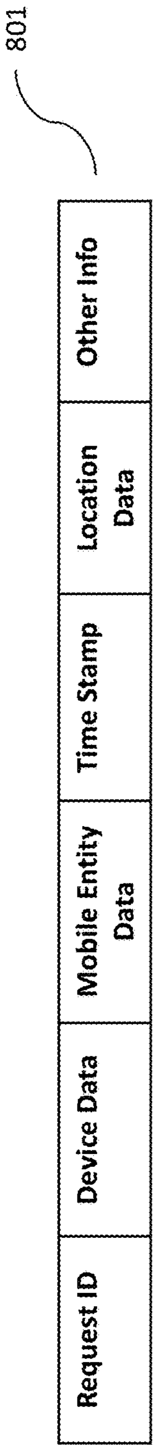
FIGS. 8A-8C are block diagrams illustrating request data at different stages of processing according to certain embodiments.

In certain embodiments, as shown in FIG. 8A, the front-end server receives a request 801 presented by, for example, a server run by a mobile service provider (MSP or MSP server), or an ad exchange (or exchange), via the network 200. The request 801 includes a request ID, mobile device data such as mobile device ID, maker/model, operating system, etc., mobile entity data such as user ID (UID), age, gender, income bracket, education level, etc., mobile device location data including a plurality of location components, such as latitude and longitude coordinates (LL), IP addresses (IP), postal or zip codes (ZC), and/or city-state names (CS), etc. The request may further include other information. In certain embodiments, the front-end server validates the location information by checking the validity and consistency of the location components and by weeding out any invalid location component(s). Generally, the LL is usually believed to be the most useful location component. However, when a mobile entity doesn't allow its location information to be known, mobile applications at the MSP server typically provide only coarse location data in the form of, for example, an IP address, a ZC (e.g. entered by the user at the time of registration), or CS. Thus, mobile applications at the MSP server frequently provide LLs obtained from geocoding software, which translates ZC, CS, and other points of interests into one representative LL. In one embodiment, such representative LLs are categorized as "bad LLs". A bad LL can be, for example, a centroid of a ZC/CS, or any fixed point on a map (e.g. (0,0) or an arbitrary location).

In certain embodiments, the location module 113 is configured to weed out the bad LL's, so that location data with bad LL's are not provided to the next stage processing, by using the techniques disclosed in commonly owned U.S. patent application Ser. No. 14/716,816, entitled "System and Method for Estimating Mobile Device Locations," filed on May 19, 2015, which is incorporated herein by reference in its entirety.

Figure 8B:
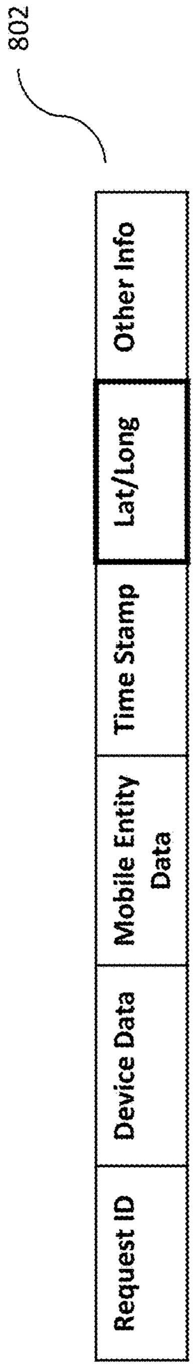
Figure 8C:
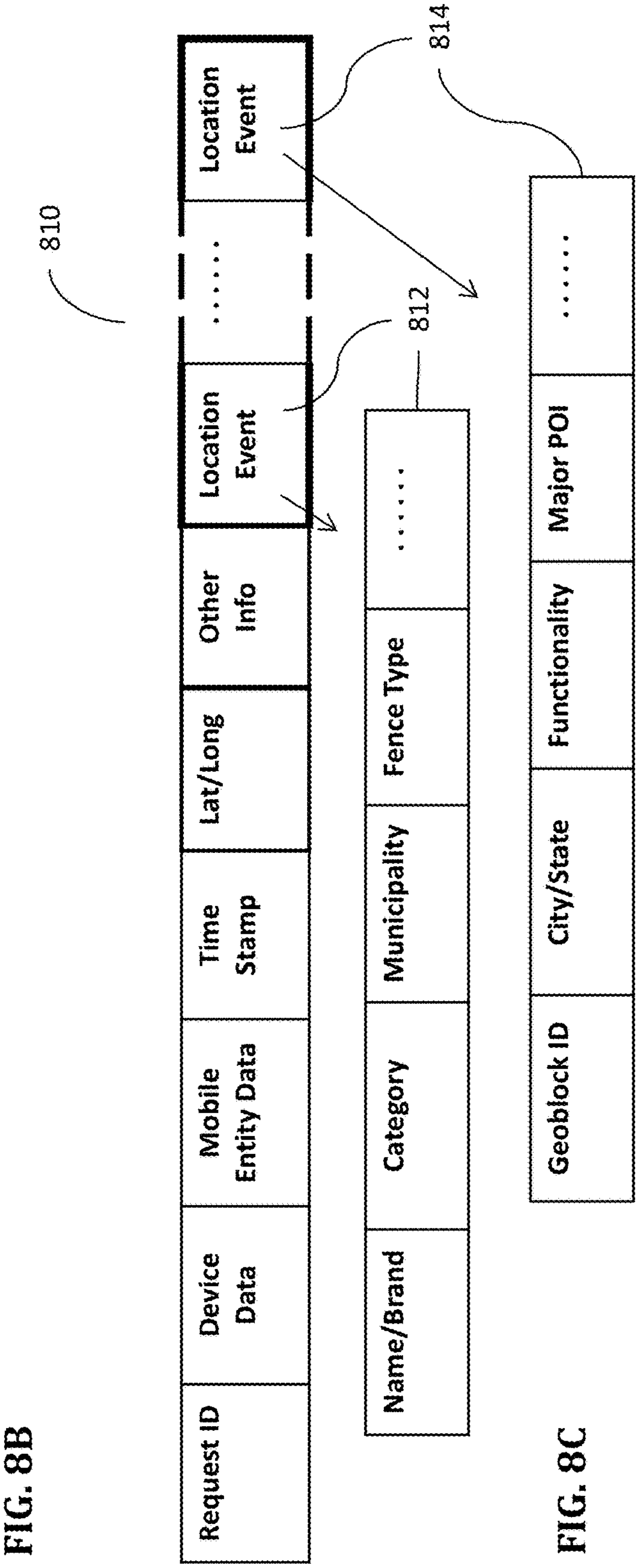

The location module 113 is further configured to estimate the location of the mobile device from the request 801 and generate location data to represent an estimated mobile device location, which may be a geographical point represented by a lat/long pair or one or more probable areas or regions the mobile device is estimated to be in, as shown in processed request 802 with generated location data in FIG. 8B. The geo-fencing module 114 queries the geo database 115 with the lat/long pair or the one or more probable regions to determine whether the location data triggers one or more geo-places in the geo database 115, and returns the triggered geo-place(s) to the front-end server. In certain embodiments, the front end server 111 annotates the request 801 with the triggered geo-place(s) to generate an annotated (or processed) request 810, and outputs the annotated request 810 to buffer 1, which buffers and outputs the annotated request 810 to a request log 117. The triggered geo-place(s) may include a geo-block (if the mobile device is in a place that has been geo-blocked) and may further include one or more geo-fences if the estimated location or probable area or region is in or overlaps with the one or more geo-fences, as shown in FIG. 8C. For ease of description, the triggering of a geo-place (e.g., a geo-block or a geo-fence) is sometimes referred to herein as a location event. So, an annotated request may include one or more location events.

FIG. 9 is a table illustrating exemplary entries (or datasets) in the request log 117, according to certain embodiments. Each dataset in the request log 117 corresponds to a respective processed (or annotated) request and includes at least some of the data in the respective annotated request, such as request (or packet) ID, mobile device information such as mobile device ID, make/model, mobile user information such as UID, age, gender, education, etc., a latitude/longitude pair, data related to location events involving triggered geo-fence(s) and/or a geo-block, mobile application used at the time of the request, and the time stamp of the request, etc. In some embodiments, the annotated requests in the request log 117 are organized in the order of their respective time stamps, as shown in FIG. 9.

In certain embodiments, as shown in FIG. 8A and FIG. 9, the request 801 received by the front-end server includes other information as well as the location information, such as an application program running on the mobile device, a time stamp indicating the time of the request (e.g., day, hour, minute, etc.), one or more keywords suggesting types of information for returning to the mobile device, and/or other information associated with the mobile user, the mobile device, and/or the MSP. In some cases, the location data can trigger multiple places. For example, as shown in FIG. 4, a request that triggers the BC place 410 of Costco Almaden also triggers the BR place 430 of any of the POIs in the same business region as well as the geo-fence for the business region (e.g., a retail center or shopping mall). Thus, the request may be annotated with the BR place of one or more other POIs in the same business region, as well as the BC place of Costco Almaden. For the business region itself, the BR place may be the only geo-fenced place associated therewith, so the business region is triggered as long as the associated BR place is triggered.

Each location event involving a triggered geo-fence or a triggered geo-block is included in the annotated request together with information about the triggered geo-fence or geo-block. If a request triggers multiple places associated with a brand, only the smallest of the places (e.g., the BC or the BP place) is included as a location event. As shown in FIG. 8C, some or all of the meta data 812 of a triggered geo-fence and some or all of the meta data 814 of the triggered geo-block can be included in the annotated request 810.

In some embodiments, the front end server 111 in system 100 is further configured to evaluate the annotated request 810 with respect any of one or more information campaigns running in the system 100, and with respect to related location prediction generated by the prediction unit 130, and to determine whether to present the request 801 for fulfillment. In some embodiments, the front end server 111 presents the request for fulfillment by placing a bid for the request 801 at the exchange or MSP, and, in the case the bid is accepted, transmitting the annotated request 810 to the document (or information) server in the system 100. In certain embodiments, the front end server 111 has access to the location predictions stored in a calibrated predictions database 136 in the prediction unit 130.

In some embodiments, the document (or information) server is configured to receive the annotated request 810 output from the front-end server and to determine which document to select based on the location data and non-location data in the annotated request. The selected document is then transmitted by the document server 112 to the MSP server (or ad exchange) via the network 200. In certain embodiments, the information server is a computer server, e.g., a web server, backed by a campaign database server 119 that information sponsors use to periodically update the content thereof and may store information documents. Each of the information documents may be stored in a campaign database 116 in the form of, for example, an html/JavaScript file or a link thereto, which, when loaded on a mobile device, displays information in the form of, for examples, a banner (static images/animation) or text. In certain embodiments, the document server 112 evaluates the annotated request 810 based on the location predictions generated by the prediction module 130.

In certain embodiments, the document selected for transmission to the MSP can be provided in the form of, for example, an html/JavaScript file, or a link to a universal resource location (URL), which can be used by the MSP or a mobile device to fetch the html/JavaScript file. The html/JavaScript file, once displayed or impressed on a mobile device, may also include one or more links that an interested user can click to access a webpage or place a call using the mobile device. The webpage enables the user of the mobile device to take secondary actions such as downloading an app or make an on-line purchase.

In certain embodiments, the html/JavaScript file is designed such that when it is displayed or impressed on a mobile device, a signal is sent by the MSP server or the mobile device automatically to the document server 112 either directly or via another server (e.g., the MSP server so that the document server 112 can keep track of whether the file has really been impressed on the mobile device. In certain embodiments, mechanism are also put in place such that when any of the one or more links are clicked, or when the mobile user download an app or make a purchase from a linked webpage, a signal is also sent from the mobile device to the document server 112 in the background either directly or indirectly so that the document server 112 can keep track of the clicks/calls or secondary actions made in response to the impression. The document server 112 provides data of such feedback events (i.e., impressions, clicks/calls, and secondary actions) to buffer 2, which buffers and outputs the data to a feedback log 118. FIG. 10 is a table illustrating exemplary entries (or datasets) in the feedback log 118 in the ordered of their respective time stamps, according to certain embodiments.

Thus, raw location data in requests are converted into brands and geo-blocks in processed requests. The logged data in the requests log and the feedback log 118 collected over a period of time (e.g., six months) form a large collection of mobile device data (e.g., millions and millions of annotated requests and impression/click/call events). The dimensions of these data are usually too large to be used directly for meaningful location prediction. In certain embodiments, the model training unit 120 is configured to reduce the dimensions of the logged data by extracting features and labels from the location data, to train one or more prediction models using the features and labels, and to apply the prediction models to an appropriate feature space to obtain off-line predictions. As shown in FIG. 1, the model training unit 120 includes a data manager 121, a mobile device data database 124, a feature engineering module 122, a features/labels database 125, a model training module 123, and a prediction models library.

Figure 11:
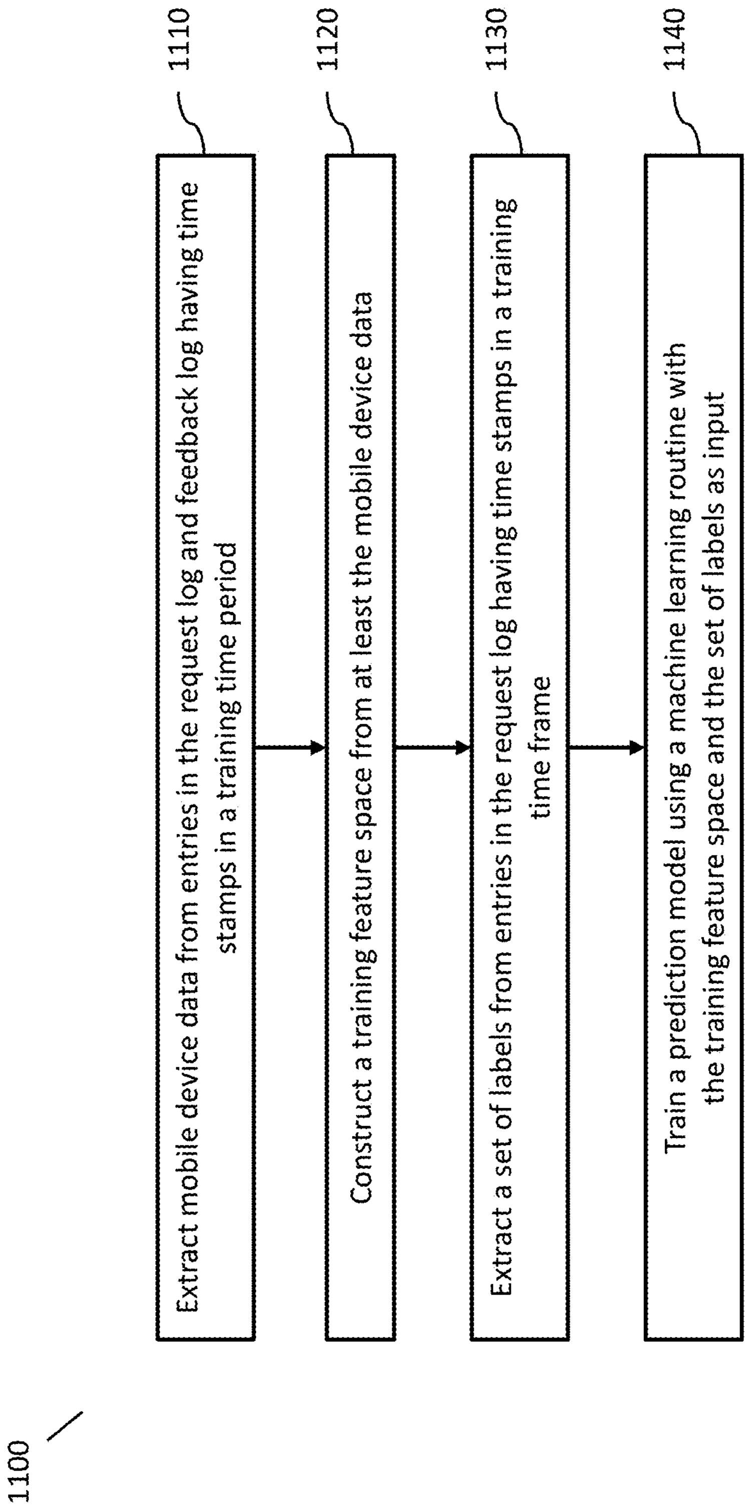
FIG. 11 is a flowchart illustrating a method of machine training a location prediction model according to come embodiments.

In certain embodiments, the model training unit 120 is configured to perform a method 1100 for training a location prediction model off line, while the front end server 111 continues to receive and process incoming requests. As illustrated in FIG. 11, method 1100 includes extracting (1110) mobile device data from datasets in the request log and feedback log having time stamps in a training time period, constructing (1120) a training feature space from at least the mobile device data, extracting (1130) a set of labels from datasets in the request log having time stamps in a training time frame, and training (1140) a prediction model using a machine learning routine with the training feature space and the set of labels as input.

In some embodiments, the data manager 121 is configured to extract mobile device data corresponding to location events in a certain time period (e.g., training time period TTP shown in FIG. 12A) from datasets in the request log 117 having time stamps in the corresponding time period. In certain embodiments, as shown in FIG. 13, the data manager 121 includes a search engine configured to search, for each mobile device of a plurality of mobile devices, processed requests associated with the mobile device and having time stamps in a time period (e.g., TTP), and a buffer configured to buffer the output from the search engine. The data manager 121 further includes a compressor configured to compress the buffered data, such that multiple location events corresponding to consecutive time stamps triggered by the mobile device at the same place within a preset time interval (e.g. 1 hour), are reduced to a single location event. For example, if a mobile device triggered the same geo-fence and the same geo-block at different times that are within one hour of each other, resulting in multiple location events related to the geo-fence or the geo-block, the multiple events are reduced to a single event to indicate a single visit by the mobile devise to the triggered geo-fence or geo-block at one of the time stamps (e.g., the earliest time stamp) with a duration computed using the difference between the earliest time stamp and a latest time stamp within an hour from the earliest time stamp. Another location event by the mobile device at the same place but with a time stamp beyond the preset time interval from the earliest time stamp would be considered another visit to the place by the mobile device, even though the mobile device may have stayed at the same place during the whole time.

In certain embodiments, the search engine can be configured to only search for location events with certain types of geo-fences depending on the associated brands. For example, for certain brands, only location events with triggered BC places are considered as visits to these brands/names, for certain other brands, location events with triggered BP places are sufficient to be considered as visits to these brands, and for some brands, such as retail centers or shopping malls, location events with triggered BR places are considered as visits to these brands.

The data manager 121 further includes another buffer that stores the compressed location events for the mobile device, and an aggregator configured to aggregate the location events to form a set of mobile device data corresponding to location events in the time period TTP for the mobile device. As shown in FIG. 14, the mobile device data 1410 for the mobile device with the UID 36*412 may include, for example, device and user meta data such as age, gender, education level, and other information such as maker/model, operating system, etc., aggregated location events associated with each geo-block triggered by the mobile device during the time period TTP, aggregated location events associated with each brand triggered by the mobile device during the time period TTP, aggregated feedback events associated with one or more documents impressed on the mobile device during the time period TTP, and aggregated usage data associated with mobile applications used on the mobile device during the time period TTP. In certain embodiment, a brand is triggered when a location event 812 includes the brand. Or, if the brand uses multiple types of fences, as described above, the brand is triggered when a location event 812** includes the brand and the fence type specified for the prediction model to be trained.

In certain embodiments, aggregated location events associated with each triggered geo-block (e.g., GBx) or brand (e.g., Bx) includes, for example, a number of visits to the geo-block or brand during the time period TTP, time of last visit during TTP, average length of stay per visit, etc. In certain embodiments, the number of visits to the geo-block or brand is divided among a plurality of time blocks (shown as TB1, TB2, TB3) during a day, such as morning (6:00 am to 12:00 pm), afternoon (12:00 pm to 6:00 pm) and evening (6:00 pm to 6:00 am). Likewise, usage data associated with each mobile application used on the mobile device during the time period TTP are aggregated likewise. The aggregated feedback events associated with each of one or more documents (e.g., Docx) impressed on the mobile device during the time period TTP may include, for example, a number of impressions of the document made on the mobile device during TTP, a number of click/calls the mobile device made on the impressed document, and a number of secondary actions taken with the mobile device in response to the impressed document. These numbers can also be divided among the different time blocks.

The data manager 121 is configured to perform the above searching, compression, and aggregation processes for each of the plurality of mobile devices and to store the compressed and aggregated data for the plurality of mobile devices in the mobile device database 124. In certain embodiment, as shown in FIG. 14, to reduce storage space in the mobile device database 124, the compressed and aggregated data for each mobile device (e.g., mobile device with UID 36*412) and for each time period (e.g., time period TTP) is stored as a text string 1420 in the mobile device database 124**.

Since there can be thousands of different geo-blocks and brands, and different mobile devices trigger different geo-blocks and brands, the dimensions of the mobile device data in the mobile device database 124 are often too large, and the related data points are often too sparse to be used directly to train prediction models by machine learning. In certain embodiments, the model training unit 120 further includes a feature engineering module 122 configured to engineer a set of features for a location group corresponding to each of the plurality of time periods according to a feature engineering process 1500 illustrated in FIG. 15. For example, the feature engineering module 122 is configured to construct a training feature space for the location group using at least the mobile device data corresponding to the training time period TTP. In certain embodiments, the location group includes one or more locations selected for prediction. The one or more locations may correspond to, for example, one or more geo-fences associated with, for example, one or more brands or one or more categories in the geo database 115.

Figure 15:
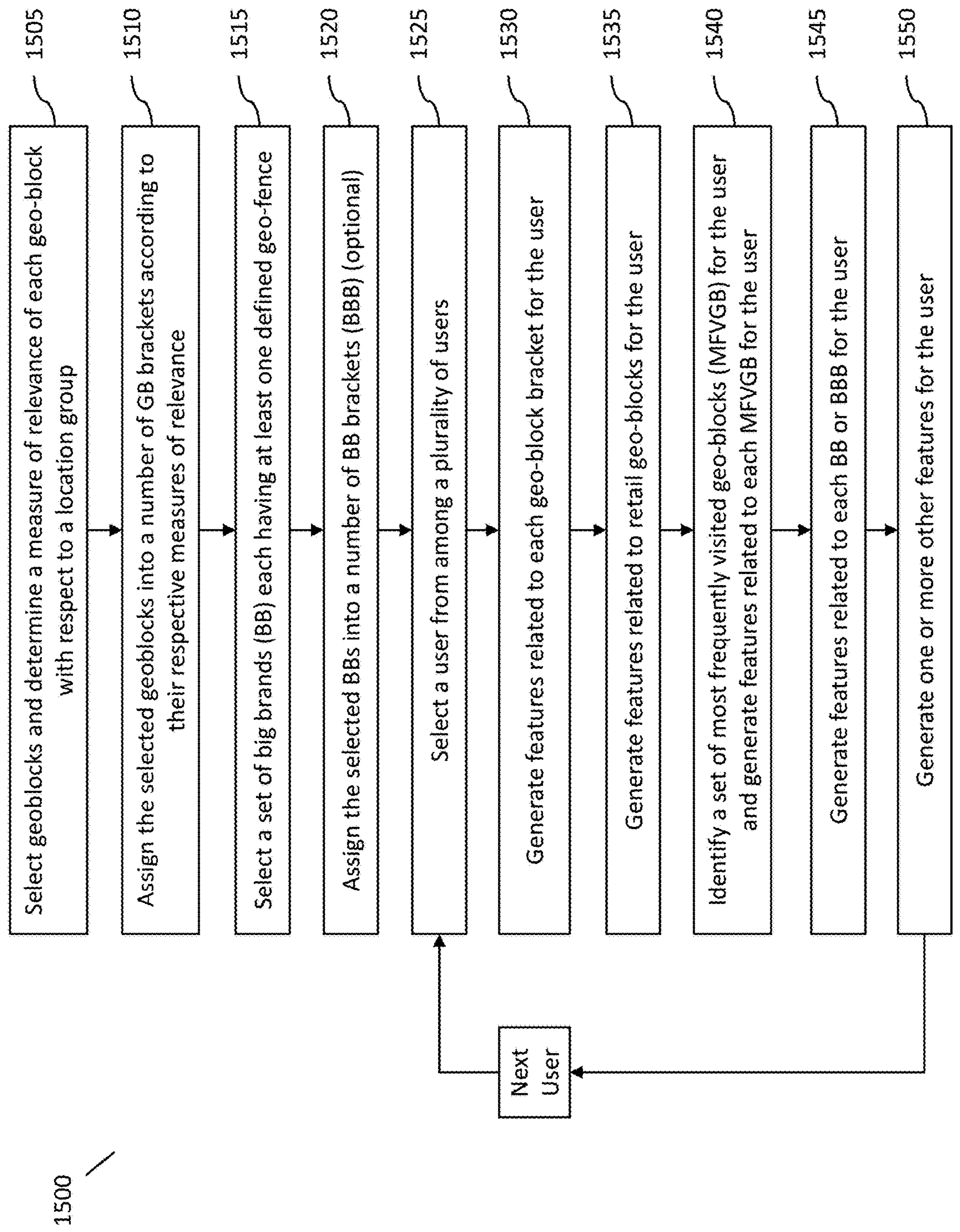
FIG. 15 is a flowchart illustrating a method for building a feature space according to certain embodiments.

As shown in FIG. 15, to construct the training feature space for a location group, the feature engineering module 122 is configured to select a set of geo-blocks and determine a relevance measure for each of the geo-blocks with respect to the location group, as recited in block 1505 of process 1500 illustrated in FIG. 15. The relevance measure (or performance measure) for a geo-block can be determined using a variety of relevance or performance metrics, as discussed in further detail below. For example, the relevance measure for the geo-block with respect to a location group can be determined using a first number of distinct mobile devices that triggered the geo-block during a pre-selected time period and a second number of the mobile devices that triggered the geo-block and also triggered the brand or category associated with any of the locations in the location group during the same time period. The relevance measure can simply be a ratio of the second number to the first number or some other combination of the two numbers and/or other factors. The first number and the second number can be determined using logged request data or extracted mobile device data. Other examples of determining the relevance measures (or performance measures) are provided in commonly-owned U.S. patent application Ser. No. 15/999,330, filed Aug. 17, 2018, now U.S. Pat. No. 10,278,014, which is incorporated herein by reference in its entirety.

In certain embodiments, the feature engineering module 122 is further configured to assign the selected geoblocks into a number of geo-block (GB) brackets according to their respective relevance measures (or performance measures), as recited in block 1510 of process 1500 illustrated in FIG. 15. In certain embodiments, the selected geo-blocks are divided into a number of geo-block brackets each corresponding to a distinct range of relevance measures (or performance measures). For example, suppose there are 2000 selected geo-blocks, which can be all of the geo-blocks in one or more targeted geo-graphical regions, and there are 20 geo-block brackets (e.g., GBB1, GBB2, . . . , GBB20), the geo-blocks in GBB1 could include 100 geo-blocks with the highest relevance or performance measures, the geo-blocks in GBB2 could include 100 geo-blocks with the next highest relevance or performance measures, and so on. Assigning the geo-blocks into geo-block brackets largely reduces the data dimensions.

In certain embodiments, the feature engineering module 122 is further configured to select a set of brands, which may be, for example a set of relatively big brands (BB) that have sizable visits by mobile users to allow sufficient density of data, as recited in block 1505 of process 1500 illustrated in FIG. 15. Depending on how many brands are selected, the feature engineering module 122 may be further configured to assign the selected big brands into a number of big brand (BB) brackets according to their respective measures of relevance, as recited in block 1520 of process 1500 illustrated in FIG. 15. The feature engineering module 122 may be configured to determine the relevance measure for each selected brand with respect to the location group. The relevance measure for a brand can be determined using a third number of distinct mobile devices that triggered the brand during a pre-selected time period and a fourth number of the mobile devices that triggered the brand and also triggered a brand associated with any of the locations in the location group during the same time period. The relevance measure can simply be a ratio of the fourth number to the third number or some other combination of the two numbers and/or other factors. The third number and the fourth number can be determined using logged request data or extracted mobile device data.

In certain embodiments, the selected brands are divided into a number of big brand brackets (BBB) each corresponding to a distinct range of relevance measures. For example, suppose there are 1000 selected brands, and there are 20 big brand brackets (e.g., BBB1, BBB2, . . . , BBB20), the brands in BBB1 could include 50 brands with the highest performance measures, the brands in BBB2 could include 50 geo-blocks with the next highest performance measures, and so on. Selecting the big brands and optionally assigning them to the big brand brackets further reduces the data dimensions.

The feature engineering module 122 is further configured to construct a set of features for each of the plurality of mobile devices using the mobile device data associated with the mobile device and corresponding to the training time period TTP. As shown in FIG. 15, the feature engineering module 122 is configured to: select a user from among a plurality of users (block 1525 of process 1500), generate features related to each geo-block bracket for the user (block 1530 of process 1500), generate features related to retail geo-blocks for the user (block 1535 of process 1500), identify a set of most frequently visited geo-blocks (MFVGB-1, . . . , MFVGB-n) for the user and generate features related to each of the MFVGBs for the user (block 1540 of process 1500), generate features related to each BB or BB bracket (BBB) for the user (block 1545 of process 1500), and generate one or more other features for the user (block 1550 of process 1500). In certain embodiments, the set of MFVGBs may include a MFVGB from each of a plurality of geo-block functionalities, such as retail, residential, industrial, etc. Thus, the MFVGBs may include a residential MFVGB, which could be the home of the mobile user, an industrial MFVGB, which could be the workplace of the mobile user, and a retail MFVGB, which may be where the individual does most of the shopping, etc.

FIG. 16 illustrates as examples a set of features for a mobile device with UID 52256 for the time period TTP. As shown in FIG. 16**, the set of features may include device/user meta data. The features related to each GBB of the geo-block brackets ($GBB_1$, $GBB_2$, . . . , $GBB_m$) include a number of visits to any geo-block in the GBB during the time period TTP, time of last visit to any geo-block in the GBB during TTP, an average length of stay per visit to any geo-block in the GBB during TTP, etc. In certain embodiments, the number of visits to the GBB is divided among a plurality of time blocks (shown as TB1, TB2, TB3) during a day, such as morning (6:00 am to 12:00 pm), afternoon (12:00 pm to 6:00 pm) and evening (6:00 pm to 6:00 am).

Likewise, the features related to each BB or BBB of the big brands ($BB_1$, $BB_2$, . . . , $BB_m$) or big brand brackets ($BBB_1$, $BBB_2$, . . . , $BBB_m$) include a number of visits to the BB or any brand in the BBB during the time period TTP, time of last visit to the BB or any brand in the BBB during TTP, an average length of stay per visit to the BB or any brand in the BBB during TTP, etc. In certain embodiments, the number of visits to the BB or any brand in the BBB is divided among a plurality of time blocks (shown as TB1, TB2, TB3) during a day, such as morning (6:00 am to 12:00 pm), afternoon (12:00 pm to 6:00 pm) and evening (6:00 pm to 6:00 am).

A retail geo-block is a geo-block having a retail functionality, as indicated by its associated meta data. In certain embodiments, the features related to the retail geo-blocks among the selected geo-blocks include a number of weighted visits and a number of net visits. The number of net visits is the number of visits made with the mobile device to any of the retail blocks within the time period TTP, as determined using the mobile device data associated with the mobile device and corresponding to the TTP. The number of weighted visits is the weighted sum of a number of visits to each of the retail geo-blocks multiplied by a weight of the retail geo-block. The weight of the retail geo-block can be computed based on a fifth number of distinct mobile devices that triggered the retail geo-block during a pre-selected time period and a sixth number of the mobile devices that triggered the retail geo-block and also triggered a brand associated with any of the locations in the location group during the same time period. The weight can simply be a ratio of the sixth number to the fifth number or some other combination of the two numbers and/or other factors. The sixth number and the fifth number can be determined using logged request data or extracted mobile device data.

In certain embodiments, the most frequently visited geo-block (MFVGB) is the geo-block that has the most number of visits from the mobile device compared to the other selected geo-blocks. The features associated with the MFVGB can include for example, a number of visits to the MFVGB by the mobile device during the time period TTP, and the distance from the MFVGB to a nearest location among the locations in the location group. In certain embodiments, the number of visits to the MFVGB is divided among a plurality of time blocks (shown as TB1, TB2, TB3) during a day, such as morning (6:00 am to 12:00 pm), afternoon (12:00 pm to 6:00 pm) and evening (6:00 pm to 6:00 am).

In certain embodiments, the set of features for the mobile device may include other features, such as mobility features and feedback features. The mobility features may include, for example, a number of distinct brands triggered by the mobile device during the time period TTP, and a GB ratio of a number of distinct geo-blocks triggered by the mobile device to the sum of visits to all of the triggered geo-blocks during the time period TTP. The feedback features may include, for example, pre-exposure feature, which may be a number impressions of one or more documents related to the location group on the mobile device during the time period TTP, a click/call ratio, which may be the ratio of a number of times a click is made on the mobile device in response to the one or more documents to the number of impressions of the one or more documents, and a secondary action ratio, which may be the ratio of a number of times secondary actions are made on the mobile device in response to the one or more documents to the number of impressions of the one or more documents.

The sets of features for all of the plurality of mobile devices together form a feature space. The feature space corresponding to the time period TTP is referred to herein as the training feature space.

In certain embodiments, the feature generator is further configured to extract a set of labels corresponding to a time frame (e.g., TTF shown in FIG. 12A) immediately or shortly after the training time period TTP, for the plurality of mobile devices. For example, TTP can be the past 1-3 months from the day on which the training feature space is constructed, and TTF can be the next 1-2 weeks from the day on which the training feature space is constructed. Note that the beginning of TTF and the end of TTP do not have to coincide. For example, they can be up to a day or a few days apart from each other. The set of labels can be extracted from location events in the processed requests having time stamps in the time frame. In certain embodiments, the set of labels include one label for each of the plurality of mobile devices and the label is a "1" or "0" depending on whether the mobile device has triggered a geo-fence or brand associated with the location group during the time frame, as shown in FIG. 17A.

As shown in FIG. 1, the model training unit 120 further includes a model training module 123 configured to employ machine learning approaches to train a prediction model using the training feature space and the set of labels. In certain embodiment, the training module uses, for example, the Hadoop® Hive machine learning platform. The machine learning approaches used to train the off-line prediction models may include random forest, decision trees, and/or boosting trees. The machine learning approaches used in to train the on-line prediction model may include any one or more of: supervised learning using, for example, logistic regression, back propagation neural networks, etc., unsupervised learning using, for example, an Apriori algorithm, K-means clustering, semi-supervised learning, reinforcement learning using, for example, a Q-learning algorithm, temporal difference learning, and/or any other suitable learning style.

The model training module 123 may train a plurality of prediction models for different location groups associated with different information campaigns, respectively. As shown in FIG. 1, the model training unit 120 further includes a prediction models database 126 storing therein a model library including prediction models trained by the training module, each prediction model in the model library corresponds to a combination of a location group, a training time period and a training time frame.

Figure 12A:
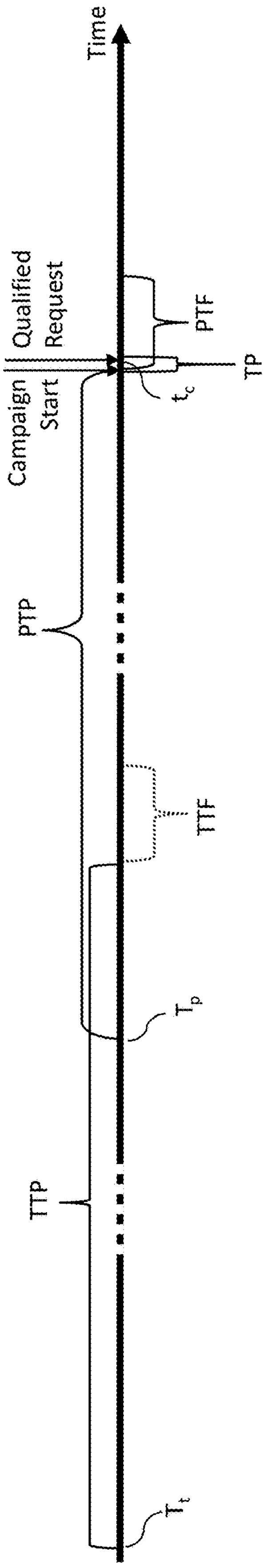
FIGS. 12A-12B are diagrams illustrating time periods and time frames for training and applying location prediction models and calibration models according to certain embodiments.
Figure 13:
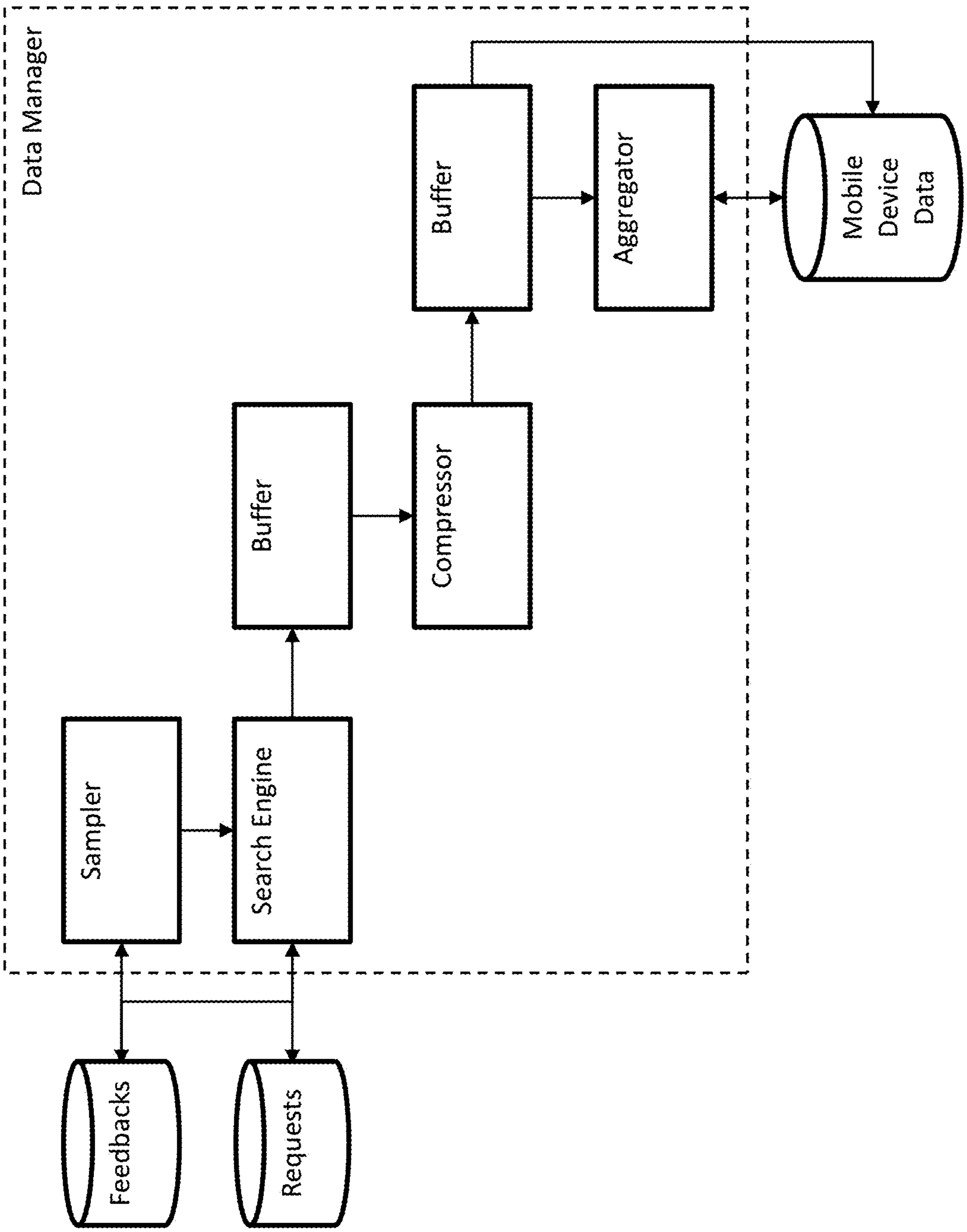
FIG. 13 is a block diagram illustrating a data manager for extracting mobile device data according to certain embodiments.

As the front-end server continues to receive and process requests and generate additional datasets in the request log 117 corresponding to the processed requests, the data manager 121 is configured to extract mobile device data corresponding to a prediction time period (e.g., time period PTP, as shown in FIG. 12A) periodically (e.g., once per day) for each of a plurality of mobile devices, and the feature generator is further configured to construct a set of features corresponding to the prediction time period PTP for each of a plurality of mobile devices. The prediction time period has the same duration as the training time period and its start time (or end time) may be reset periodically (e.g., every time when structured mobile device data and the features corresponding to the PTP are updated), so that its end time is at or shortly before (e.g., within a day from) the time when the mobile device data for the prediction time period is recalculated.

As shown in FIG. 12A, the prediction time period has a start time $T_p$ sometime after a start time $T_t$ of the training time period and an end time at or shortly before a time when prediction is being made. In certain embodiments, both TTP and PTP have about the same duration, which can be for example, several weeks to several months (e.g., 1-3 months) to allow sufficient size of the data pool for feature engineering. The mobile devices associated with the aggregated data corresponding to different time periods do not have to be the same. For example, the mobile devices associated with the aggregated data corresponding to time period PTP may be the same plurality of mobile devices associated with the aggregated data corresponding to the time period TTP or a different set of mobile devices.

As shown in FIG. 1, the prediction unit 130 includes a prediction module 131 configured to select and apply a prediction model to a prediction feature set to obtain a corresponding prediction result. As shown in FIG. 17B, each prediction result corresponds to a mobile device, a location group and a prediction time frame, and indicates a predicted probability of the mobile device having at least one location event at any of the locations in the location group during the prediction time frame.

FIG. 17B illustrates a set of prediction results generated by the prediction module 131 after applying the prediction model corresponding to a location group to the feature sets of a plurality of mobile devices according to some embodiments. The set of prediction results include predicted probabilities of respective mobile devices to have location events at any of the location group within a prediction time frame PTF after the prediction time period PTP. The set of prediction results shown in FIG. 17B are then stored in a general predictions database 134, as they are general prediction results not tailored (or calibrated) to a specific information campaign. In some embodiments, the prediction time frame (e.g., PTF shown in FIG. 12A) is immediately or shortly after the prediction time period PTP. For example, PTP can be the past 1-3 months from the day on which the prediction feature space is constructed, and PTF can be the next 1-2 weeks from the time or the day in which the prediction is made. Thus, the beginning of PTF can be immediately or up to a day or a few days from the end of PTP.

Figure 18A:
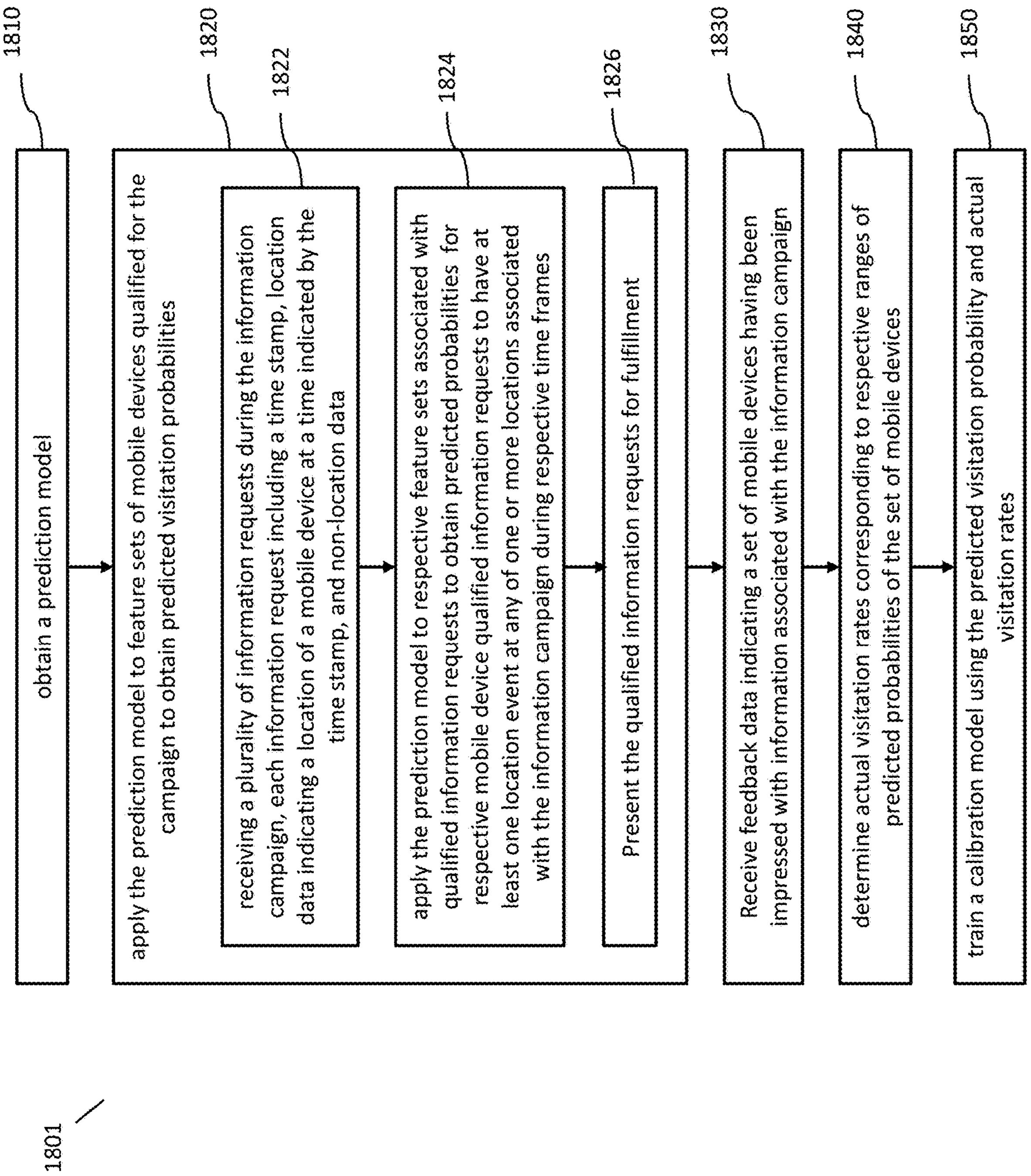
FIG. 18A is a flowchart illustrating a method of machine training a calibration model according to certain embodiments.

In some embodiments, as shown in FIG. 1, the prediction unit 130 further includes a model calibration module 132 configured to train calibration models and a prediction calibration module 133 configured to calibrate the general predictions to suit specific campaigns. FIG. 18A is a flowchart illustrating a method 1801 performed by system 100 to machine train a calibration model for an information campaign in-flight (e.g., after the information campaign has been running for a certain amount of time) according to some embodiments. As shown in FIG. 18A, method 1801 includes obtaining (1801) a general prediction model suitable for the information campaign using, for example, method 1100 and the prediction unit 120. For example, the general prediction model is trained with respect to one or more predefined locations or places associated with the information campaign and can be used to predict probabilities of mobile devices in a general audience that may or may not have been qualified for the information campaign and/or impressed with information associated with the information campaign to visit the one or more predefined locations or places.

In some embodiments, method 1801 further includes applying (1820) the prediction model to feature sets of qualified mobile devices (e.g., mobile devices associated with information requests qualified for the information campaign) to obtain predicted visitation probabilities. For example, during the information campaign, a plurality of information requests are successively received (1822) by the front end server 111 during a time period TP shortly after the campaign has started (e.g., in the first day of the campaign), as shown in FIG. 12A. Each respective request of the plurality of information requests includes a respective time stamp, respective location data indicating a location of a respective mobile device at a time indicated by the respective time stamp, and non-location data. As discussed above, the plurality of information requests are successively processed by the front end server 111 as they are received, resulting in at least some of mobile devices identified in the plurality of information requests being qualified for the information campaign. In some embodiments, a mobile device is qualified for the information campaign when an information request identifying the mobile device is qualified for the information campaign, and the information request is qualified for the information campaign when the non-location data and/or location data meet a set of criteria defined by a set of campaign parameters of the information campaign. The mobile device associated with a qualified information request is referred to here as a qualified mobile device.

In some embodiments, for each qualified request, a feature set corresponding to a mobile device associated with the qualified request can be retrieved from the features/labels database 125 shown in FIG. 1. As discussed above, the feature set may be constructed from processed requests associated with the mobile device in the request database and feedback data associated with the mobile device from the feedback database. The feature set is updated periodically (e.g., daily) so that it is constructed from such data with time stamps in a most recent prediction time period PTP that is close to the time $t_c$ of the request (e.g., 1-3 months before start of the information campaign), as shown in FIGS. 9, 10 and 12A. The feature set can be used to generally predict a probability of the mobile device to have at least one location event at any of the one or more predefined locations or places associated with the information campaign during a corresponding prediction time frame PTF (e.g., 1-2 weeks after start of the information campaign), as shown in FIGS. 9, 10, and 12A.

Method 1801 further includes applying (1824) by the prediction module 131 the general prediction model to respective feature sets corresponding to respective qualified mobile devices associated with respective qualified requests among the plurality of requests to obtain predicted probabilities for the respective qualified mobile devices to have location events at any of the one or more predefined locations or places associated with the information campaign during the prediction time frame PTF. As discussed above, in some embodiments, a respective feature set is constructed using data in respective datasets stored in the one or more databases. The respective datasets are associated with a respective qualified mobile device and including time stamps in the corresponding prediction time period (e.g., time period PTP). Method 1801 further includes presenting the qualified information requests for fulfillment. In some embodiments, the front end server 111 presents a qualified information request for fulfillment by first placing a bid for the qualified information request at the source of the information request (e.g., an ad exchange or a MSP), and in response to the bid being accepted, sending the corresponding processed request to the ad server for fulfillment. In some embodiments, the bid includes a bid price that is dependent on a predicted probability corresponding to the mobile device associated with the qualified request.

In some embodiments, method 1801 further includes receiving (1830) by the document server 112 feedback data indicating at least a portion of the qualified mobile devices having been impressed with information associated with the information campaign, responsive to at least a portion of the qualified requests among the plurality of information requests. Method 1801 further includes determining (1840) by the model calibration module 132 detected visitation rates corresponding to respective ranges of predicted probabilities of the impressed mobile devices. In some embodiments, the model calibration module 132 searches in the mobile device database 124 to determine which of the qualified mobile devices have been impressed with information associated with the information campaign and which of the impressed mobile devices have had location events (or visitation events) at any of the one or more predefined locations or places during relevant time frames. FIG. 19 is a table illustrating impression events and detected visitation events associated with certain mobile devices.

The impressed mobile devices are then divided based on their respective predicted probabilities, as determined in process 1820, into a plurality of probability brackets. For example, as shown in FIG. 20, a first portion of the impressed mobile devices having predicted probabilities larger than 0% and smaller than or equal to 1% are allocated to a first probability bracket, a second portion of the impressed mobile devices having predicted probabilities larger than 1% and smaller than or equal to 2% are allocated to a second probability bracket, . . . , and a 100th portion of the impressed mobile devices having predicted probabilities larger than 99% and smaller than or equal to 100% are allocated to a 100th probability bracket. A detected visitation rate for the mobile devices in each of the plurality of probability brackets are then determined using, for example, subsequent request data associated with the mobile devices received during corresponding time frames. In some embodiments, each of the mobile devices in a probability bracket is labeled with "0" if there is no location event associated with the mobile device at any of the one or more predefined locations or places associated with the information campaign, or labeled as "1" if there is at least one location event associated with the mobile device at any of the one or more predefined locations or places, based on subsequently processed requests with time stamps during the respective time frame. The detected visitation rate for a probability bracket can be, for example, a ratio of a number of mobile devices labeled with "1" in the probability bracket to a total number of the mobile device allocated to the probability bracket.

Figure 21:
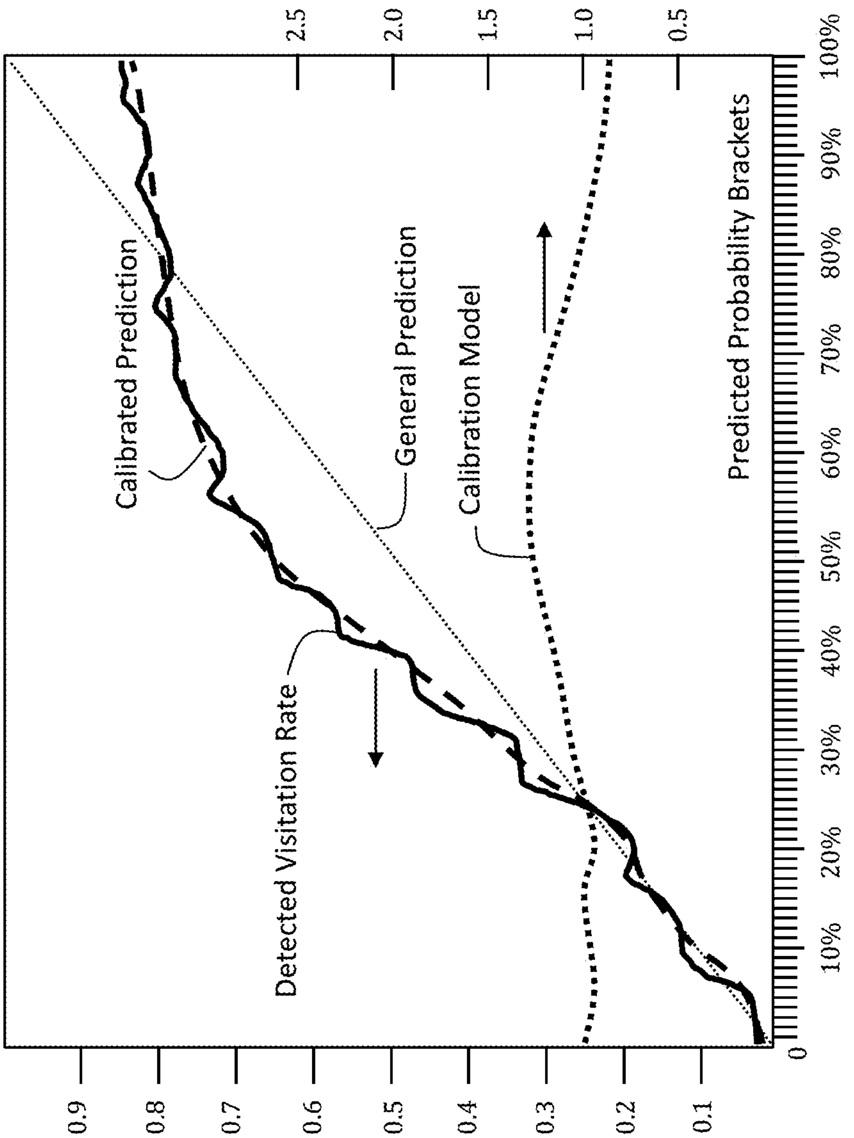
FIG. 21 is a plot illustrating calibration model training according to certain embodiments.

FIG. 21 includes a plot of detected visitation rates (thick solid line) and a plot of general predicted probabilities (thin solid line) corresponding to mobile devices in respective probability brackets. As shown, the predicted probabilities are significantly lower than the corresponding detected visitation rates for mobile devices in the $30^{th}$ to $75^{th}$ probability brackets, and significantly higher than the corresponding detected visitation rates for mobile devices in the $80^{th}$ to $100^{th}$ probability brackets. In some embodiments, the detected visitation rates and the general predicted probabilities are used to train (1850) a calibration model using, for example, isotonic regression, by the model calibration module 132. The trained calibration model (plotted in thick dotted line) is stored in the calibration models database 135. As shown in FIG. 1, the prediction unit 130 further includes a prediction calibration module 133 configured to apply the calibration model to the general predicted probabilities to generate calibrated predictions (plotted as dashed line), which are much more in line with the detected visitation rates than the general predicted probabilities.

In some embodiment, after the prediction time frame PTF, the calibration model trained using mobile device data in the prediction time period PTP and in the prediction time frame PTF is used by the prediction calibration module 133 to calibrate the general predictions generated by the prediction module 131 to obtain calibrated predictions, which are stored in the calibrated prediction data base. Compared to the general predictions, the calibrated predictions are much more accurate in predicting visitations associated with mobile devices qualified in the information campaign and/or impressed with information associated with the information campaign.

Figure 12B:
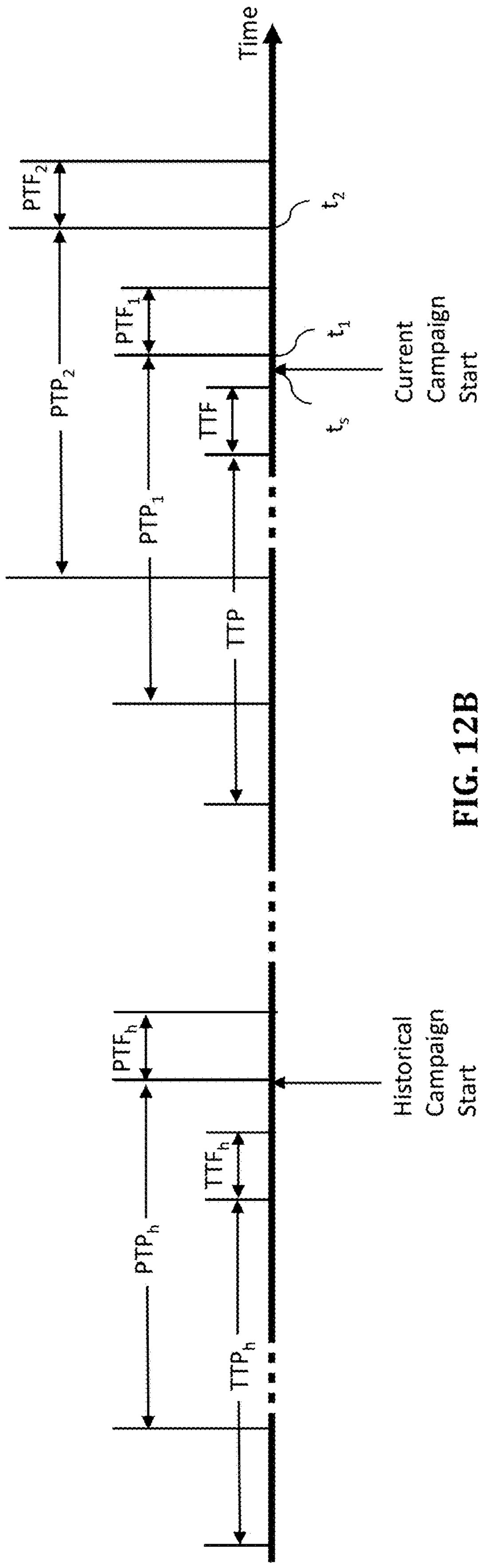
Figure 18B:
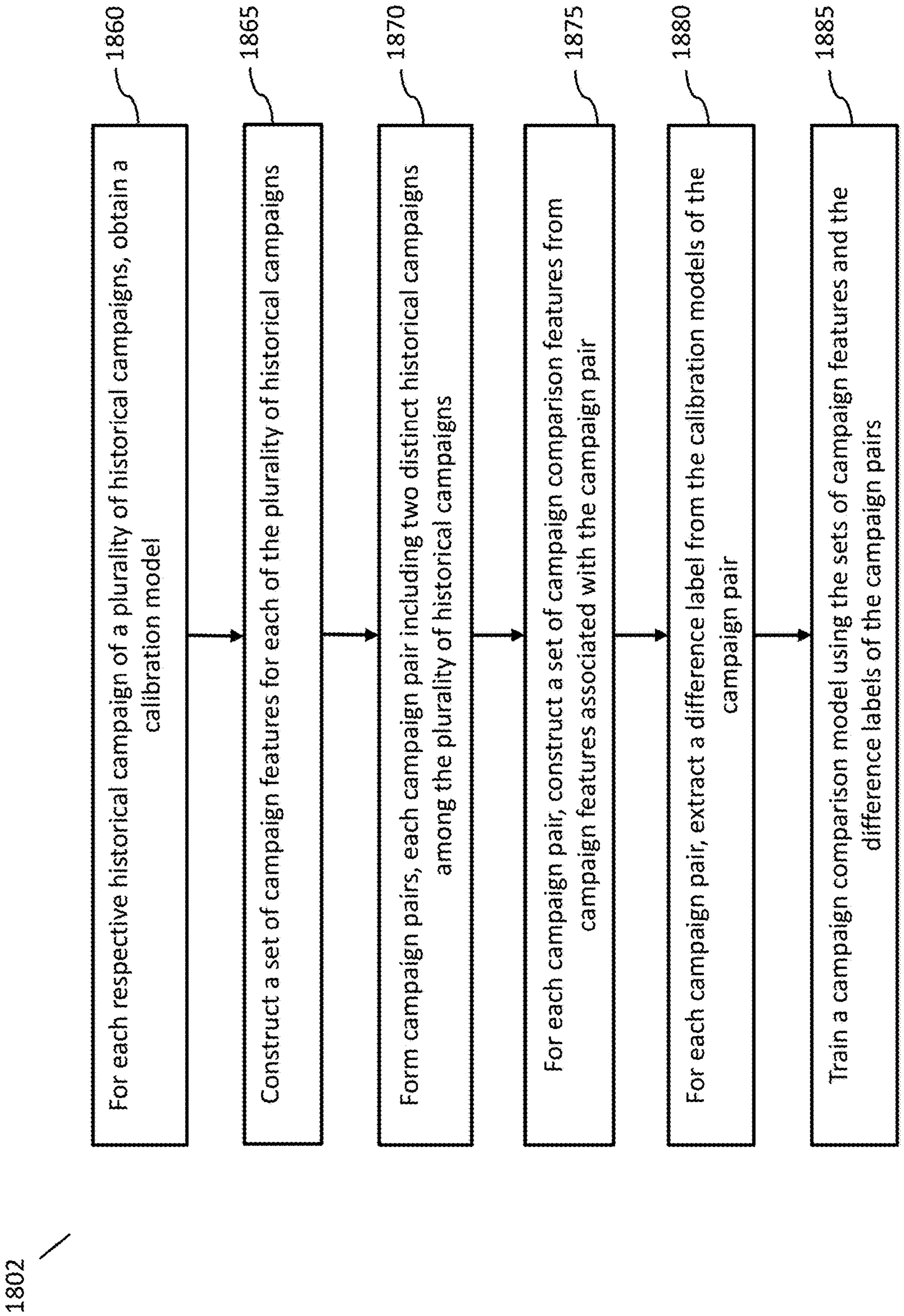
FIG. 18B is a flowchart illustrating a method of machine training a campaign comparison model according to certain embodiments.

In some embodiments, instead of waiting until after the prediction time frame PTF (e.g., 1-2 weeks) after the start of the campaign to train a calibration model, a calibration model for a current information campaign can be cold-start trained before or shortly after the start of the current information campaign. In some embodiment, a campaign comparison model is first trained, which can be used to determine which historical campaign(s) is similar to the current information campaign. FIG. 18B illustrates a method 1802 of training a campaign comparison model according to some embodiments. As shown in FIG. 18B, method 1802 includes obtaining a calibration model for each respective historical campaign of a plurality of historical campaigns. For example, the calibration model can be obtained for the respective historical campaign using method 1801 discussed above. As shown in FIG. 12B, a prediction model can be trained for the historical campaign using a feature space constructed from mobile device data in a training period $TTP_h$ and a set of labels extracted from mobile device data in a training time frame $TTF_h$ before the start of the historical campaign, and the calibration model can be trained using a feature space constructed from mobile device data in a prediction period $PTP_h$ and mobile device data in a prediction time frame $PTF_h$, as discussed above with reference to FIGS. 18A and 19-21.

FIG. 22 is a table illustrating campaign parameters of various historical campaigns. The campaign parameters include identification of a pricing model (e.g., Cost-per-Click or CPC, Cost-per-Visit or CPV, Cost-per-Mille or Cost-per-Thousant-Impression or CPM, Cost-Per-Action, Cost-Per-Acquisition (CPA), Cost-Per-Lead (CPL), and Cost-Per-Installation (CPI), etc.). The campaign parameters further include parameters related to a target audience, such as age range, gender type, education level, customer segment or affinity (e.g., loyalty or conquest), geographical area in which the audience is located (e.g., POI, mall, city, state, zip code, etc.), type of geo-fence for the geographical area (e.g., radial, premise, neighborhood (NH), etc.). The campaign parameters further include parameters defining a type of mobile devices (e.g., iPhone 8+, Galaxy S9+, etc.), a type of advertisement (e.g., banner, animation, interactive, video, etc.), a mobile apps in which the ad is displayed, etc. The campaign parameters further include parameters related to one or more target locations or POIs, to which the campaign is designed to drive visits, such as a brand for the POIs, and a geographical area in which the POIs are situated, etc.

As shown in FIG. 18B, method 1802 further includes constructing (1865) a set of campaign features for each of the plurality of historical campaigns. For example, as shown in FIG. 23, the set of campaign features for a particular historical campaign can include features related to the one or more target points of interest (POIs), such as a number of visits by mobile users per a specific length of time (e.g., one week) (e.g., as indicated by mobile device data), a percentage of the one or more POIs among all of the POIs in the same brand/category, and a category of the POIs (e.g., general stores, department stores, grocery stores, apparel shops, sports shops, restaurants, shopping malls, theatres, etc.). The set of campaign features further includes features related to a target audience (e.g., age range, gender type, education level, customer segment or affinity, geographical area, the type of geo-fences used to define the geo-graphical area, etc.), and features related to mobile device type(s), ad type(s), mobile app(s), etc., that are specified by the historical campaign.

Method 1802 then proceeds to form (1870) campaign pairs, each campaign pair including two distinct historical campaigns among the plurality of historical campaigns. As shown in FIG. 24, which lists various campaign pairs formed using the plurality of historical campaigns and the campaign feature sets for each campaign pair. In some embodiments, the campaign pairs include some or all of the distinct campaign pairs that can be formed with the plurality of historical campaigns. For example, for a plurality of n historical campaigns, there can be, for example, (n−1)! distinct campaign pairs. In some embodiments, n is sufficiently large to provide sufficient data to train the campaign comparison model. For example, n>100, or n>1000.

In some embodiments, as shown in FIG. 18B, method 1802 further comprises, for each campaign pair, constructing (1880) a set of campaign comparison features from the campaign features associated with the campaign pair, and extracting (1885) a difference value indicating a difference between the calibration models of the historical campaigns in the campaign pair.

Figure 25:
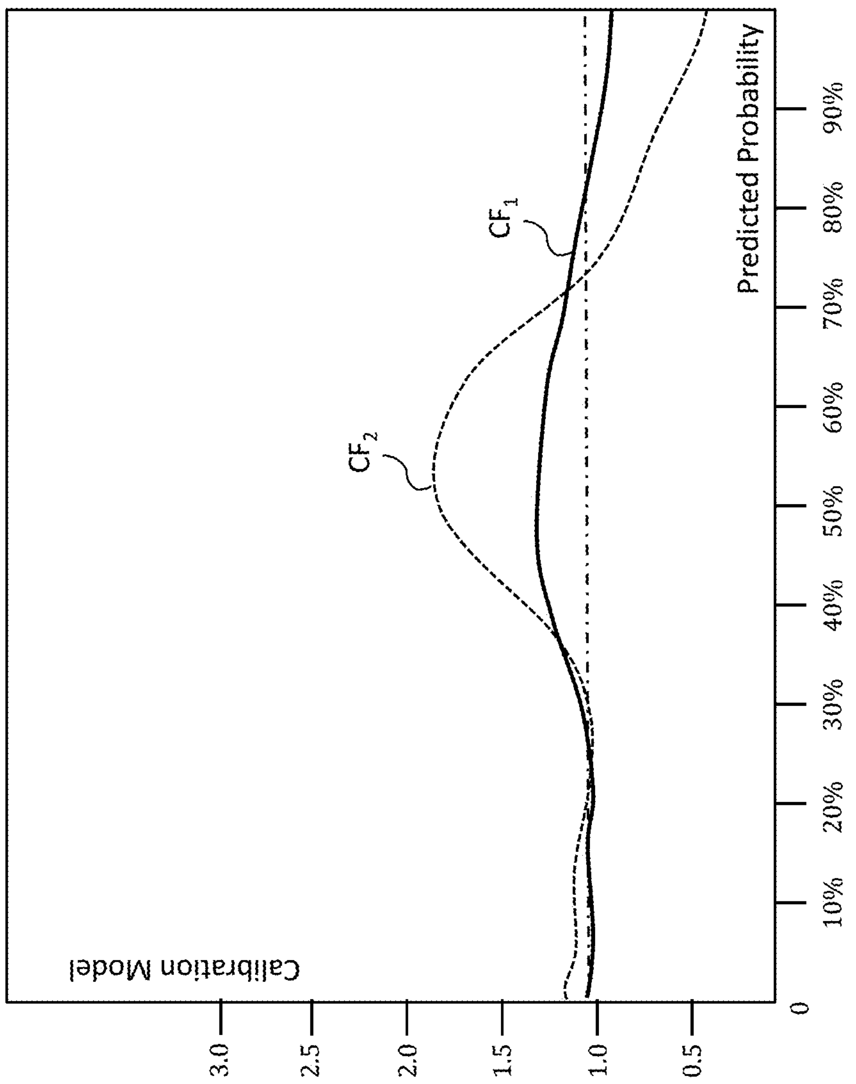
FIG. 25 is a table illustrating a feature space for training a campaign comparison model according to certain embodiments.

In some embodiments, as shown in FIG. 24, the set of campaign comparison features can simply be the combination of the sets of campaign features of the campaign pair. In some embodiments, as shown in FIG. 25, the difference value for a campaign pair including campaigns A and B can be measured by plotting the calibration models as curves $CF_1$ and $CF_2$ associated with campaign A and campaign B, respectively, and sum up the areas between the two curves. In some embodiments, as shown in FIG. 18B and FIG. 24, the campaign comparison features and the measured difference values of respective campaign pairs can then be used as features and labels to train (1890) a campaign comparison model by the model calibration module 132.

Figure 18C:
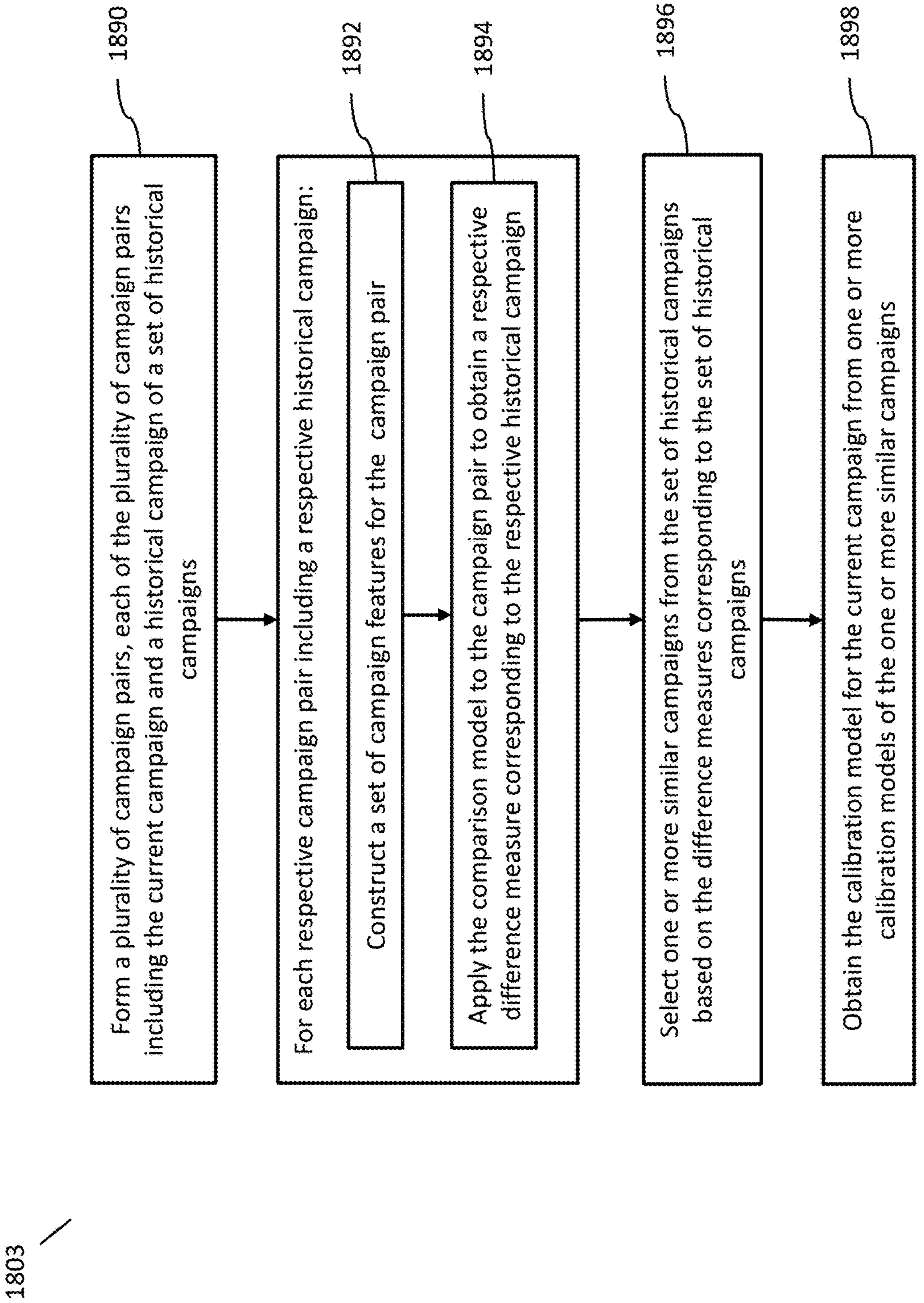
FIG. 18C is a flowchart illustrating a method of obtaining a calibration model from calibration model(s) of similar historical campaign(s) according to certain embodiments.

In some embodiments, the trained campaign comparison model is stored in the calibration models database 135 and is used to determine a difference between the current campaign and each of a set of historical campaigns. FIG. 18C is a flowchart illustrating a method 1803 of obtaining a calibration model for a current campaign using calibration model(s) of one or more similar historical campaigns according to some embodiments. As shown in FIG. 18C, method 1803 includes forming (1890) a plurality of campaign pairs, each of the plurality of campaign pairs including the current campaign and the historical campaign of a set of historical campaigns. The set of historical campaigns can be the same or a different set of historical campaigns used to train the comparison model. Method 1803 further includes, for each respective campaign pair including the current campaign and a respective historical campaign, constructing (1892) a set of campaign features for the campaign pair, and applying (1894) the campaign comparison model to the set campaign features for the respective campaign pair to obtain a respective difference measure corresponding to the respective historical campaign, the respective difference measure indicating a predicted difference between the calibration model of the current campaign the calibration model of the respective historical campaign. In some embodiments, as shown in FIG. 26, the set of campaign features can be the combination of campaign features associated with the historical campaign and campaign features associated with the current campaign. For example, the campaign features associated with the historical campaign can include features shown in FIG. 23, and so can the campaign features associated with the current campaign. FIG. 26 also illustrates the predicted difference measures corresponding to respective historical campaigns.

In some embodiments, as shown in FIG. 18C, method 1803 further includes selecting (1896) one or more similar campaigns from the set of historical campaigns based on the difference measures corresponding to the set of historical campaigns. For example, as shown in FIG. 27, the set of historical campaigns can be ranked based on their predicted different measures with respect to the current campaign. The historical campaign(s) with the lowest similarity measure(s) is then selected as the similar campaign(s). For example, as shown in FIG. 27, campaigns C25682, C65248 and C32658 each has predicted difference measures that can be rounded up to 1% and is significantly lower than the next lowest difference measure of 2.09%. So, campaigns C25682, C65248 and C32658 in this example are selected as the similar campaigns. As shown in FIG. 18C, method 1803 further includes obtaining (1898) the calibration model for the current campaign from one or more calibration models of the one or more similar campaigns. For example, if the one or more similar campaigns include just one similar campaign, the calibration model of the one similar campaign can be used as the calibration model for the current campaign. On the other hand, if the one or more similar campaigns includes multiple similar campaigns, the calibration model for the current campaign can be obtained by taking an average of the calibration models of the multiple similar campaigns.

Figure 28:
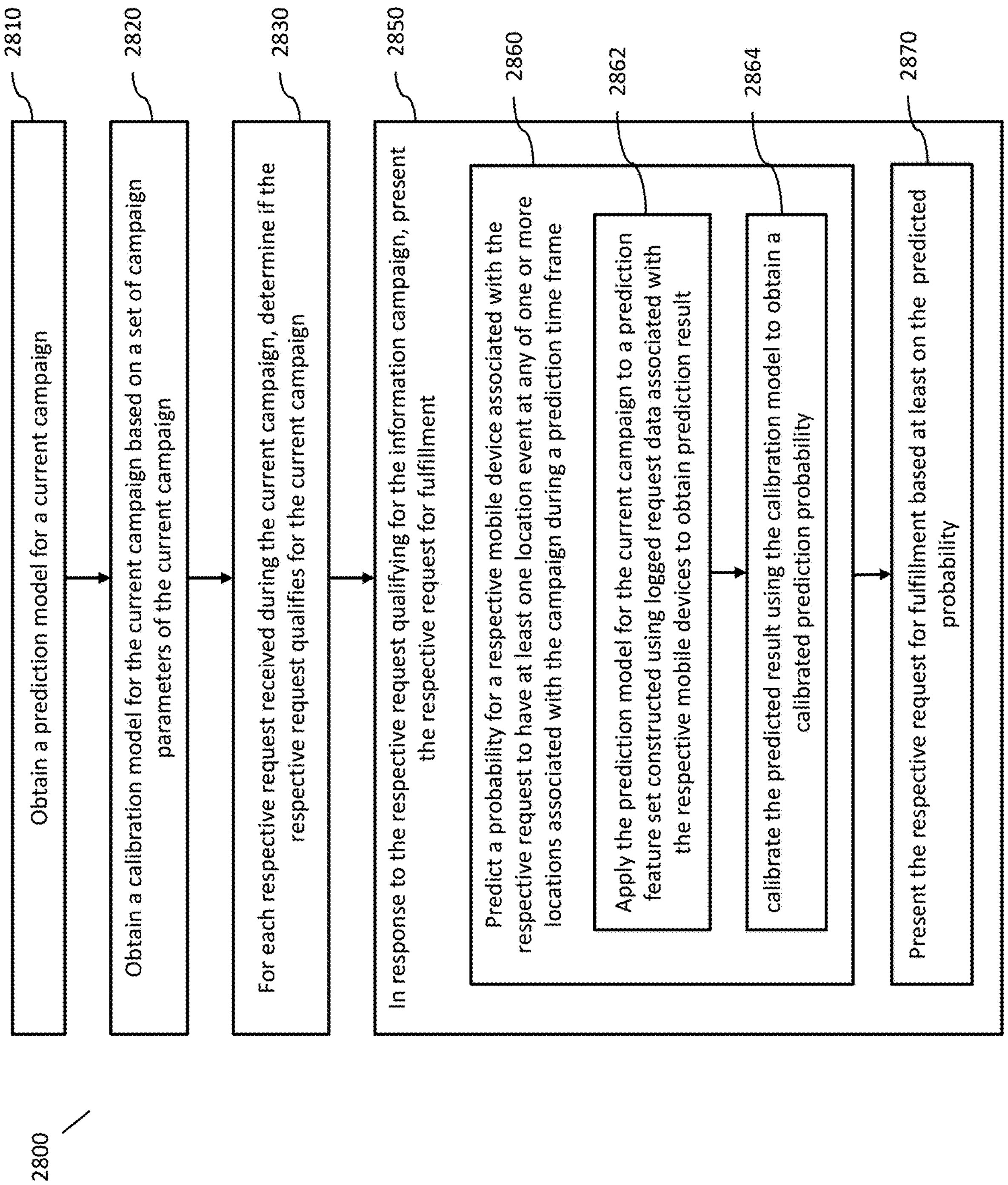
FIG. 28 is a flowchart illustrating a method for conducting the current campaign using location prediction according to certain embodiments.

FIG. 28 is a flowchart illustrating a method 2800 of conducting the current campaign according to some embodiments. As shown in FIG. 28, method 2800 includes obtaining (2810) a prediction model for the current campaign, and obtaining (2820) a calibration model for the current campaign based on a set of campaign parameters of the current campaign. In some embodiments, the prediction model can be trained with respect to one or more predefined locations or places associated with the current campaign, as described above with references to FIGS. 11-17. In some embodiments, the calibration model for the current campaign can be trained before the start of the current campaign, as described above with references to FIGS. 18B-18C and 22-27. The calibration model can also be trained during the campaign, as described above with references to FIGS. 18A and 19-21.

With the prediction model and the calibration model in store, method 2800 proceeds to process information requests during the current campaign, and to determine (2830), for each respective request received during the current campaign, if the respective request qualifies for the current campaign. In some embodiments, method 2800 includes, in response to the respective request qualifying for the information campaign, presenting (2850) the respective request for fulfillment. In some embodiments, presenting the respective request for fulfillment may include, for example, predicting a probability for a respective mobile device associated with the respective request to have at least one location event at any of the one or more locations associated with the information campaign during a specific time frame. In some embodiments, the specific time frame can be a time frame of a predefined duration (e.g., 1-2 weeks) from the time of the request. For example, as shown in FIG. 12B, for a first request with a first time stamp at time $t_1$ after the start of the current campaign at time $t_s$, the specific time frame $PTF_1$ can be 1-2 weeks from time $t_1$, or from a preset time (e.g., midnight) on the day of time $t_1$. To obtain the predicted probability for the respective mobile device in response to the respective request, the prediction model is applied to a set of features associated with the mobile device and constructed from mobile device data associated with the mobile device with time stamps in a specific time period $PTP_1$, which can be, for example, the past three months before the day of time $t_1$. Thus, the specific time frame $PTF_2$ and the specific time period $PTP_2$ can be different for another request with time stamp $t_2$ on a different day, as shown in FIG. 12B.

As shown in FIG. 28, in some embodiments, method 2800 further includes calibrating (2864) the prediction result by applying the calibration model to the prediction result to obtain a calibrated prediction probability, and presenting (2870) the respective request for fulfillment based at least on the calibrated prediction probability. As discussed above, in some embodiments, based on the calibrated prediction probability, the front end server 111 determines whether to place a bid for the respective request at the exchange or MSP, and, in the case the bid is placed and accepted, transmit the annotated request to the document (or information) server in the system 100. In certain embodiments, the front end server 111 has access to the location predictions stored in a calibrated predictions database 136 in the prediction unit 130. In some embodiments, especially when the pricing model for the current campaign is based on store visitations, the bid can include a bid price that is dependent on the calibrated prediction probability corresponding to the mobile device associated with the qualified request.

In some embodiments, the current campaign can be budgeted or priced based on detected store visit conversions (e.g., mobile devices having location events at any of one or more designated locations or stores during predefined attribution periods after being impressed with information associated with the information campaign). For example, the information campaign can be set up with a budget to drive a certain number of store visit conversions. This type of information campaigns are usually difficult to pace because conversions may happen days or weeks after impressions, during which the information campaigns are carried out without knowledge of how many of the impressions paid during these periods of time will produce conversions. As a result, it is easy for such an information campaign to run over or under the budget.

Figure 29:
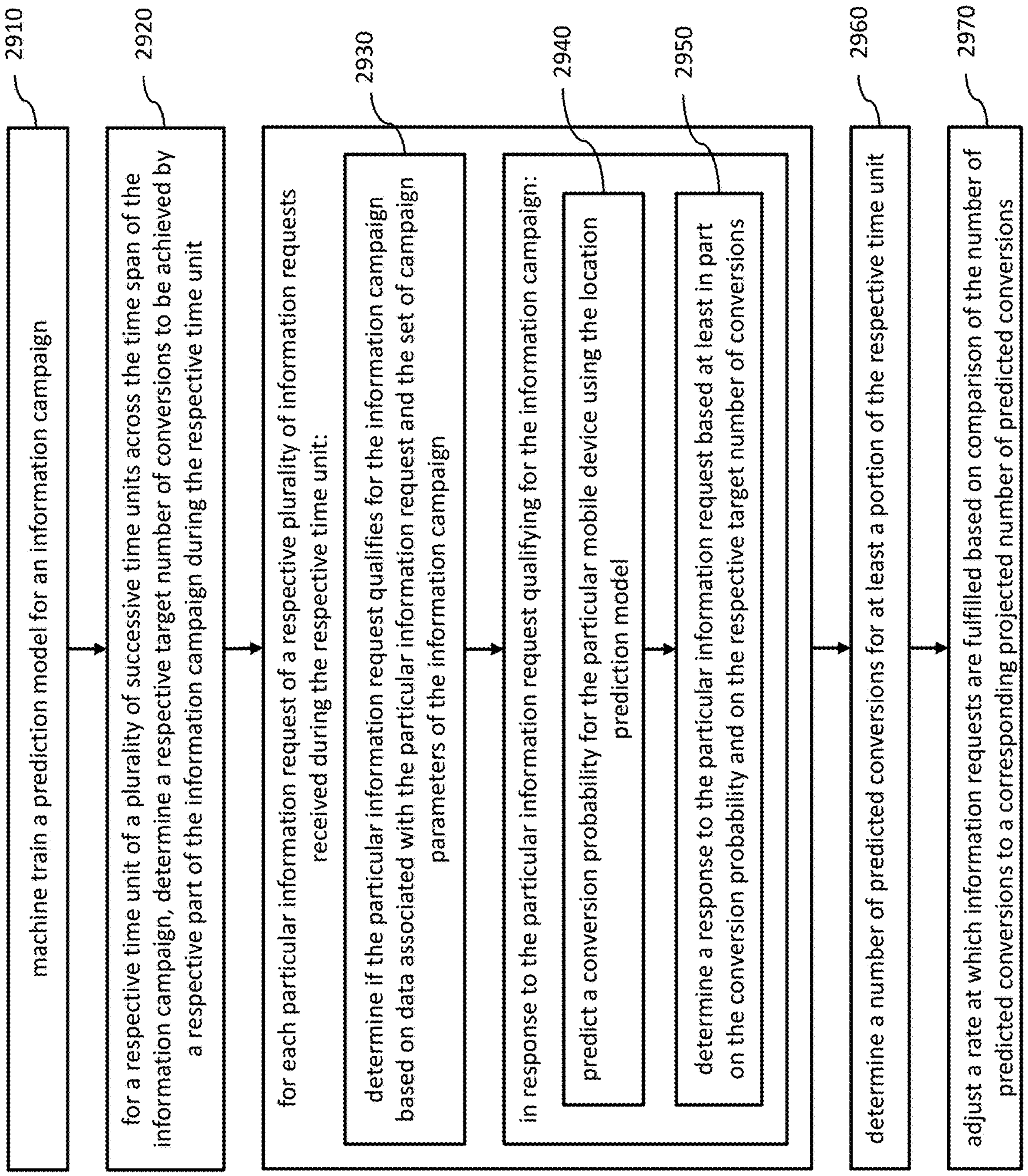
FIG. 29 is a flowchart illustrating a method for pacing an information campaign using location prediction according to certain embodiments.
Figure 30A:
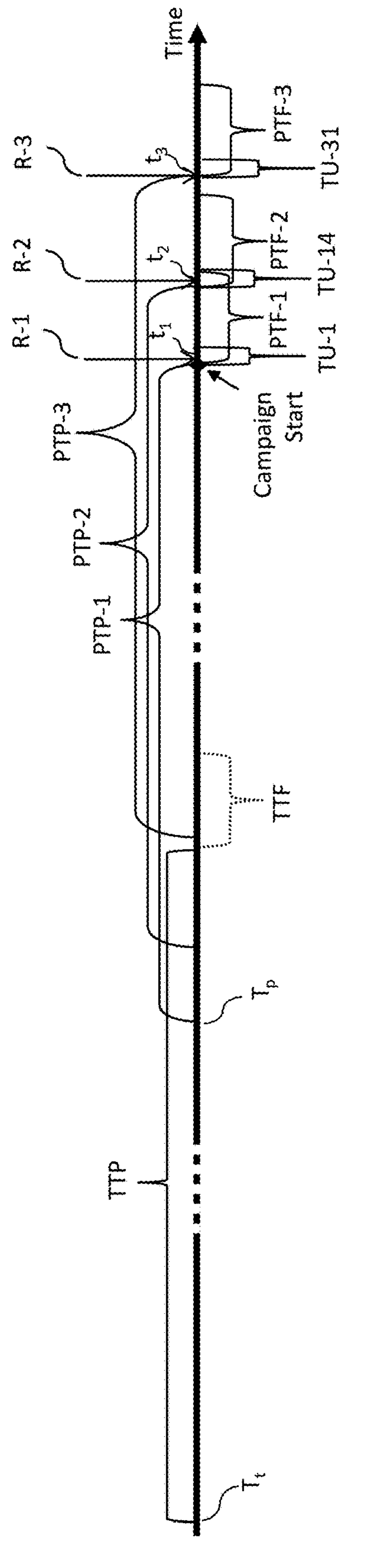
FIGS. 30A and 30B are diagrams illustrating time periods and time frames before and during an information campaign according to certain embodiments.

FIG. 29 is a flowchart illustrating a method 2900 of pacing a store-visit-conversion-based information campaign using location prediction according to some embodiments. As shown in FIG. 29, method 2900 includes machine training (2910) a location prediction model for an information campaign, which may include, for example, obtaining (2810) a prediction model, and, if the prediction model is not obtained specifically for the information campaign, obtaining (2820) a calibration model for the information campaign based on a set of campaign parameters of the information campaign, as discussed above with reference to FIG. 28. In some embodiments, as shown in FIG. 30A, the prediction model is trained using logged mobile device data with time stamps in a training time period TTP, and detected location events in a training time frame TTF, before the information campaign is started. In some embodiments, the information campaign has a set of campaign parameters, such as those discussed above with reference to FIG. 22. In some embodiments, the campaign parameters may include, among other things, parameters specifying one or more places of interest (POIs), a time span for the information campaign, and a budget to pay for a certain number of store-visit-conversions or conversions to be achieved by the information campaign during the time span. In some embodiments, a respective conversion is associated with a particular mobile device and corresponds to the particular mobile device having at least one location event at any of the one or more POIs during an attribution period after the particular mobile device is impressed with information associated with the information campaign.

Figure 30B:
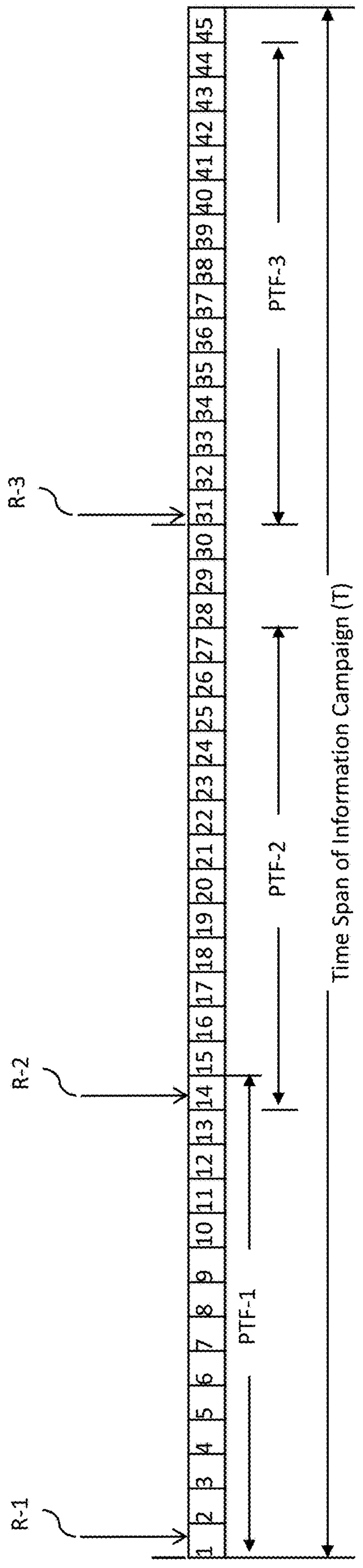

In some embodiments, as shown in FIG. 30B, the time span T of the information campaign includes a plurality of successive time units (e.g., Day 1 through Day 45), and method 2900 further includes, for a respective time unit of the plurality of successive time units, determining (2920) a respective target number of conversions to be achieved by a respective part of the information campaign conducted during the respective time unit. For example, if the time span T of the information campaign is 45 days, and the budgeted number of conversions $NC_T$ to be achieved by the information campaign during the time span is 45,000, it may be desirable to pace the information campaign such that, for each of the 45 days, about 1,000 unique mobile devices among those mobile devices impressed on that day would each have a location event in any of the one or more POIs during an attribution period (e.g., 14 days) starting on that day. According to some embodiments, at the start of the information campaign, a first number of conversions $NC_1$ to be achieved by a first part of the information campaign conducted during Day 1 is determined by dividing the budgeted number of conversions $NC_T$ to be achieved by the information campaign during the time span by the total number of successive time units N in the time span. For example, if $NC_T$=45,000, N=45, then $NC_1=NC_T/N$=1,000, as shown in the table in FIG. 32B, in the row for Day 1 and in the column under the heading "Target No. of Conversions to be Generated in Day (NCi)."

In some embodiments, the plurality of successive time units are not uniform (e.g., time units near the beginning of the campaign can be shorter than time units near the middle or end of the campaign, or vice versa). In some embodiments, the information campaign is not uniformly paced (e.g., the campaign can be paced to generate more conversions near the beginning of the campaign than near the middle or end of the campaign, or vice versa).

In some embodiments, as shown in FIG. 29, method 2900 further includes, for each particular information request of the respective plurality of information requests (e.g., request R-1 shown in FIGS. 30A and 30B) received during the respective time unit, determining (2930) if the particular information request qualifies for the information campaign based on request data associated with the particular information request and the set of campaign parameters of the information campaign. In some embodiments, a request qualifies for the information campaign if the request data associated with the request matches certain criteria specified by certain campaign parameters of the information campaign. For example, if the information campaign targets a certain type of audience in a certain geographical area, and the request data specifies that the user of the mobile device associated with the request belongs to the certain type of audience and the location of the mobile device is in the certain geographical area, the request would be determined as being qualified for the information campaign.

In some embodiments, as shown in FIG. 29, method 2900 further includes, in response to the particular information request qualifying for the information campaign, predicting (2940) a conversion probability for the particular mobile device using the location prediction model, and determining (2950) a response to the particular information request based at least in part on the conversion probability and on the respective target number of conversions. In some embodiments, the conversion probability corresponds to a predicted probability of the particular mobile device having at least one location event at any of the one or more POIs during a particular time frame (or attribution period) after the particular mobile device is impressed with information associated with the information campaign. For example, as shown in FIG. 30A, predicting (2940) a conversion probability for the particular mobile device using the location prediction model includes applying the location prediction model to a set of features constructed using mobile device data associated with the particular mobile device and having time stamps in a corresponding prediction time frame (e.g., PTP-1 corresponding to request R-1 received at t1 during Day 1, PTP-2 corresponding to request R-2 received at t2 during Day 14, or PTP-3 corresponding to request R-3 received at t3 during Day 31) to obtain a predicted probability of the particular mobile device to have a location event at any of the one or more POIs during a corresponding prediction time frame (e.g., PTF-1 corresponding to R-1, PTF-2 corresponding to request R-2, or PTF-3 corresponding to request R-3) that substantially coincides with a corresponding attribution period for the particular request (e.g., R-1) if an impression event occurs shortly (within seconds, minutes or an hour) after the particular request is presented for fulfillment. In some embodiments, predicting (2940) a conversion probability for the particular mobile device using the location prediction model may further include calibrating the predicted conversion probability with the calibration model, as discussed above.

In some embodiments, the front end server 111 receives information requests (e.g., R-1, R-2, R-3) from a real-time bidding system, and determines whether to respond to an information request by placing a bid for it. The probability of the front end server 111 winning such a bid is dependent on a win rate, which can be, for example, a percentage metric that measures the number of impressions won over the number of impressions bid during part or all of the information campaign. In some embodiments, the win rate is a function of the bid price (e.g., the higher the bid price, the more likely it is to win the bid) and other factors, or $WR=f(P, \xi_1, \xi_2, \ldots)$, where WR represents the win rate, P represents the bid price, and $\xi_1, \xi_2, \ldots$ are a set of parameters related to the other factors that affect the win rate, such as source of request, location events in processed request, mobile user age, gender, . . . , etc. In some embodiments, to increase return on investment (ROI) for an information campaign budgeted based on store visit conversions, the bid price for a qualified request is determined based on its predicted conversion probability (e.g., as shown in FIG. 32A, a qualified request with a higher predicted conversion probability is bid for with a higher price and thus has a higher chance of winning an impression than a qualified request with a lower predicted conversion probability), or P=g (PCP), where PCP represents the predicted probability, and g represents a pricing model for at least a specific portion of the information campaign, which defines a relation between the predicted probability and the bid price. Thus, the win rate for a bid on a qualified request in such an information campaign is a function of predicted conversion probability, e.g., $$WR=F(PCP,\xi_1,\xi_2, \ldots)$$

which defines a win rate profile representing, e.g., a relation between the predicted conversion probability and the win rate, which can be adjusted by adjusting a pricing model, e.g., a relation between the bid price and the predicted conversion probability.

In some embodiments, the bid price, and thus the win rate, is preset based on the respective target number of conversions to be achieved by the information campaign conducted during the respective time unit, such that, a number of predicted conversions generated by the information campaign during the respective time unit corresponds to the respective target number of conversions (e.g., the difference between the number of predicted conversions and the respective target number of conversions is less than, for example 5% or 10%, of either number or an average of the two numbers). For example, for the nth time unit, a win rate profile, e.g., a relationship between the win rate WR and the predicted conversion probability is selected such that:

$$\sum_k M_k PCP_k \cdot WR_k \approx NC_n$$

where the summation is through a plurality of conversion probability brackets k (e.g., k=1, 2, . . . 100) each corresponding to a respective one of a plurality of conversion probability values $PCP_k$ (e.g., $PCP_1$=1%, $PCP_2$=2%, . . . , $PCP_{100}$=100%), $M_k$ represents an estimated number of mobile devices corresponding to the kth conversion probability bracket (e.g., mobile devices each associated with at least one qualified request received during the nth time unit and having a conversion probability larger than $PCP_{k-1}$ and smaller or equal to $PCP_k$), $WR_k$ represents the win rate based on the price selected for conversion probability $PCP_k$.

Figure 31A:
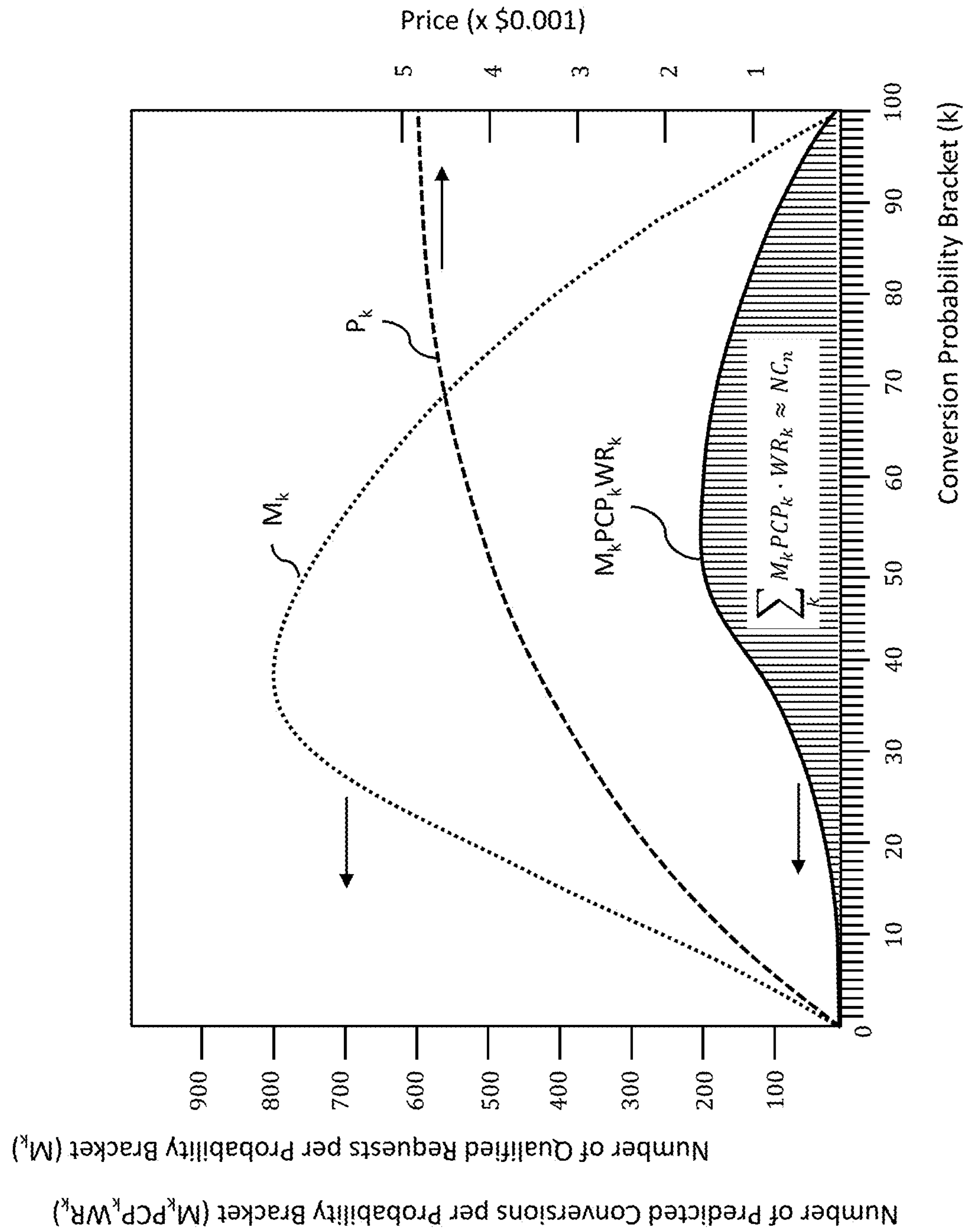
FIGS. 31A and 31B are plots of various variables related to pacing an information campaign according to certain embodiments.

In some embodiments, $\Sigma_k M_k PCP_k \cdot WR_k \approx NC_n$ for the nth time unit is achieved by modeling a win rate profile or pricing model using previous mobile device data (e.g., mobile device data from any of time units 1 through (n−1), or, if the current time unit is at the beginning of the information campaign, mobile device data from a period of time shortly before the information campaign), projecting a number of predicted conversions at various points of time during the nth time unit using the win rate profile or pricing model, the previous mobile device data, and the targeted number of predicted conversions for the nth time unit; comparing actual number of predicted conversions with the projected number or predicted conversions at various points of time during the nth time unit, and adjusting the win rate profile or pricing model (and thus a rate at which information requests are fulfilled), if needed, based on the comparison. FIG. 31A shows plots of $M_k$ across the probability brackets (k=1, 2, . . . 100) based on the previous mobile device data. In some embodiments, as shown in FIG. 31A, a pricing model $P_k$ can be modeled such that $\Sigma_k M_k PCP_k \cdot WR_k$ (e.g., the area under the plot for estimated number of predicted conversions per conversion probability bracket $M_k PCP_k WR_k$) corresponds to the targeted number of conversions for the time unit $NC_n$.

In some embodiments, only qualified requests having predicted conversion probabilities higher than a certain threshold (e.g., 30%) are responded to with bidding, while qualified requests having predicted conversion probabilities lower than the threshold are passed or ignored. In such cases, the summation in $\Sigma_k M_k PCP_k \cdot WR_k$ is from k=31 through k=100.

Figure 31B:
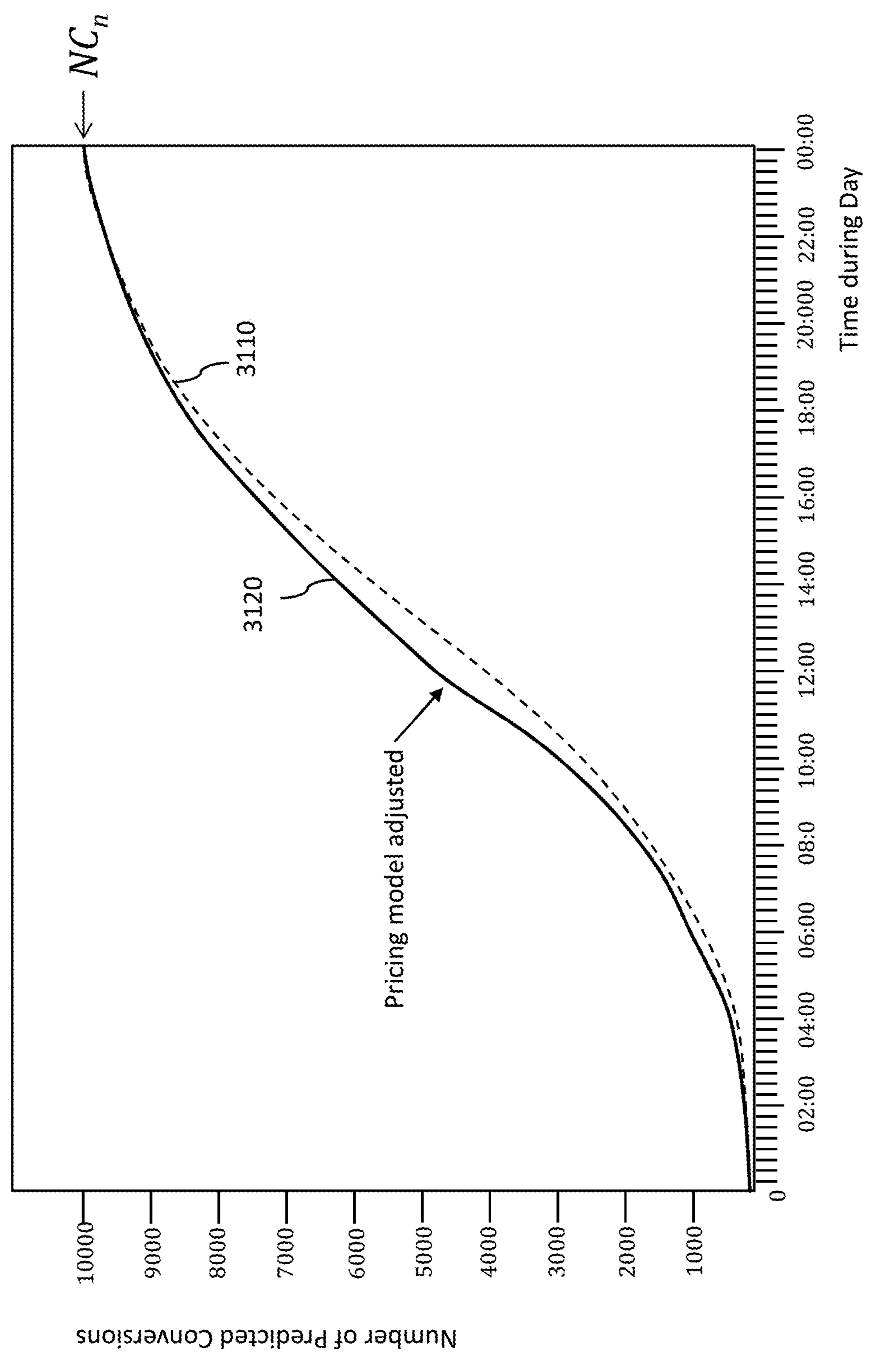

In some embodiments, with the pricing model or win rate profile in place, the progression of the information campaign during a time unit can be projected using the previous mobile device data. As shown in FIG. 29, method 2900 further comprises determining (2960) a number of predicted conversions for at least a portion of the respective time unit, and adjusting (2970) a rate at which information requests are fulfilled based on comparison of the number of predicted conversions to a corresponding projected number of predicted conversions. For example, as shown in FIG. 31B, during the course of part of the information campaign in a time unit (e.g., a 24 hour period), the number of predicted conversions to be generated in a period of time from the beginning of the time unit till any of various points of time during the time unit can be estimated as projected number of predicted conversions or $N_{PPC}$ (plot 3110) based on a chosen pricing model or win rate profile and mobile device data in a previous time unit or before the start of the campaign. As discussed above, the pricing model or the win rate profile $WR_k$ can be modeled such that, at the end of the time unit, the $N_{PPC}$ (which, at the end of the time unit, should equal to $\Sigma_k M_k PCP_k \cdot WR_k$) corresponds to the respective target number of conversions $NC_n$ for the time unit.

FIG. 31B also shows a plot 3120 of actual number of predicted conversions ($N_{APC}$) up till any of various points of times during the time unit, as compared to the projection (plot 3110). In some embodiments, the current time unit (e.g., the nth time unit) is divided into a series of subunits, and the comparison is made at the end of each subunit or soon afterwards to determine whether a change of the pricing model or win rate profile is needed. For example, at the end of each quarter hour or soon afterwards during the time unit, the actual number of predicted conversions ($N_{APC}$) generated up till the end of the quarter hour can be determined and this number is compared with the projected value $N_{PPC}$ corresponding to the same time. In some embodiments, the pricing model or win rate profile is adjusted at the end of the particular subunit or soon afterwards if the difference between the actual number ($N_{APC}$) and projected number ($N_{PPC}$) is larger than a preset threshold (e.g., 10% of $N_{APC}$ or $N_{NPC}$ or an average thereof) for a predetermined length of time (e.g., 2 hours), so that, at the end of the time unit, the number of predicted conversions $NP_n$ generated during the time unit corresponds to the respective target number of conversions $NC_n$ for the time unit. For example, as shown in FIG. 31B, which plots of the actual and projected numbers of predicted conversions across the time unit (e.g., a 24 hour time period), the pricing model or the win rate profile is adjusted at the end of the subunit ending at 12 pm or soon afterwards (e.g., within 15 minutes) to adjust the amount of impressions generated by the information campaign during the rest of the time unit or a subsequent section of the time unit, to ensure that the actual number of predicted conversions $NP_n$ generated during the time unit corresponds to the respective target number of conversions $NC_n$ for the time unit. In some embodiments, the adjustment is made multiple times during the time unit. In some embodiments, the adjustment is made at the end of the time unit so that the difference between $NP_n$ and $NC_n$ for this time unit is at least partially compensated for by one or more following time units.

In some embodiments, for each subsequent time unit after the first time unit, the number of conversions targeted by the information campaign during the subsequent time unit is determined based on a number of predicted conversions during a sequence of preceding time units and, if available, a number of actual conversions attributable to impressions made by the information campaign during one or more time units before the sequence of preceding time units, for example:

$$NC_n = \frac{NC_T - \sum_{i=1}^{i=n-1} NP_i}{N - n + 1},$$

if n is equal to or smaller than m, or $$NC_n = \frac{NC_T - \sum_{i=n-m+1}^{i=n-1} NP_i - \sum_{j=1}^{j=n-m} ND_j}{N - n + 1},$$

if n is larger than m, where $NC_n$ represents the number of conversions targeted by the information campaign during the nth time unit, $NC_T$ represents the budgeted number of conversions to be achieved by the information campaign, m represents a number of time units (e.g., m=14) in an attribution time period (or prediction time frame, e.g., PTF-1, PTF-2, PTF-3, etc.), $\Sigma_{i=n-m+1}^{i=n-1} NP_i$ represents a total number of predicted conversions corresponding to mobile devices impressed with information associated with the information campaign during a sequence of time units (e.g., up to m−1 time units) preceding the nth time unit (with $NP_i$ representing a number of predicted conversions corresponding to mobile devices impressed with information associated with the information campaign during the ith time unit), and $\Sigma_{j=1}^{j=n-m} ND_j$ represents a total number of detected conversions attributable to impressions made by the information campaign during the time unit(s) (if any) before the sequence of time units preceding the nth time unit (with $ND_j$ representing a number of detected conversions attributable to impressions made by the information campaign during the jth time unit).

FIG. 32B is a table listing, as examples, the target number of conversions to be generated in each of a few time units, the number of bids placed during the time unit, the number of impressed mobile devices during the time unit, the numbers of predicted and detected conversions attributable to impressions made in the time unit, showing that the target number of conversions and thus the number of bids placed vary from time unit to time unit due to variations in the numbers of predicted and detected conversions.

In some embodiments, $$\frac{NC_T - \sum_{i=1}^{i=n-1} NP_i}{N-n+1}$$

or $NC_T-\Sigma_{i=1}^{i=n-1} NP_i$ or $NC_T-\Sigma_{i=n-m+1}^{i=n-1} NP_i-\Sigma_{j=1}^{j=n-m} ND_j$ is an estimate of a remaining number of conversions to be achieved by a remaining portion of the information campaign starting with the nth time unit, and N-n+1 equals to a number of time units including the nth time units in the remaining portion of the information campaign. In some embodiments, $NP_i$ can be the sum of conversion probabilities corresponding to mobile devices impressed with information associated with the information campaign during the ith time unit, e.g., $NP_i=\Sigma_l PCP_l$ where $PCP_l$ represents the predicted conversion probability for the lth impressed mobile device during the ith time unit, and the summation is across every unique mobile devices impressed with information associated with the information campaign during the ith time unit. In some embodiments, $ND_j$ can be determined using mobile device data and feedback data with time stamps in an attribution time period corresponding to the jth time unit (e.g., a time period including 14 time units starting with the jth time unit). Thus, $ND_j$ is not determined until the end of the attribution time period corresponding to the jth time unit. For example, as shown in FIG. 32A, for mobile devices impressed on Jun. 21, 2019, the attribution period may extend from June 21 to July 4. So, the number of conversions attributable to impressions made on Jun. 21, 2019 may not be determined until end of Jul. 4, 2019.

Figure 33A:
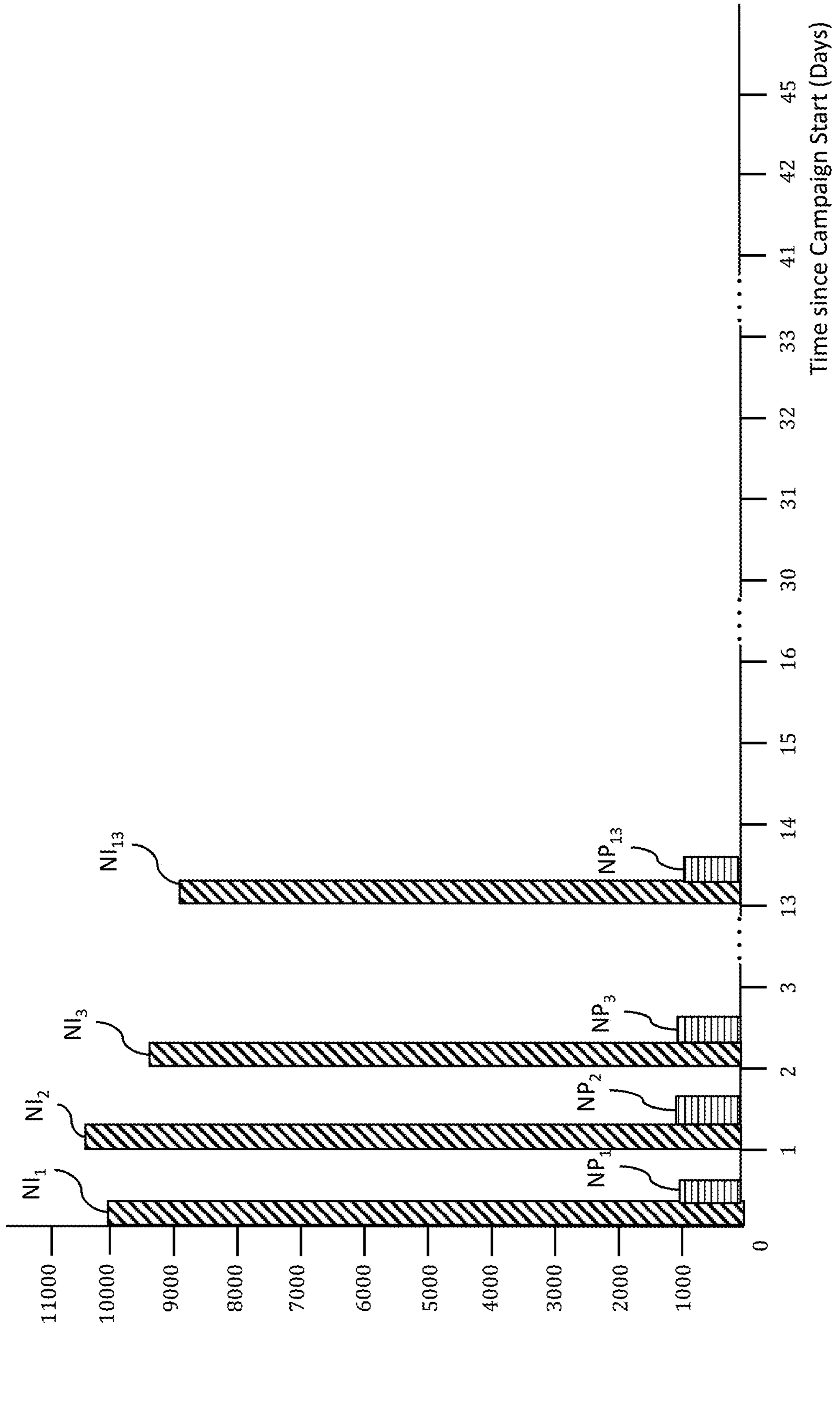
FIGS. 33A to 33C are bar charts showing various values at different stages during the course of an information campaign according to certain embodiments.
Figure 33B:
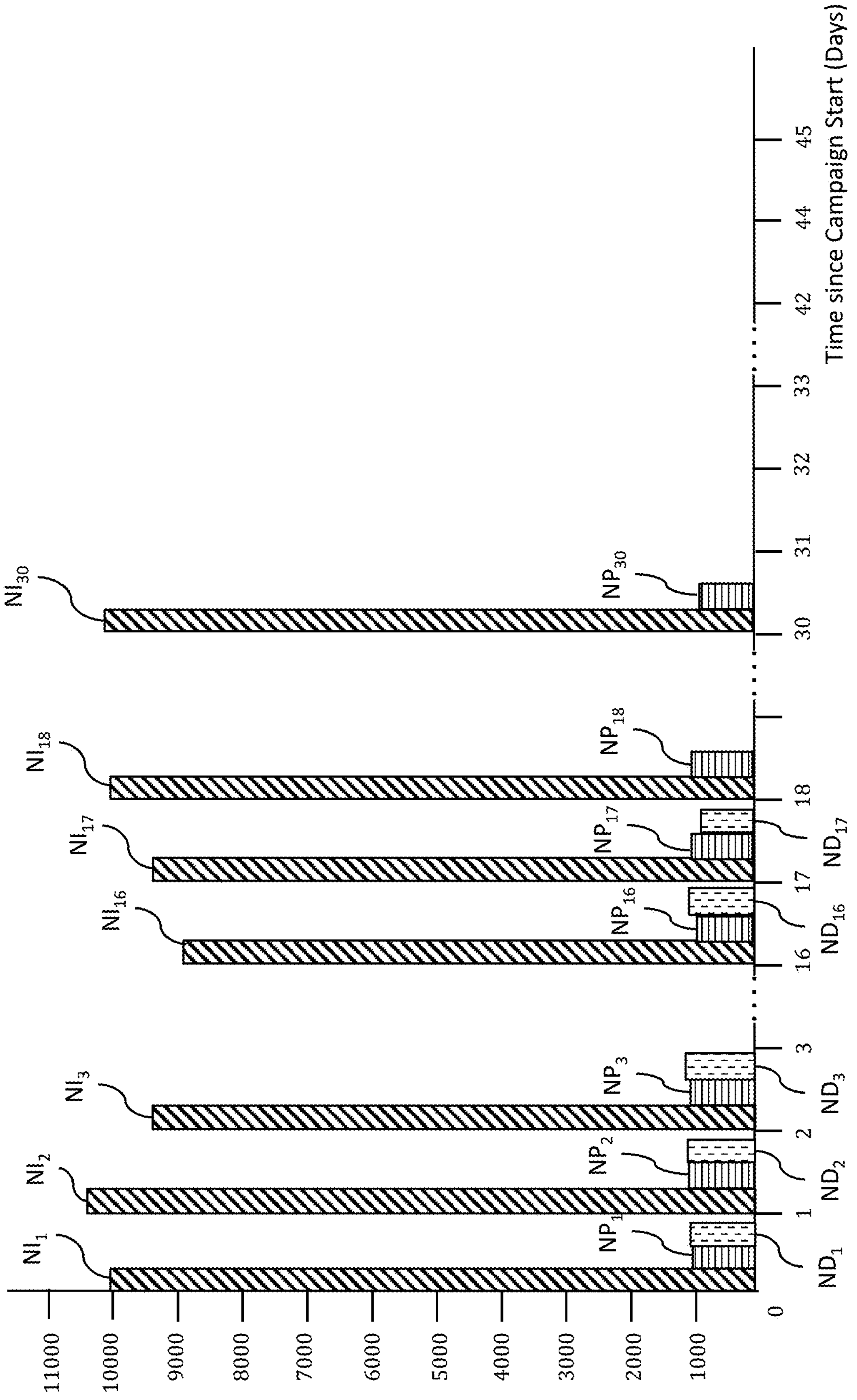

FIGS. 33A and 33B illustrate $NP_x$, $ND_x$, as compared with $NI_x$ (number of unique mobile devices impressed with information associated with the information campaign during time unit x), at the beginning of Day 14 and Day 31, respectively, for an information campaign having a time span from Day 1 to Day 45. As shown in FIG. 33A, at the start of Day 14, the number of actual conversions has not been determined for any of the preceding time units (e.g., Day 1 through Day 13). As shown in FIG. 33B, at the start of Day 31, the number of actual conversions has not been determined for any of a sequence of preceding time units (e.g., Day 18 through Day 30), while the number of actual conversions has been determined for each of the time units (e.g., Day 1 through Day 17) before the sequence of preceding time units (e.g., Day 18 through Day 30).

In some embodiments, the number of conversions to be achieved by the information campaign during the 14th time unit is determined by: determining a first number of predicted conversions corresponding to mobile devices impressed with information associated with the information campaign during 13 time units prior to the 14th time units; estimating a remaining number of conversions to be achieved by the remaining 32 time units of the information campaign by subtracting the first number from the budgeted number of conversions to be achieved by the information campaign; and determining the number of conversions to be achieved during the $14^{th}$ time unit by dividing the remaining number of conversions and a remaining number of time units including the $14^{th}$ time units (e.g., 32), e.g., $$NC_{14} = \frac{NC_T - \sum_{i=1}^{i=13} NP_i}{32}$$

In some embodiments, the number of conversions to be achieved by a part of the information campaign conducted during the $31^{st}$ time unit is determined by: determining a second number of predicted conversions corresponding to mobile devices impressed with information associated with the information campaign during time units 18 through 30 prior to the third time units; determining a number of detected conversions during time units 1 through 17, which constitute a time period after the start of the information campaign and prior to time units 18 through 30; estimating a remaining number of conversions to be achieved by the remaining 15 time units of the information campaign by subtracting the second number and the number of detected conversions from the budgeted number of conversions to be achieved by the information campaign; and determining the number of conversions to be achieved during the $31^{st}$ time unit by dividing the remaining number of conversions by a remaining number of time units including the $31^{st}$ time unit (e.g., 15). Thus, $$NC_{31} = \frac{NC_T - \sum_{i=18}^{i=30} NP_i - \sum_{j=1}^{j=17} ND_j}{15}$$

Thus, according to some embodiments, a store-visit-conversion-based information campaign can be properly paced using predicted and detected conversions.

Figure 33C:
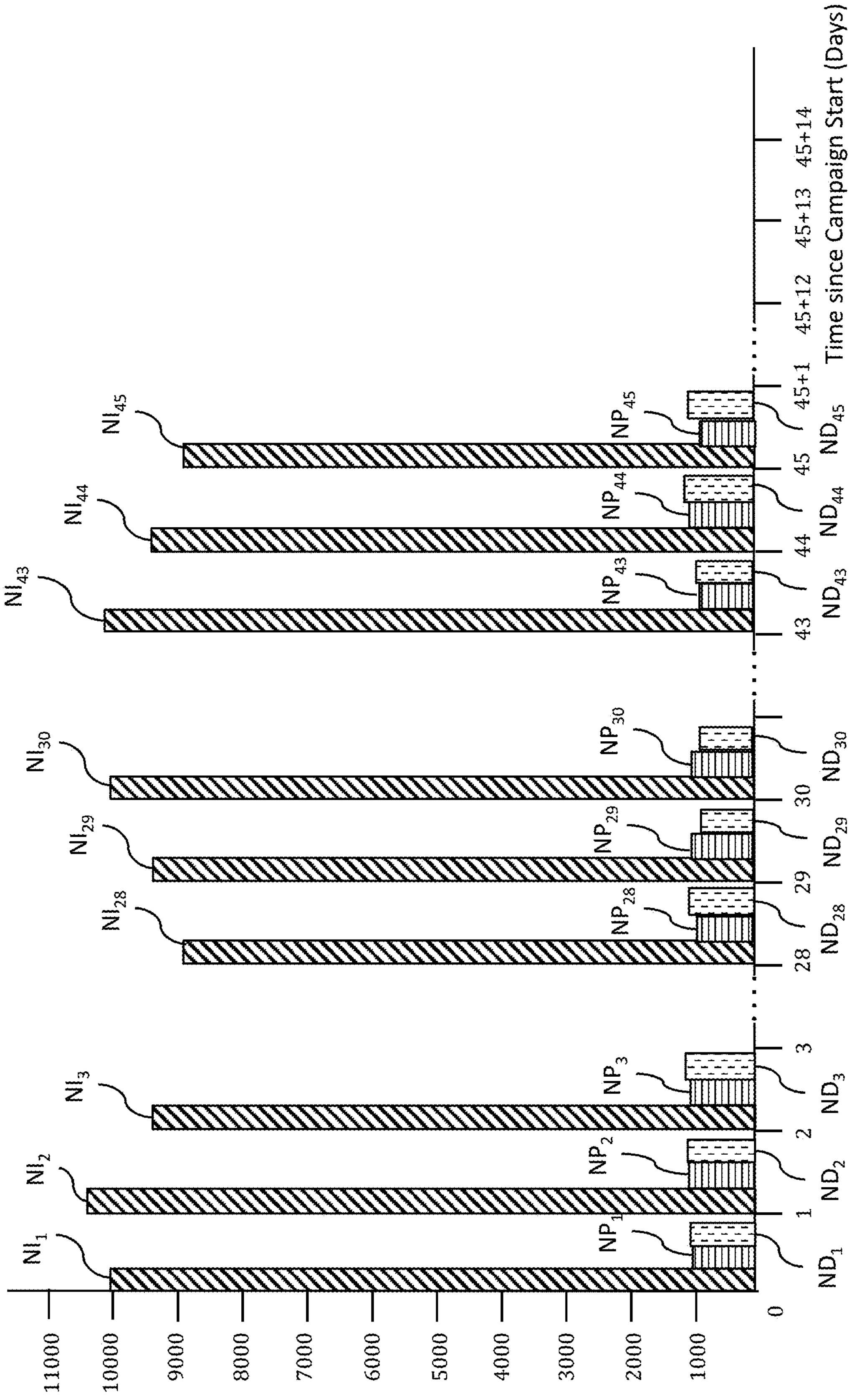

FIG. 33C illustrates $NP_x$ (number of predicted conversions corresponding to mobile devices impressed with information associated with the information campaign during a time unit x), $ND_x$ (number of detected conversions attributable to impressions made by the information campaign during the time unit x), as compared with $NI_x$ (number of unique mobile devices impressed with information associated with the information campaign during time unit x) for each of the time units during the time span of the information campaign. Note that $ND_x$ (e.g., x=45) for the last day of the campaign may not be determined till after an attribution time period (e.g., 14 days) after the conclusion of the information campaign by end of day of, for example, Day 45. As shown in FIG. 33C, 14 days after the $45^{th}$ day of the campaign, a total number of detected conversions attributable to impressions made during the information campaign can be determined as $\Sigma_{j=1}^{j=45} ND_j$. According to some embodiments, a conversion rate for the information campaign, which can be the ratio of the total number of detected conversions attributable to impressions made during the information campaign to a total number of impressions made during the information campaign, can be determined as:

$$CR = \frac{\sum_{j=1}^{j=45} ND_j}{\sum_{j=1}^{j=45} NI_j}$$

In some embodiments, when the bid price is constant throughout the campaign (e.g., $5/1000 impressions) and the campaign is paid compensated for based on conversions (e.g., $5/conversion), the return on investment ratio can be determined as:

$$\frac{\text{Return}}{\text{Investment}} = \frac{5 \cdot \sum_{j=1}^{j=45} ND_j}{\frac{5}{1000} \sum_{j=1}^{j=45} NI_j} = 1000 \cdot \frac{\sum_{j=1}^{j=45} ND_j}{\sum_{j=1}^{j=45} NI_j}$$

Thus, in this example, for there to be return on investment, the conversion rate CR needs to be higher than 0.001, or there need to be more than one detected conversion per thousand impressions. In the case where the bid price is dependent on the predicted conversion rate, as shown in FIG. 32A, the denominator in the above equations can be replaced by the sum of the bid prices corresponding to all of the impressions. The conversion rate CR, however, is still a good indicator on the return to investment ratio.

In some embodiments, prior to the start of an information campaign, a test campaign can be designed and a conversion rate can be predicted for the test campaign. Based on the prediction, campaign parameters of the test campaign can be adjusted accordingly to produce a more optimized conversion rate. In some embodiments, a method for predicting the conversion rate of a test campaign can be performed using system 100. The test campaign has a set of campaign parameters including parameters specifying one or more places of interest (POIs) (e.g., a brand name for the POIs, and a geographical area in which the POIs are situated, etc.), to which the test campaign is designed to drive visits, parameters specifying a target audience (e.g., age range, gender type, education level, etc.), customer segment or affinity (e.g., loyalty or conquest), geographical area in which the audience is located (e.g., POI(s), mall(s), city(ies), state(s), zip code(s), etc.), type of geo-fence for the geographical area (e.g., radial, premise, neighborhood (NH), etc.)), and parameters specifying a pricing model and a base price for real-time bidding (e.g., $5 per thousand of impressions, etc.).

Figure 34:
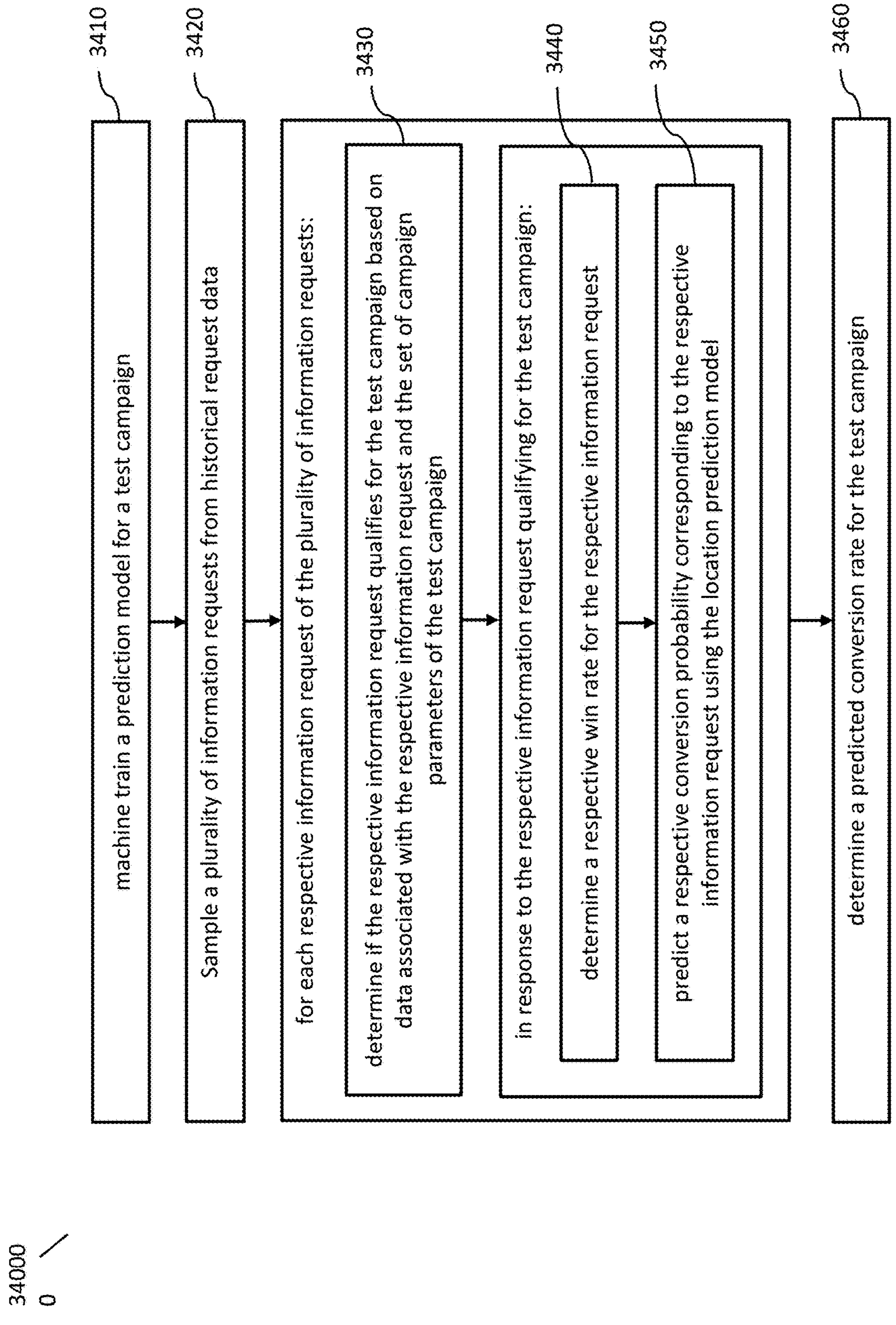
FIG. 34 is a flowchart illustrating a method for predicting the conversion rate of a test campaign according to certain embodiments.

In some embodiments, as shown in FIG. 34, a method 3400 for predicting the conversion rate of a test campaign includes machine training (3410) a location prediction model for the test campaign. In some embodiments, if a general prediction model associated with the one or more POIs is available, machine training (3410) the location prediction model for the test campaign includes machine training a calibration model to calibrate the general prediction model to the test campaign using mobile device data, as discussed above. Otherwise, machine training (3410) the location prediction model for the test campaign includes constructing a training feature space including a plurality of training feature sets corresponding, respectively, to a plurality of mobile devices, using historical mobile device data. A respective training feature set corresponds to a respective mobile device and including features constructed using datasets associated with the respective mobile device and having time stamps in a training time period. In some embodiments, machine training the location prediction model for the test campaign further includes obtaining a plurality of labels corresponding, respectively, to the plurality of mobile devices. A specific label corresponding to a specific mobile device indicates whether the specific mobile device has at least one location event at any of the one or more POIs during a training time frame after the training time period. In some embodiments, machine training (3410) the location prediction model for the test campaign further includes machine training a general prediction model using the training feature space and the plurality of labels, and may further include obtaining a calibration model corresponding to the information campaign. In some embodiments, the location prediction model for the test campaign includes the general prediction model and the calibration model.

As also shown in FIG. 34, method 3400 further includes sampling (3420) a plurality of information requests from historical request data having time stamps in a preset time period (e.g., the past week, 2 weeks or month). In some embodiments, the sampling is done randomly so that demographic distribution of the plurality of information requests resemble that of a similar number of requests received consecutively in real time. Method 3400 further includes, for each respective information request of the plurality of information requests, determining (3430) if the respective information request is a qualified request (e.g., an information request that qualifies for the test campaign) based on data associated with the respective information request and the set of campaign parameters of the test campaign. In response to the respective information request qualifying for the test campaign, method 3400 further includes determining (3440) a respective win rate for the respective information request, and predicting (3450) a respective conversion probability associated with the respective information request using the location prediction model. In some embodiments, the respective conversion probability corresponds to a probability of a respective mobile device associated with the respective information request to have at least one location event at any of the one or more POIs during a respective time frame.

In some embodiments, predicting a respective conversion probability associated with the respective information request using the location prediction model includes applying the general prediction model to a feature set corresponding to a respective mobile device associated with the respective information campaign to obtain a prediction result. In some embodiments, the feature set is constructed using datasets associated with the respective mobile device and having time stamps in a respective time period before the respective time frame. In some embodiments, predicting a respective conversion probability associated with the respective information request using the location prediction model further includes applying the calibration model to the prediction result to obtain the respective conversion probability.

As also shown in FIG. 34, method 3400 further includes predicting (3460) a conversion rate for the test campaign. In some embodiments, predicting (3460) the conversion rate includes determining a number of predicted impressions for the plurality of information requests. For example, the number of predicted impressions can be calculated as follows:

$$N_{PI} = \sum_q WR_q$$

where $WR_q$ represents the win rate for the $q^{th}$ qualified request and the summation is through all of the qualified requests among the plurality of information requests. In some embodiments, $WR_q$ is determined using a win rate profile, which is determined based on one or more campaign parameters of the test campaign (e.g., one or more campaign parameters related to a pricing model and/or base price). In some embodiments, the win rate profile is further determined based at least in part on a target number of conversions specified by the test campaign. In some embodiments, predicting (3460) the conversion rate further includes determining a number of predicted conversions for the plurality of information requests. For example, the number of predicted conversions can be calculated as follows:

$$N_{PC} = \sum_q WR_q PCR_q$$

where $PCR_q$ represents predicted conversion probability for the $q^{th}$ qualified request and the summation is through all of the qualified requests among the plurality of information requests. In some embodiments, the predicted conversion rate can be calculated as:

$$PCR = \frac{N_{PC}}{N_{PI}} = \frac{\sum_q WR_q PCR_q}{\sum_q WR_q}$$

Figure 35:
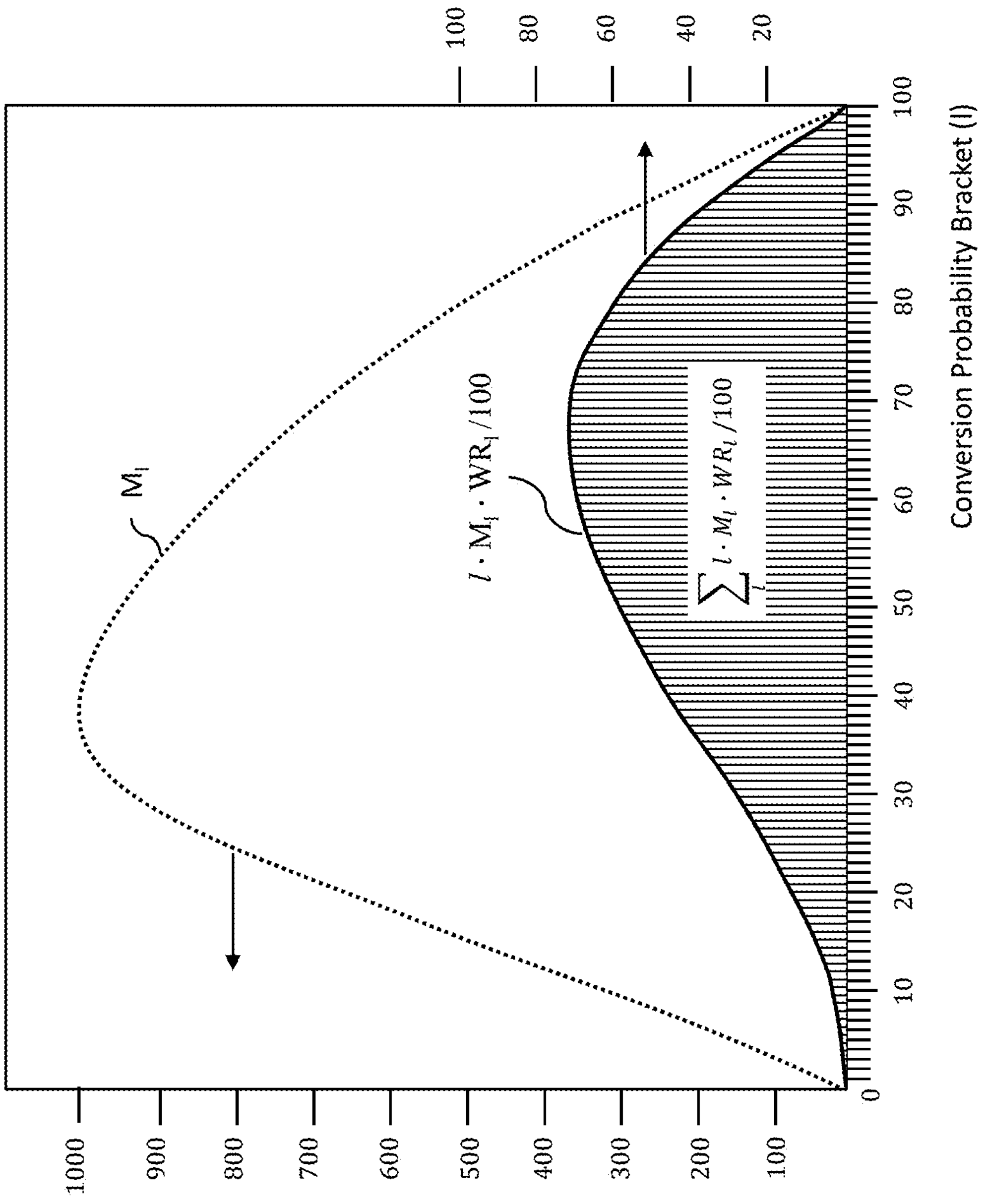
FIG. 35 is a plot of illustrating an example of conversion rate calculation according to certain embodiments.

In some embodiments, when the bid price (and thus the win rate) for each qualified request is dependent on the predicted probability corresponding to the qualified request according to the pricing model, the qualified requests among the plurality of information requests can be bracketed based on their respective conversion probabilities. For example, as shown in FIG. 35, where $M_l$ represents a number of qualified requests having conversion probabilities larger than or equal to (l−1)% and smaller than 1%, l=1, 2, . . . , 100, the predicted conversion rate can be calculated as:

$$PCR = \frac{\sum_l l \cdot M_l \cdot WR_l}{100 \sum_l M_l \cdot WR_l}$$

where $WR_l$ represents the win rate corresponding to the lth conversion probability bracket.

In some embodiments, when the location prediction model for a test campaign is not available or takes too long to train, system 100 is configured to carry out a method to obtain predicted conversion rate for a test campaign by applying a conversion rate prediction model. In some embodiments, the conversion rate prediction model can be trained using data from a set of historical campaigns. As shown in FIG. 1, one or more campaign databases 116 can be configured to store campaign parameters of each of a plurality of information campaigns. The plurality of information campaigns include a set of historical campaigns. Additionally, one or more mobile device databases can be configured to store datasets associated with mobile devices. As discussed above, in some embodiments, a respective dataset identifies an associated mobile device, and includes a respective time stamp and at least one respective event involving the associated mobile device at a time indicated by the respective time stamp. The at least one respective event can be, for example, one or more location events (triggering of a POI geo-fence and/or a geo-block) or a feedback event (impression, click/call, or secondary action).

In some embodiments, as also shown in FIG. 1, the feature engineering module 122 can be configured to construct a training feature space corresponding to the set of historical campaigns, the training feature space including a respective set of training features derived from respective campaign parameters of each respective historical campaign of the set of historical campaigns. In some embodiments, as shown in FIG. 23, the respective set of training features include respective POI features related to one or more respective points of interests (POIs) associated with the respective historical campaign (e.g., a number of visits to the one or more respective POIs by mobile users per a specific length of time (e.g., one week) as derived from mobile device data, a percentage of a number of POIs in the one or more respective POIs among all of the POIs in the same brand/category, and a category of the one or more respective POIs (e.g., general stores, department stores, grocery stores, apparel shops, sports shops, restaurants, shopping malls, theatres, etc.)). The respective set of training features further include respective audience features related to a respective target audience for the respective historical campaign (e.g., age range, gender type, education level, customer segment or affinity, geographical area, the type of geo-fences used to define the geo-graphical area, etc.). In some embodiments, the respective set of training features may further include one or more features related to at least one of a pricing model (e.g., CPM), a base price (e.g., $5 per thousand impressions), and a budget specified by one or more of the respective parameters (e.g., a target number of conversions attributable to the respective historical campaign). The set of campaign features may further include features related to mobile device type(s), ad type(s), mobile app(s), etc., which are specified by the historical campaign.

In some embodiments, the feature engineering module 122 is further configured to determine a set of labels corresponding, respectively, to the set of historical campaigns using the datasets in the one or more mobile device databases 124, the set of labels including a respective conversion rate for each respective historical campaign of the plurality of historical campaigns. In some embodiments, the respective conversion rate is determined by: determining a first number of mobile devices impressed with information associated with the respective historical campaign based on mobile device feedback data, determining a second number of mobile devices each having had at least one location event at the one or more respective POIs that is attributable to an impression during the respective historical campaign based on request feedback data and request data, and determining the respective conversion rate as the ratio of the second number to the first number. In some embodiments, each respective mobile device of the first number of mobile devices is associated with at least one dataset in the one or more mobile device databases 124 that indicates an impression event on the respective mobile device during at least part of the respective historical campaign. In some embodiments, each mobile device of the second number of mobile devices is associated with at least one dataset in the one or more mobile device database 124 that indicates a location event at any of the one or more respective POIs associated with the respective historical campaign during an attribution period after the mobile device has been impressed with the information associated with the respective historical campaign during the at least part of the respective historical campaign.

In some embodiments, the respective conversion rate is determined by: determining a third number of impressions made during the respective historical campaign, determining a fourth number of location events at the one or more respective POIs that are attributable to impressions made during the respective historical campaign, and determining the respective conversion rate as the ratio of the fourth number to the third number.

In some embodiments, as shown in FIG. 1, the model training module 123 is configured to machine train a conversion rate prediction model using the training feature space and the set of labels, which are derived from the set of historical campaigns, as shown in FIG. 36, and store the conversion rate prediction model in the prediction models database 126. In some embodiments, the feature engineering module 122 is further configured to derive a set of test features from campaign parameters of a test campaign, the set of test features including test POI features related to one or more test POIs specified by the test campaign (e.g., a number of visits to the one or more test POIs by mobile users per a specific length of time (e.g., one week) as derived from mobile device data, a percentage of a number of POIs in the one or more test POIs among all of the POIs in the same brand/category, and a category of the one or more test POIs (e.g., general stores, department stores, grocery stores, apparel shops, sports shops, restaurants, shopping malls, theatres, etc.)). The set of test features further includes test audience features related to a test audience specified by the test campaign. The set of test features may further include one or more features related to at least one of a pricing model (e.g., CPM), a base price (e.g., $3 per thousand impressions), and a budget specified by one or more of the test parameters (e.g., a target number of conversions attributable to the respective historical campaign). The set of test features may further include features related to mobile device type(s), ad type(s), mobile app(s), etc., which are specified by the test campaign.

In some embodiments, as shown in FIG. 1, the prediction module 131 can be configured to apply the conversion rate prediction model to the set of test features to obtain a predicted conversion rate for the test campaign.

Figure 37:
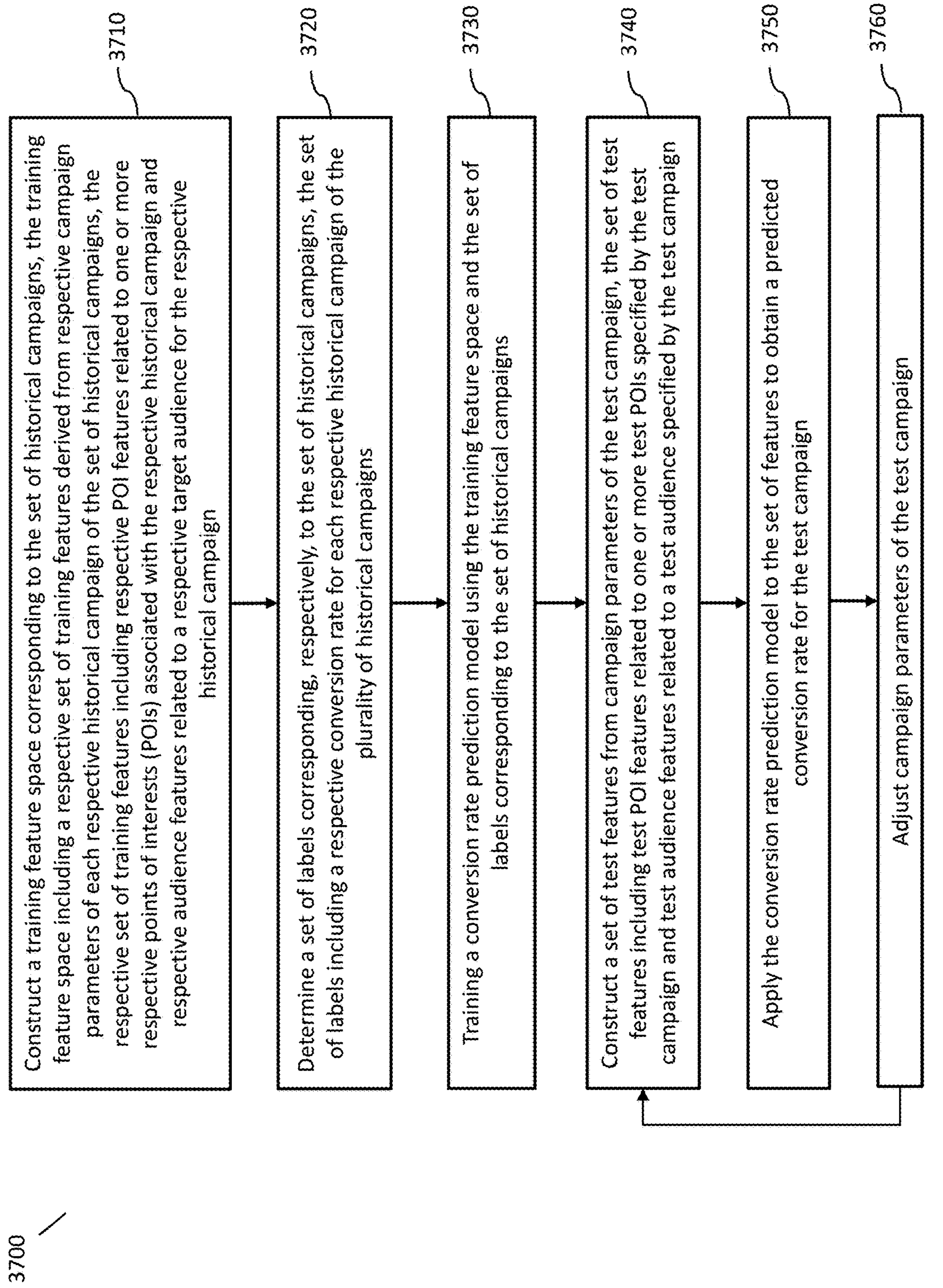
FIG. 37 is a flowchart illustrating a method for predicting the conversion rate of a test campaign using a conversion rate prediction model derived from a set of historical campaigns according to certain embodiments.

As shown in FIG. 37, a method 3700 for predicting a conversion rate for a test campaign according to some embodiments includes constructing (3710) a training feature space corresponding to the set of historical campaigns, the training feature space including a respective set of training features derived from respective campaign parameters of each respective historical campaign of the set of historical campaigns, the respective set of training features including respective POI features related to one or more respective points of interests (POIs) associated with the respective historical campaign and respective audience features related to a respective target audience for the respective historical campaign.

In some embodiments, method 3700 further includes determining (3720) a set of labels corresponding, respectively, to the set of historical campaigns using the datasets in the one or more second databases, the set of labels including a respective conversion rate for each respective historical campaign of the plurality of historical campaigns, and machine training (3730) a conversion rate prediction model using the training feature space and the set of labels. In some embodiments, determining the set of labels comprises, for each particular historical campaign of the set of historical campaigns: determining a first number of mobile devices, and determining a second number of mobile devices among the first number of mobile devices. Each respective mobile device of the first number of mobile devices is associated with at least one dataset in the one or more second databases that indicates an impression event on the respective mobile device during the at least part of the particular historical campaign. Each specific mobile device of the second number of mobile devices is associated with at least one dataset in the one or more second database that indicates a location event at any of one or more POIs associated with the particular historical campaign during an attribution period after the specific mobile device has been impressed with the information associated with the particular historical campaign during the at least part of the particular historical campaign. In some embodiments, the conversion rate for the particular historical campaign is determined using the first number and the second number. For example, the conversion rate can be the ration of the second number to the first number.

In some embodiments, the conversion rate for the particular historical campaign is determined by: determining a third number of impressions made during the particular historical campaign, determining a fourth number of location events at the one or more POIs associated with the particular historical campaign that are attributable to impressions made during the particular historical campaign, and determining the conversion rate for the particular historical campaign as the ratio of the fourth number to the third number.

In some embodiments, method 3700 further includes deriving (3740) a set of test features from campaign parameters of the test campaign, the set of test features including test POI features related to one or more test POIs specified by the test campaign and test audience features related to a test audience specified by the test campaign. The set of test features may further include one or more features related to at least one of a pricing model, a base price, and a budget specified by one or more of the test parameters, and may further include features related to mobile device type(s), ad type(s), mobile app(s), etc., which are specified by the test campaign. In some embodiments, method 3700 further includes applying (3750) the conversion rate prediction model to the set of test features to obtain a predicted conversion rate for the test campaign.

In some embodiments, in a process to optimize the conversion rate for the test campaign, the method further includes adjusting (3760) the test parameters. The prediction model can be re-applied (3750) to a new set of test features constructed (3740) from the adjusted test parameters. The process can be iterated until a desired conversion rate is reached.

Thus, a conversion rate prediction model can be trained off-line using historical data associated with a plurality of historical campaigns, and the conversion rate of a test campaign can be readily obtained by constructing a set of test features for the test campaign using the associated test campaign parameters, and by applying the conversion rate prediction model to the set of test features. In some embodiments, the test parameters of the test campaign can be varied to create multiple test campaigns, and the test campaign with the highest predicted conversion rate can be selected as a new information campaign to be carried out in real-time.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

We claim:

1. A method, comprising, at one or more computer systems coupled to a packet-based network, each of the one or more computer systems including at least one processor, at least one of the one or more computer systems including or having access to one or more first databases storing therein campaign parameters of each of a plurality of historical campaigns and one or more second databases storing therein datasets associated with mobile devices, wherein each respective dataset of at least some of the datasets includes a respective time stamp and at least one respective event involving an associated mobile device at a time indicated by the respective time stamp:

constructing a training feature space corresponding to the set of historical campaigns, the training feature space including a plurality of training feature sets corresponding to respective ones of the plurality of historical campaigns, a respective training feature set corresponding to a respective historical campaign including training features derived from respective campaign parameters of the respective historical campaign, the training features including respective points of interest (POI) features related to one or more respective points of interests (POIs) associated with the respective historical campaign and respective audience features related to a respective target audience for the respective historical campaign;

determining a set of labels corresponding, respectively, to the set of historical campaigns using at least some of the datasets in the one or more second databases, the set of labels including respective conversion rates corresponding to respective ones of the plurality of historical campaigns;

machine training a conversion rate prediction model using the training feature space and the set of labels;

deriving a set of test features from campaign parameters of a test campaign, the set of test features including test POI features related to one or more test POIs specified by the test campaign and test audience features related to a test audience specified by the test campaign; and applying the conversion rate prediction model to the set of test features to obtain a predicted conversion rate for the test campaign;

wherein determining the set of labels comprises, for the respective historical campaign of the set of historical campaigns:

determining a first number of mobile devices, wherein each respective mobile device of the first number of mobile devices is associated with at least one dataset in the one or more second databases that indicates an impression event on the respective mobile device related to the respective historical campaign;

determining a second number of mobile devices among the first number of mobile devices, wherein each specific mobile device of the second number of mobile devices is associated with at least one dataset in the one or more second database that indicates a location event at any of the one or more respective POIs associated with the respective historical campaign after the specific mobile device has been impressed with information associated with respective historical campaign; and determining a respective conversion rate for the respective historical campaign using the first number and the second number.

2. The method of claim 1, wherein the at least one respective event involving the associated mobile device includes a location event or a feedback event, the location event indicating a location of the associated mobile device being within a geographical boundary of one of a plurality of predefined geographical areas at the time indicated by the respective time stamp, the feedback event indicating an impression of information associated with one of the set of historical campaigns on the associated mobile device at the time indicated by the respective time stamp.

3. The method of claim 1, wherein the respective set of training features further include one or more features related to at least one of a pricing model and a budget specified by one or more of the respective parameters.

4. The method of claim 1, wherein the campaign parameters of the respective historical campaign include one or more parameters specifying at least one of a respective brand and a respective category, and wherein the respective POI features include features related to a proportion of the one or more respective POIs among a plurality of POIs associated with the respective brand or the respective category.

5. The method of claim 1, wherein the respective POI features include one or more features related to a popularity of the one or more respective POIs.

6. The method of claim 5, wherein the one or more features related to the popularity of the one or more respective POIs include a number of mobile devices detected to be at any of the one or more respective POIs for at least a preset length of time.

7. The method of claim 1, wherein the respective audience features include features related to one or more age ranges, one or more gender types and one or more education levels specified by the respective campaign parameters.

8. The method of claim 1, wherein the respective audience features include a feature related to a geographical area of the respective target audience specified by the respective campaign parameters.

9. The method of claim 8, wherein the respective audience features include a feature related to a type of geo fence defining the geographical area.

10. The method of claim 1, wherein the respective audience features include a feature related to a segment or affinity of the respective target audience.

11. A method, comprising:

at one or more computer systems coupled to a packet-based network, each of the one or more computer systems including at least one processor, at least one of the one or more computer systems including or having access to one or more databases storing therein datasets associated with mobile devices, wherein each respective dataset of at least some of the datasets includes a respective time stamp and at least one respective event involving an associated mobile device at a time indicated by the respective time stamp;

machine training a location prediction model for a test campaign, the test campaign having a set of campaign parameters including parameters specifying one or more places of interest (POIs), and a time span for the test campaign, wherein machine training the location prediction model for the test campaign includes: constructing a training feature space corresponding to a plurality of mobile devices using datasets associated with respective ones of the plurality of mobile devices and having time stamps in a training time period, determining a plurality of labels corresponding to the plurality of mobile devices, and machine training a general prediction model using the training feature space and the plurality of labels, wherein a respective label corresponding to a respective mobile device is determined based on whether the respective mobile device has had at least one location event at any of one or more predefined locations associated with the one or more POIs during a training time frame;

sampling a plurality of information requests received during a period of time;

for each respective information request of the plurality of information requests:

determining if the respective information request qualifies for the test campaign based on data associated with the respective information request and the set of campaign parameters of the test campaign; and in response to the respective information request qualifying for the test campaign, predicting a respective conversion probability associated with the respective information request using the location prediction model, wherein the respective conversion probability is associated with a respective mobile device and corresponds to a probability of the respective mobile device having at least one location event at any of the one or more POIs during a respective time frame, and wherein predicting a respective conversion probability associated with the respective information request using the location prediction model includes applying the general prediction model to a feature set corresponding to the respective mobile device to obtain a prediction result, the feature set being constructed using datasets associated with the respective mobile device and having time stamps in a prediction time period before the respective time frame;

determining a first number of predicted conversions based at least in part on the conversion probabilities associated, respectively, with a set of information requests qualified for the test campaign;

obtaining a win rate profile for the test campaign;

predicting a second number of impressions associated with information requests qualified for the test campaign using the win rate profile; and predicting a conversion rate for the test campaign using at least the first number and the second number.

12. The method of claim 11, wherein machine training the location prediction model for the test campaign further includes:

obtaining a calibration model corresponding to the test campaign, wherein the location prediction model for the test campaign includes the general prediction model and the calibration model;

wherein predicting a respective conversion probability associated with the respective information request using the location prediction model further includes applying the calibration model to the prediction result to obtain the respective conversion probability.

13. The method of claim 11, wherein the win rate profile is determined based on one or more campaign parameters of the test campaign.

14. The method of claim 13, wherein the win rate profile is further determined based at least in part on a target number of conversions to be achieved by the test campaign.

15. A system, comprising:

one or more first databases storing therein campaign parameters of each of a plurality of information campaigns, the plurality of information campaigns including a set of historical campaigns;

one or more second databases storing therein datasets associated with mobile devices, wherein each respective dataset of at least some of the datasets includes a respective time stamp and at least one respective event involving an associated mobile device at a time indicated by the respective time stamp;

one or more processors; and one or more memories into which one or more computer programs can be loaded for execution by the one or more processors to provide a plurality of functional units including:

a model training unit configured to:

construct a training feature space corresponding to the set of historical campaigns, the training feature space including a plurality of training feature sets corresponding to respective ones of the plurality of historical campaigns, a respective training feature set corresponding to a respective historical campaign including training features derived from respective campaign parameters of the respective historical campaign, the training features including respective points of interest (POI) features related to one or more respective points of interests (POIs) associated with the respective historical campaign and respective audience features related to a respective target audience for the respective historical campaign;

determine a first number of mobile devices, wherein each respective mobile device of the first number of mobile devices is associated with at least one dataset in the one or more second databases that indicates an impression event on the respective mobile device related to the respective historical campaign;

determine a second number of mobile devices among the first number of mobile devices, wherein each specific mobile device of the second number of mobile devices is associated with at least one dataset in the one or more second database that indicates a location event at any of the one or more respective POIs associated with the respective historical campaign after the specific mobile device has been impressed with information associated with the respective historical campaign; and determining a respective conversion rate for the respective historical campaign using the first number and the second number determine a set of labels corresponding, respectively, to the set of historical campaigns, the set of labels including a respective conversion rates corresponding to respective ones of the plurality of historical campaigns;

machine train a conversion rate prediction model using the training feature space and the set of labels; and derive a set of test features from campaign parameters of a test campaign, the set of test features including test POI features related to one or more test POIs specified by the test campaign and test audience features related to a test audience specified by the test campaign; and a prediction unit configured to apply the conversion rate prediction model to the set of test features to obtain a predicted conversion rate for the test campaign.

16. The system of claim 15, wherein the at least one respective event involving the associated mobile device includes a location event or a feedback event, the location event indicating a location of the associated mobile device being within a geographical boundary of one of a plurality of predefined geographical areas at the time indicated by the respective time stamp, the feedback event indicating an impression of information associated with one of the set of historical campaigns on the associated mobile device at the time indicated by the respective time stamp.

17. The system of claim 15, wherein the respective set of training features further include one or more features related to at least one of a pricing model and a budget specified by one or more of the respective parameters.

* * * * *